US010425671B2

(12) United States Patent
Archibong et al.

(10) Patent No.: US 10,425,671 B2
(45) Date of Patent: Sep. 24, 2019

(54) SHARING TELEVISION AND VIDEO PROGRAMMING THROUGH SOCIAL NETWORKING

(71) Applicant: Facebook, Inc., Menlo Park, CA (US)

(72) Inventors: Ime Archibong, San Francisco, CA (US); Colin Cameron Brennan Campbell, San Francisco, CA (US); Robert Daniel, Redwood City, CA (US); David Harry Garcia, Sunnyvale, CA (US); Michael John McKenzie Toksvig, Palo Alto, CA (US); Erick Tseng, San Francisco, CA (US); Patrick Underwood, Palo Alto, CA (US); Yoon Kean Wong, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/690,769

(22) Filed: Nov. 30, 2012

(65) Prior Publication Data
US 2014/0068692 A1     Mar. 6, 2014

Related U.S. Application Data

(62) Division of application No. 13/602,011, filed on Aug. 31, 2012, now Pat. No. 9,699,485.

(51) Int. Cl.
*H04N 21/234*     (2011.01)
*H04N 21/262*     (2011.01)
(Continued)

(52) U.S. Cl.
CPC ....... *H04N 21/26258* (2013.01); *G06F 15/16* (2013.01); *G06F 16/4387* (2019.01);
(Continued)

(58) Field of Classification Search
None
See application file for complete search history.

(56) References Cited

U.S. PATENT DOCUMENTS 5,694,163 A     12/1997  Harrison
5,798,785 A      8/1998  Hendricks
(Continued)

FOREIGN PATENT DOCUMENTS

JP     2009524273 A      6/2009
KR     10-1136621        4/2012
WO     WO 2011/155827   12/2011

OTHER PUBLICATIONS

U.S. Appl. No. 13/602,011, filed Aug. 31, 2012, Cameron A. Marlow.
(Continued)

*Primary Examiner* — Robert J Hance
(74) *Attorney, Agent, or Firm* — Baker Botts L.L.P.

(57) ABSTRACT

In particular embodiments, one or more computer systems of a social-networking system receive a first video stream from a content source, receive social content from a social graph of the social-networking system, and generate an overlay area comprising at least a portion of the social content. The social graph includes a plurality of nodes and edges connecting the nodes, the nodes comprising user nodes that are each associated with a particular user of the social-networking system. The one or more computer systems of the social-networking system determine a placement for the overlay area within the first video stream, generate a modified video stream using at least the first video stream and the overlay area, and provide the modified video stream for display on a display device. The overlay area is placed within the modified video stream according to the determined placement.

13 Claims, 39 Drawing Sheets

(51) Int. Cl.

| | | |
|---|---|---|
| *H04W 4/50* | (2018.01) | |
| *H04W 4/80* | (2018.01) | |
| *G06F 16/58* | (2019.01) | |
| *G06F 16/438* | (2019.01) | |
| *H04N 21/442* | (2011.01) | |
| *H04N 21/458* | (2011.01) | |
| *H04N 21/431* | (2011.01) | |
| *H04N 21/2668* | (2011.01) | |
| *H04L 29/06* | (2006.01) | |
| *G06F 15/16* | (2006.01) | |
| *H04L 12/58* | (2006.01) | |
| *H04N 21/63* | (2011.01) | |
| *H04N 21/258* | (2011.01) | |
| *H04N 21/4227* | (2011.01) | |
| *H04N 21/433* | (2011.01) | |
| *H04N 21/472* | (2011.01) | |
| *H04N 21/4788* | (2011.01) | |
| *H04N 21/6543* | (2011.01) | |
| *H04N 21/41* | (2011.01) | |
| *H04N 21/439* | (2011.01) | |
| *H04N 21/44* | (2011.01) | |
| *H04N 21/81* | (2011.01) | |
| *H04N 21/482* | (2011.01) | |
| *H04N 21/434* | (2011.01) | |
| *H04L 29/08* | (2006.01) | |
| *G06Q 30/02* | (2012.01) | |
| *H04N 21/235* | (2011.01) | |
| *H04N 21/278* | (2011.01) | |
| *H04N 21/488* | (2011.01) | |
| *H04N 21/6334* | (2011.01) | |
| *H04L 29/12* | (2006.01) | |
| *H04N 21/4147* | (2011.01) | |
| *H04N 21/4363* | (2011.01) | |
| *H04N 21/4402* | (2011.01) | |
| *H04N 21/84* | (2011.01) | |
| *H04N 21/8547* | (2011.01) | |
| *H04N 21/25* | (2011.01) | |
| *H04N 21/414* | (2011.01) | |
| *H04N 21/45* | (2011.01) | |
| *G06Q 50/00* | (2012.01) | |

(52) U.S. Cl.
CPC ......... *G06F 16/58* (2019.01); *G06Q 30/0277* (2013.01); *H04L 51/10* (2013.01); *H04L 51/32* (2013.01); *H04L 61/6022* (2013.01); *H04L 65/1089* (2013.01); *H04L 65/403* (2013.01); *H04L 65/4084* (2013.01); *H04L 65/4092* (2013.01); *H04L 65/60* (2013.01); *H04L 65/601* (2013.01); *H04L 67/02* (2013.01); *H04L 67/10* (2013.01); *H04L 67/22* (2013.01); *H04L 67/306* (2013.01); *H04N 21/235* (2013.01); *H04N 21/23418* (2013.01); *H04N 21/23424* (2013.01); *H04N 21/252* (2013.01); *H04N 21/25866* (2013.01); *H04N 21/25891* (2013.01); *H04N 21/2668* (2013.01); *H04N 21/278* (2013.01); *H04N 21/4126* (2013.01); *H04N 21/4147* (2013.01); *H04N 21/41407* (2013.01); *H04N 21/4227* (2013.01); *H04N 21/4316* (2013.01); *H04N 21/4334* (2013.01); *H04N 21/4344* (2013.01); *H04N 21/4394* (2013.01); *H04N 21/43635* (2013.01); *H04N 21/43637* (2013.01); *H04N 21/4402* (2013.01); *H04N 21/44008* (2013.01); *H04N 21/44218* (2013.01); *H04N 21/44222* (2013.01); *H04N 21/458* (2013.01); *H04N 21/4532* (2013.01); *H04N 21/4788* (2013.01); *H04N 21/47214* (2013.01); *H04N 21/4821* (2013.01); *H04N 21/4884* (2013.01); *H04N 21/632* (2013.01); *H04N 21/6334* (2013.01); *H04N 21/6543* (2013.01); *H04N 21/8133* (2013.01); *H04N 21/84* (2013.01); *H04N 21/8547* (2013.01); *H04W 4/50* (2018.02); *H04W 4/80* (2018.02); *G06Q 50/01* (2013.01)

(56) References Cited

U.S. PATENT DOCUMENTS

| | | |
|---|---|---|
| 6,081,830 A | 6/2000 | Schindler |
| 6,738,809 B1 | 5/2004 | Brisebois |
| 7,062,150 B1 | 6/2006 | Wugofski |
| 7,370,343 B1 | 5/2008 | Ellis |
| 7,395,546 B1 | 7/2008 | Asmussen |
| 7,478,414 B1 | 1/2009 | Glusker et al. |
| 7,624,416 B1 | 11/2009 | Vandermolen |
| 7,895,625 B1 | 2/2011 | Bryan et al. |
| 8,095,432 B1 | 1/2012 | Berman et al. |
| 8,311,382 B1 | 11/2012 | Harwell |
| 8,756,276 B2 | 6/2014 | Tseng et al. |
| 8,769,422 B2 | 7/2014 | Russell |
| 8,875,184 B1 | 10/2014 | Bakare et al. |
| 8,935,255 B2 | 1/2015 | Sankar |
| 9,912,987 B2 | 3/2018 | Badros et al. |
| 9,992,534 B2 | 5/2018 | Campbell |
| 10,028,005 B2 | 7/2018 | Archibong et al. |
| 2002/0048449 A1 | 4/2002 | Mineyama |
| 2002/0174430 A1 | 11/2002 | Ellis |
| 2002/0188959 A1 | 12/2002 | Piotrowski |
| 2003/0078972 A1 | 4/2003 | Tapissier et al. |
| 2003/0159153 A1 | 8/2003 | Falvo et al. |
| 2003/0182663 A1 | 9/2003 | Gudorf et al. |
| 2003/0189669 A1* | 10/2003 | Bowser .................. H04N 5/445 348/564 |
| 2003/0226144 A1 | 12/2003 | Thurston |
| 2004/0031058 A1 | 2/2004 | Reisman |
| 2004/0109063 A1 | 6/2004 | Kusaka et al. |
| 2004/0153456 A1 | 8/2004 | Charnock |
| 2004/0250285 A1 | 12/2004 | Murphy et al. |
| 2005/0005291 A1 | 1/2005 | McGinley |
| 2005/0071865 A1 | 3/2005 | Martins |
| 2005/0086682 A1 | 4/2005 | Burges |
| 2005/0138674 A1 | 6/2005 | Howard |
| 2005/0256756 A1 | 11/2005 | Lam |
| 2005/0262542 A1 | 11/2005 | DeWeese |
| 2006/0031889 A1 | 2/2006 | Bennett et al. |
| 2006/0064734 A1 | 3/2006 | Ma |
| 2006/0139373 A1* | 6/2006 | Sloo .................. H04N 5/44504 345/629 |
| 2006/0184967 A1 | 8/2006 | Maynard |
| 2006/0195462 A1 | 8/2006 | Rogers |
| 2006/0212911 A1 | 9/2006 | MacMullan et al. |
| 2006/0221857 A1 | 10/2006 | Bushnell et al. |
| 2006/0230061 A1 | 10/2006 | Sample et al. |
| 2006/0271630 A1 | 11/2006 | Bensky et al. |
| 2006/0271959 A1 | 11/2006 | Jacoby et al. |
| 2007/0033607 A1 | 2/2007 | Bryan |
| 2007/0124756 A1 | 5/2007 | Covell et al. |
| 2007/0150537 A1 | 6/2007 | Graham |
| 2007/0186241 A1 | 8/2007 | Sugimoto et al. |
| 2007/0250901 A1 | 10/2007 | McIntire |
| 2007/0256126 A1 | 11/2007 | Erickson et al. |
| 2007/0283403 A1 | 12/2007 | Eklund et al. |
| 2008/0082510 A1 | 4/2008 | Wang |
| 2008/0083003 A1 | 4/2008 | Biniak et al. |
| 2008/0109843 A1 | 5/2008 | Ullah |
| 2008/0109888 A1 | 5/2008 | Ullah |
| 2008/0178242 A1 | 7/2008 | Eyal et al. |
| 2008/0222199 A1 | 9/2008 | Tiu et al. |
| 2008/0235742 A1 | 9/2008 | Osaki |
| 2008/0244676 A1 | 10/2008 | DaCosta |
| 2008/0244681 A1 | 10/2008 | Gossweiler et al. |
| 2008/0250457 A1 | 10/2008 | Ohno |

(56) References Cited

U.S. PATENT DOCUMENTS

| | | |
|---|---|---|
| 2008/0271078 A1 | 10/2008 | Gossweiler et al. |
| 2008/0288596 A1 | 11/2008 | Smith |
| 2008/0320531 A1 | 12/2008 | Kim et al. |
| 2009/0007179 A1* | 1/2009 | Angiolillo ............ H04N 5/4403 725/44 |
| 2009/0049525 A1 | 2/2009 | D'Angelo et al. |
| 2009/0083815 A1* | 3/2009 | McMaster .......... H04N 7/17318 725/110 |
| 2009/0100469 A1 | 4/2009 | Conradt et al. |
| 2009/0117883 A1 | 5/2009 | Coffing |
| 2009/0133078 A1 | 5/2009 | Hamano |
| 2009/0138805 A1 | 5/2009 | Hildreth |
| 2009/0150928 A1 | 6/2009 | Hsu et al. |
| 2009/0154899 A1 | 6/2009 | Barrett et al. |
| 2009/0172745 A1 | 7/2009 | Horozov |
| 2009/0178081 A1 | 7/2009 | Goldenberg |
| 2009/0228918 A1 | 9/2009 | Rolff |
| 2009/0254499 A1 | 10/2009 | Deyo |
| 2009/0265242 A1 | 10/2009 | Horvitz |
| 2009/0292376 A1 | 11/2009 | Kazem et al. |
| 2009/0293079 A1 | 11/2009 | McKee et al. |
| 2010/0017474 A1 | 1/2010 | Kandekar et al. |
| 2010/0037277 A1 | 2/2010 | Flynn-Ripley et al. |
| 2010/0076851 A1 | 3/2010 | Jewell, Jr. |
| 2010/0083362 A1 | 4/2010 | Francisco |
| 2010/0095343 A1 | 4/2010 | Kaihotsu |
| 2010/0131385 A1 | 5/2010 | Harrang et al. |
| 2010/0146376 A1 | 6/2010 | Reams |
| 2010/0169786 A1 | 7/2010 | O'Brien |
| 2010/0185507 A1 | 7/2010 | Tokuda |
| 2010/0199308 A1* | 8/2010 | Hall .................... H04N 5/44543 725/40 |
| 2010/0218211 A1 | 8/2010 | Herigstad et al. |
| 2010/0222102 A1 | 9/2010 | Rodriguez |
| 2010/0228558 A1 | 9/2010 | Corcoran et al. |
| 2010/0241699 A1 | 9/2010 | Muthukumarasamy |
| 2010/0251305 A1 | 9/2010 | Kimble et al. |
| 2010/0262992 A1* | 10/2010 | Casagrande ........... H04N 7/165 725/34 |
| 2010/0272414 A1 | 10/2010 | Reneris |
| 2010/0275233 A1 | 10/2010 | Soohoo et al. |
| 2010/0318571 A1 | 12/2010 | Pearlman et al. |
| 2010/0319034 A1 | 12/2010 | Mountain |
| 2010/0319043 A1 | 12/2010 | Jain et al. |
| 2011/0004692 A1 | 1/2011 | Occhino et al. |
| 2011/0016482 A1* | 1/2011 | Tidwell ................. G06Q 30/00 725/14 |
| 2011/0030067 A1 | 2/2011 | Wilson |
| 2011/0040760 A1 | 2/2011 | Fleischman |
| 2011/0041080 A1 | 2/2011 | Fleischman et al. |
| 2011/0055309 A1 | 3/2011 | Gibor et al. |
| 2011/0069937 A1 | 3/2011 | Toerner |
| 2011/0078724 A1 | 3/2011 | Mehta et al. |
| 2011/0078744 A1 | 3/2011 | Adimatyam |
| 2011/0107379 A1 | 5/2011 | Lajoie et al. |
| 2011/0126251 A1 | 5/2011 | LaFreniere |
| 2011/0126257 A1 | 5/2011 | Goergen et al. |
| 2011/0126258 A1 | 5/2011 | Emerson et al. |
| 2011/0137902 A1 | 6/2011 | Wable |
| 2011/0138480 A1 | 6/2011 | Janoulis et al. |
| 2011/0173668 A1* | 7/2011 | Rooks .................. H04L 12/282 725/80 |
| 2011/0185437 A1 | 7/2011 | Tran |
| 2011/0197224 A1* | 8/2011 | Meijer .................. G06Q 30/02 725/34 |
| 2011/0238754 A1 | 9/2011 | Dasilva et al. |
| 2011/0251896 A1 | 10/2011 | Impollonia |
| 2011/0254683 A1 | 10/2011 | Soldan |
| 2011/0320380 A1 | 12/2011 | Zahn |
| 2012/0023534 A1 | 1/2012 | Dasilva et al. |
| 2012/0030587 A1 | 2/2012 | Ketkar |
| 2012/0036524 A1 | 2/2012 | Mugulavalli et al. |
| 2012/0042334 A1* | 2/2012 | Choi ................... H04N 21/454 725/32 |
| 2012/0047529 A1* | 2/2012 | Schultz ............... H04N 21/252 725/34 |
| 2012/0075168 A1 | 3/2012 | Osterhout et al. |
| 2012/0110678 A1 | 5/2012 | Kumble |
| 2012/0124630 A1 | 5/2012 | Wellen et al. |
| 2012/0158753 A1 | 6/2012 | He |
| 2012/0159327 A1 | 6/2012 | Law et al. |
| 2012/0159337 A1 | 6/2012 | Travilla et al. |
| 2012/0159527 A1 | 6/2012 | Perez |
| 2012/0174157 A1 | 7/2012 | Stinson, III et al. |
| 2012/0174169 A1 | 7/2012 | Nandiraju |
| 2012/0189140 A1 | 7/2012 | Hughes |
| 2012/0189284 A1 | 7/2012 | Morrison |
| 2012/0198488 A1 | 8/2012 | Son et al. |
| 2012/0210247 A1 | 8/2012 | Khouri |
| 2012/0224711 A1 | 9/2012 | Kim |
| 2012/0240142 A1 | 9/2012 | Rose |
| 2012/0259707 A1 | 10/2012 | Thielke et al. |
| 2012/0265328 A1 | 10/2012 | Kadirkamanathan |
| 2012/0278179 A1 | 11/2012 | Campbell et al. |
| 2012/0278476 A1 | 11/2012 | Agrawal |
| 2012/0317297 A1 | 12/2012 | Bailey |
| 2012/0331496 A1 | 12/2012 | Copertino et al. |
| 2013/0014136 A1 | 1/2013 | Bhatia et al. |
| 2013/0042326 A1 | 2/2013 | Matus |
| 2013/0044959 A1 | 2/2013 | Mitchell |
| 2013/0046542 A1 | 2/2013 | Papakipos |
| 2013/0046823 A1 | 2/2013 | Mitchell |
| 2013/0061258 A1 | 3/2013 | Takaya et al. |
| 2013/0061296 A1 | 3/2013 | Reddy et al. |
| 2013/0073473 A1 | 3/2013 | Heath |
| 2013/0080427 A1 | 3/2013 | Cross |
| 2013/0081084 A1 | 3/2013 | Scheer |
| 2013/0136425 A1 | 5/2013 | Herby |
| 2013/0145387 A1 | 6/2013 | Van Brandenburg |
| 2013/0173765 A1 | 7/2013 | Korbecki |
| 2013/0191869 A1 | 7/2013 | Sugiyama et al. |
| 2013/0198642 A1 | 8/2013 | Carney |
| 2013/0239146 A1 | 9/2013 | Cherry |
| 2013/0262585 A1 | 10/2013 | Niemeyer et al. |
| 2013/0268973 A1 | 10/2013 | Archibong et al. |
| 2013/0317910 A1 | 11/2013 | Mohamed |
| 2014/0012905 A1 | 1/2014 | Roche et al. |
| 2014/0040367 A1 | 2/2014 | Lessin et al. |
| 2014/0041038 A1 | 2/2014 | Lessin et al. |
| 2014/0058812 A1 | 2/2014 | Bender et al. |
| 2014/0067825 A1 | 3/2014 | Oztaskent |
| 2014/0068466 A1 | 3/2014 | Garcia et al. |
| 2014/0140679 A1 | 5/2014 | Khader et al. |
| 2014/0140680 A1* | 5/2014 | Jo ........................ H04N 9/8715 386/241 |
| 2014/0189479 A1 | 7/2014 | Glennon |
| 2014/0282674 A1 | 9/2014 | Conradt |
| 2014/0327677 A1 | 11/2014 | Walker |
| 2015/0089372 A1 | 3/2015 | Mandalia et al. |
| 2015/0319502 A1 | 11/2015 | Garcia |
| 2016/0007096 A1 | 1/2016 | Badros |
| 2016/0072758 A1 | 3/2016 | Archibong |
| 2016/0165265 A1 | 6/2016 | Archibong |
| 2016/0366090 A1 | 12/2016 | Campbell |
| 2017/0026442 A1 | 1/2017 | Archibong |
| 2017/0034546 A1 | 2/2017 | Badros |
| 2017/0111689 A1 | 4/2017 | Garcia et al. |
| 2017/0230700 A1 | 8/2017 | Archibong et al. |
| 2017/0230720 A1 | 8/2017 | Archibong et al. |
| 2017/0272813 A1 | 9/2017 | Garcia et al. |
| 2017/0280192 A1 | 9/2017 | Marlow et al. |
| 2017/0318357 A1 | 11/2017 | Bruich et al. |
| 2017/0359630 A1 | 12/2017 | Archibong et al. |

OTHER PUBLICATIONS

U.S. Appl. No. 13/688,736, filed Nov. 29, 2012, Ime Archibong.
U.S. Appl. No. 13/691,035, filed Nov. 30, 2012, Ime Archibong.
U.S. Appl. No. 13/688,850, filed Nov. 29, 2012, Sean M. Bruich.
U.S. Appl. No. 13/689,285, filed Nov. 29, 2012, David H. Garcia.
U.S. Appl. No. 13/689,355, filed Nov. 29, 2012, Gregory J. Badros.
U.S. Appl. No. 13/688,905, filed Nov. 29, 2012, Ime Archibong.

(56) References Cited

OTHER PUBLICATIONS

U.S. Appl. No. 13/690,892, filed Nov. 30, 2012, Ime Archibong.
U.S. Appl. No. 13/691,122, filed Nov. 30, 2012, Mark Heynen.
U.S. Appl. No. 13/692,122, filed Dec. 3, 2012, Colin C. Brennan.
U.S. Appl. No. 13/691,269, filed Nov. 30, 2012, David H. Garcia.
U.S. Appl. No. 13/692,675, filed Dec. 3, 2012, Ime Archibong.
U.S. Appl. No. 13,692,598, filed Dec. 3, 2012, Gregory J. Badros.
U.S. Appl. No. 13/692,006, filed Dec. 3, 2012, Colin C. Brennan.
Notification of Transmittal of the International Search Report and the Written Opinion of the International Searching Authority, or the Declaration; International Application No. PCT/US2013/057449; International filing date: Aug. 30, 2013, dated Dec. 11, 2013.
Martin, R. et al. "neXtreme: A Multi-Device, Social Approach to Video Content Consumption." Consumer Communications and Networking Conference (CCNC), 2010 7th IEEE, 2010. 1-5.
EPO Germany, Communication—Extended European Search Report dated May 4, 2016; Application No./Patent No. 13833399.2-1905 / 2891322 PCT/US2013057449; Ref. FABOO276-PCT/EP.
U.S. Appl. No. 15/175,159, filed Jun. 7, 2016, Archibong.
Korean Intellectual Property Office, Notice of Allowance, Appln. No. 10-2015-7008259, dated Nov. 15, 2017.
Australian Government, IP Australia, Examination Report No. 1 for Standard Patent Application No. 2017/210589, dated Aug. 10, 2018.
KR Office Action received from KIPO for Patent Application No. 10-2017-7003970. (with English Translation), dated Feb. 1, 2019.

\* cited by examiner

SHARING TELEVISION AND VIDEO PROGRAMMING THROUGH SOCIAL NETWORKING

RELATED APPLICATION

The present application is a divisional application of U.S. patent application Ser. No. 13/602,011, filed Aug. 31, 2012, and entitled "Sharing Television and Video Programming Through Social Networking"

TECHNICAL FIELD

This disclosure relates generally to social networking.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments enhance a user's television viewing experience by overlaying content onto a video stream for display on a display device such as a TV. The content may include advertisements, notifications, newsfeeds, tickers, chat sessions, or any other appropriate social content from a social networking system.

In particular embodiments, a social TV dongle receives a video stream from a content source. The social TV dongle may decode the incoming video stream into a series of incoming video frames. The social TV dongle may then overlay a top frame onto the incoming video frame to create a combined output frame. The top frame may include a social area that may contain any social content from the social networking system. The combined output frames are then transmitted as a modified video stream for display on a display device such as TV. In some embodiments, the social area may be painted directly on the incoming video frame.

DESCRIPTION OF EXAMPLE EMBODIMENTS

Particular embodiments enhance a user's television viewing experience by overlaying content onto a video stream for display on a display device such as a TV. The content may include advertisements, notifications, newsfeeds, tickers, chat sessions, or any other appropriate social content from a social networking system.

Figure 1:
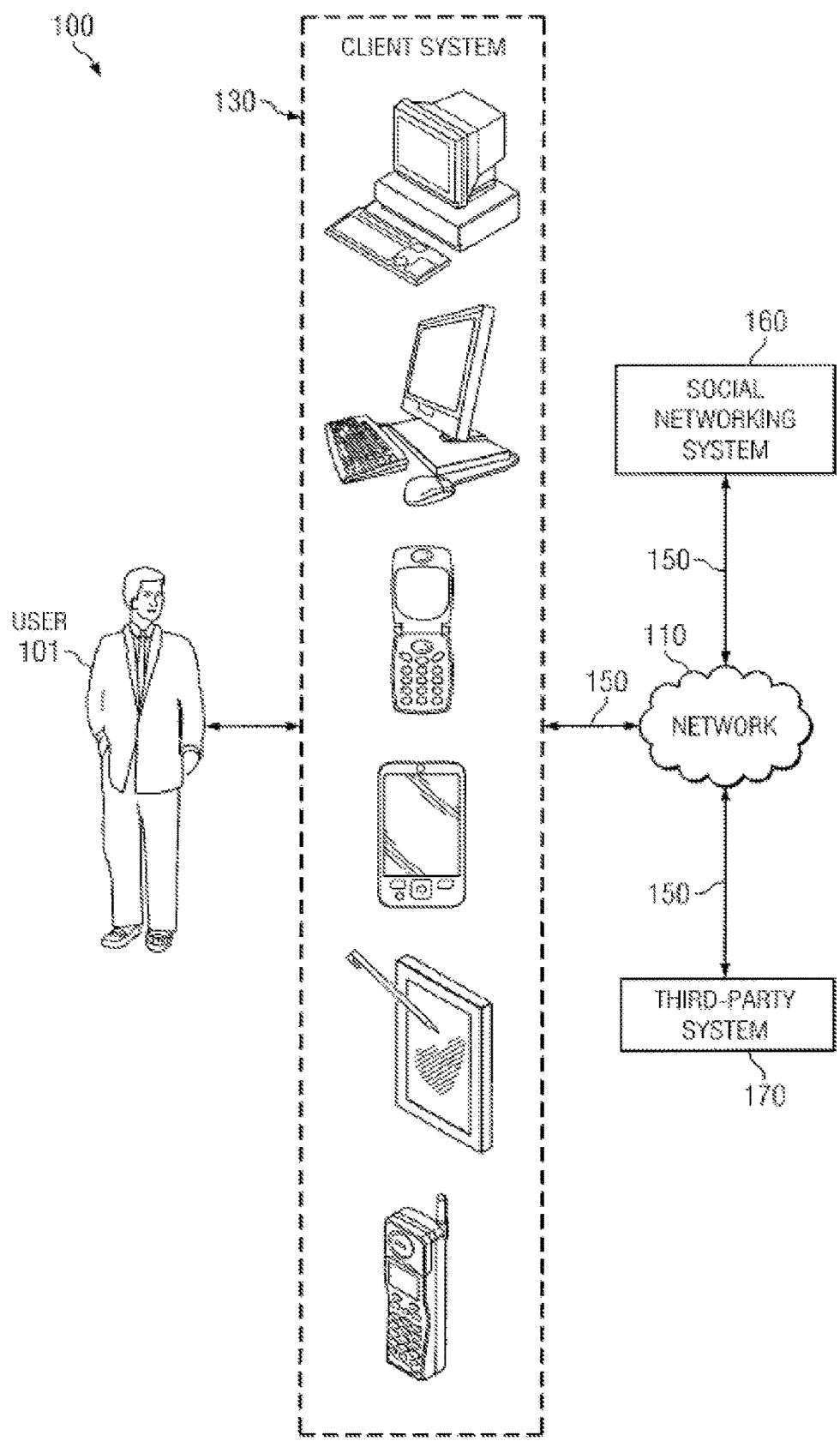
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host websites that embed data from social-networking system 160. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
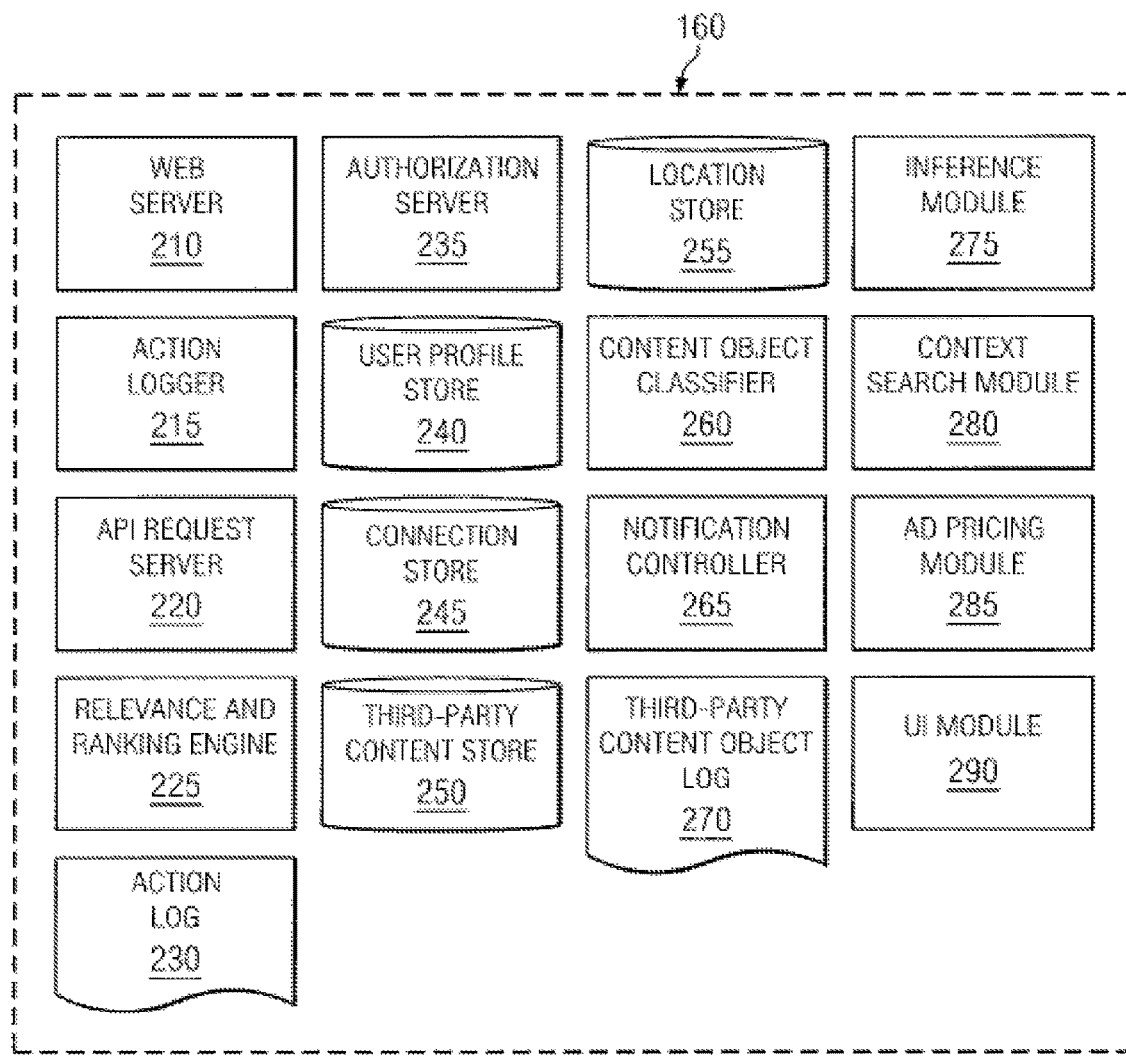
FIG. 2 illustrates an example social-networking system.

FIG. 2 is a diagram of one embodiment of a social networking system 160. The embodiment of a social networking system 160 shown by FIG. 2 includes a web server 210, an action logger 215, an API request server 220, a relevance and ranking engine 225, a content object classifier 260, a notification controller 265, an action log 230, a third-party content object exposure log 270, an inference module 275, an authorization server 235, a search module 280, an ad targeting module 285, a user interface module 290, a user profile store 240, a connection store 245, a third-party content store 250, and a location store 255. In other embodiments, the social networking system 160 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 160 comprises a computing system that allows users to communicate or otherwise interact with each other and access content as described herein. The social networking system 160 stores user profiles describing the users of a social network in a user profile store 240. The user profiles include biographic, demographic, and other types of descriptive information, such as work experience, educational history, hobbies or preferences, interests, location, and the like. For example, the user profile store 240 contains data structures with fields suitable for describing a user's profile. When a new object of a particular type is created, the social networking system 160 initializes a new data structure, i.e., a "node" of the corresponding type, assigns a unique object identifier to it, and begins to add data to the object as needed. This might occur, for example, when a user becomes a user of the social networking system 160, the social networking system 160 generates a new instance of a user profile in the user profile store 240, assigns a unique identifier to the user profile, and begins to populate the fields of the user profile with information provided by the user.

In addition, the user profile store 240 may include data structures suitable for describing a user's demographic data, behavioral data, and other social data. Demographic data typically includes data about the user, such as age, gender, location, etc., e.g., as included in the user's profile. Behavioral data typically includes information about the user's activities within the social networking system 160, such as specific actions (posts, likes, comments, etc.), activity levels, usage statistics, etc. Other social data comprises information about the user from within the social networking system 160 that is not strictly demographic or behavioral, such as interests or affinities, etc. In one embodiment, user's interests may be explicitly specified in the user's profile or interests that may be inferred from the user's activities in the social networking system (e.g., uploaded content, postings, reading of messages, etc). Additionally, the user profile store 240 includes logic for maintaining user interest information for users according to one or more categories. Categories may be general or specific, e.g., if a user "likes" an article about a brand of shoes the category may be the brand, or the general category of "shoes" or "clothing." Multiple categories may apply to a single user interest. In addition, the user profile store 240 may be accessed by other aspects of the social networking system 160.

For example, the user profile store 240 includes logic for maintaining interest information for users according to one or more categories. Categories may be general or specific, e.g., if a user "likes" an article about a brand of shoes the category may be the brand, or the general category of "shoes" or "clothing." Multiple categories may apply to a single user interest. In addition, the user profile store 240 may be accessed by other aspects of the social networking system 160.

The social networking system 160 further stores data describing one or more connections between different users in a user connection store 245. The connection information may indicate users who have similar or common work experience, group memberships, hobbies, educational history, or are in any way related or share common attributes. Additionally, the social networking system 160 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The connection store 245 includes data structures suitable for describing a user's connections to other users, connections to third-party content object providers 170, or connections to other entities. The connection stores 245 may also associate a connection type with a user's connections, which may be used in conjunction with the user's privacy setting, to regulate access to information about the user. In addition, the connection store 245 may be accessed by other aspects of the social networking system 160.

The web server 210 links the social networking system to one or more client devices 130 and/or one or more third-party content object providers 170 via the network 110. The web server 210 serves web pages, as well as other web-related content, such as Java, Flash, XML, and so forth. The web server 210 may include a mail server or other messaging functionality for receiving and routing messages between the social networking system 160 and one or more client devices 130. The messages can be instant messages, queued messages (e.g., email), text and SMS messages, or any other suitable messaging format.

The Application Programming Interface (API) request server 220 allows one or more third-party content object providers 170 to access information from the social networking system 160 by calling one or more APIs. The API request server 220 also may allow third-party content object providers 170 to send information to the social networking system by calling APIs. For example, a third-party content object provider 170 sends an API request to the social networking system 160 via the network 110 and the API request server 220 receives the API request. The API request server 220 processes the request by calling an API associated with the API request to generate an appropriate response, which the API request server 220 communicates to the third-party content object provider 170 via the network 110.

The action logger 215 is capable of receiving communications from the web server 210 about user actions on and/or off the social networking system 160. The action logger 215 populates the action log 230 with information about user actions, allowing the social networking system 160 to track or monitor various actions taken by its users within the social networking system 160 and outside of the social networking system 160. Any action that a particular user takes with respect to another user is associated with each user's profile, through information maintained in the action log 230 or in a similar database or other data repository. Examples of actions taken by a user within the social network 160 that are identified and stored may include, for example, adding a connection to another user, sending a message to another user, reading a message from another user, viewing content associated with another user, attending an event posted by another user or other actions interacting with another user. When a user takes an action within the social networking system 160, the action is recorded in the action log 230. In one embodiment, the social networking system maintains the action log 230 as a database of entries. When an action is taken within the social networking system 160, an entry for the action is added to the action log 230. The relevance and ranking engine 225 includes logic for calculating a relevance score for content objects (including both user-generated content objects and third-party content objects) relative to a user, for ranking the content objects by their relevance scores, and for selecting content objects for sending to users as notifications or as responses to user requests. To calculate the relevance score, the relevance and ranking engine 225 determines a location value by comparing the content object location and a current location for the user device 210, determines an interest value based on whether the content object categories are included in the user's interests, determines a time value based on whether the current time is within the delivery time range for the content object, and determines a connection value based on how many of the user's connections are associated with the content object. Then, the relevance and ranking engine 225 combines the location value, interest value, connection value, and time value to determine the relevance score for the content object with respect to the user. In one embodiment the values are higher for a better fit (closer proximity, great similarity, etc.) and approach a value of one, and are multiplied together to yield the relevance score. From the relevance scores for each content object, the relevance and ranking engine 225 ranks the content objects for a user, e.g., from highest relevance score to lowest. The relevance and ranking engine 225 then can select content objects to send to a notification controller 265, or can serve the highest ranked content object directly to the client device 130 as a notification(s).

The content object classifier 260 includes logic for assigning each of the content objects a location, a category, and a delivery time range. Categories may reflect various categories of user interests, and may be associated with the interests themselves, e.g., a user "likes" an article about a brand of shoes and the category is the brand, or the article about the shoe brand is assigned a general category of "shoes" or "clothing." Multiple categories may apply to a single content object. General or specific locations may be assigned to content objects as well, e.g., a city, a particular street name or intersection, or GPS coordinates. A delivery time range is assigned to each content object, e.g., using a useful range based on the hours the associated business is open.

Additionally, user actions may be associated with exposure to third-party content objects from one or more third-party content object providers 170. Thus, in conjunction with the action log 230, a third-party content object log 270 is maintained of user exposures to such objects and when the last exposure occurred. The action logger 215 receives data describing a user's interaction with an object and stores it to the third-party content object log 270. The third-party content object log 270 includes logic for storing user exposures to third-party content objects and associations between users and objects. The exposure information can be used to determine whether to expose the user to the same or similar content objects, and for adjusting the ranking and selection of content objects on the basis of whether the user previously has been exposed to the same or similar content object. In addition, if a user becomes associated with a content object via an action, e.g., uses an incentive, goes to the location, etc., that information also is stored, and can be used for re-ranking and re-selecting the content objects.

The notification controller 265 provides information regarding content objects to the client device 130. Information may be pushed to the client device 130 as notifications, or information may be pulled to the user device responsive to a request received from the client device 130. In the push circumstance, notifications of content objects are initially pushed according to a default rate. Based on user engagement with the notifications, the notification controller 265 may adjust the rate in which notifications are provided to the client device 130. By adjusting the initial settings, the notification controller 265 provides notifications of content objects to the client device 130 when the user is more likely to engage with the notifications. Information may be pulled to the user device at any time. Additionally, the type of content that is provided to the client device 130 may be updated based on the user engagement.

The authorization server 235 enforces one or more privacy settings of the users of the social networking system 160. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites or any entity that can potentially access the information. The information that can be shared by a user comprises user profile information like profile photo, phone numbers associated with the user, user's connections, actions taken by the user such as adding a connection, changing user profile information and the like.

The useful social information that is tracked and maintained by a social networking system can be thought of in terms of a "social graph," which includes a plurality of nodes that are interconnected by a plurality of edges. Each node in the social graph may represent something that can act on and/or be acted upon by another node. Common examples of nodes include users, non-person entities, content objects, groups, events, messages, concepts, and any other things that can be represented by an object in a social networking system. An edge between two nodes in the social graph represents a particular kind of connection between the two nodes, which may result from an action that was performed by one of the nodes on the other node.

The social networking system 160 may receive a request to associate the web content with a node in the social networking system 160. An external website (e.g., of the third party content object provider 170) incorporates a tag into the markup language document for the web page(s) of the web content to claim ownership of the pages/domain in the context of the social networking system 160. In some cases, an entire domain or collection of web pages is associated with a unique identifier that associates the web pages with a node. Once established, the social networking system 160 tracks data associated with the node in the action log 230.

Data stored in the connection store 245, the user profile store 240 and the action log 230 allows the social networking system 160 to generate a social graph that uses nodes to identify various objects and edges connecting nodes to identify relationships between different objects. An edge between two nodes in the social graph represents a particular kind of connection between the two nodes, which may result from an action that was performed by one of the nodes on the other node.

The third-party content object store 250 stores content objects received from third parties. The third-party content objects include informational content objects, such as movie show times, restaurant menus, etc., as well as incentive content objects, such as coupons, discount tickets, gift certificates, etc. In addition, some third-party content objects may include a combination of information and incentives.

The location store 255 stores location information received from client devices 130 associated with users. The location information used by the social networking system 160 may be obtained directly from client devices 130, e.g., at the time a notification is to be sent or at various predetermined time intervals, or the location information may be a last stored location received from the client device 130. In addition, the location store 255 may receive updated location information, e.g., in response to a change in the location of a client device 130. In one embodiment, if an updated location is received, the updated location is provided to the relevance and ranking engine 225 for re-ranking and/or re-selecting the third-party content objects in view of the updated location information.

In general, the selection or ranking of content objects may occur at varying intervals based on several variables, such as always at the beginning of a period during which a notification would be served, or every X minutes during a period during which notifications will be served, or every X minutes all the time (e.g., so that it's ready when a search happens), only in response to a change in location or expiration of a delivery time for a content object, etc. Alternatively, the ranking of content objects may occur as a result of user demand. The user may explicitly request the ranking by submitting a request for relevant information happening within the vicinity of the user. The request may be received in response to user selection of a "refresh" element included in a user application associated with the present disclosure. The request may also be implicit. For example, upon launching of the user application, a request may be automatically received for the ranking.

The social networking system 160 implements context search using a context search module 280. Context search results are search results that are relevant to the user based on their current location as well as their social information. In this way, the context search results are tailored to the user's interests, connections, and location at the time of the search. The context search module 280 incorporates location information, search results and relevance score information obtained from the relevance and ranking engine 225 in order to provide a ranked list of search results and/or for selection of third-party content objects as the basis for serving notifications.

The ad pricing module 285 combines social information, the current time, and location information to provide relevant advertisements, in the form of notifications, to a user. Advertisements of increased relevance to a user are more likely to result in a purchase. Dividing consumers according to their interests based on social information allows merchants to calculate the value of their potential customers. Advertisements provided through the social networking system 160 may be priced according to the value of the customer to the merchant, as indicated by their social information.

In one embodiment, the UI (or User Interface) module 290 is configured to display a map containing pins on a client device 130, where each pin represents a content object in actionable proximity to a user (e.g., a nearby friend, deal, etc.). The content objects selected to be presented as pins to the user are those content objects with sufficiently high relevance scores. Multiple pins for a nearby area can be clustered. The UI module 290 provides the user with the ability to switch between zoom levels for the map, thereby showing pins at varying distances from the user's current location (e.g., nearby, close, and far). In one embodiment, the zoom levels are based on the existence of relevant content rather than being predetermined distances from the user.

In one embodiment, the UI module 290 is configured to display a ranked list of search results on a client device 130 that have been ranked by the context search module 280. The UI module 290 is additionally configured to generate an advertisement dashboard for merchants advertising through the social networking system 160. The advertisement dashboard allows merchants to control the distribution and price they pay for their advertisements. For both functions, the UI module is configured to generate a user interface that a client device 130 or a third-party content object provider (or merchant) 130 may interact with.

An inference module 275 determines overlapping interests between users in the social networking system 160. By determining the overlapping interests between a user and his or her friends, the inference module 275 may identify which interests may be imputed to the user based on the interests of the user's friends. Thus, through the user's friends, the inference module 275 allows the social networking system 160 to identify interests for the user that are not explicitly indicated by the user.

The third-party content object store 250 stores content objects received from third parties. The third-party content objects include informational content objects, such as movie show times, movie reviews, restaurant reviews, restaurant menus, product information and reviews, etc., as well as incentive content objects, such as coupons, discount tickets, gift certificates, etc. In addition, some third-party content objects may include a combination of information and incentives.

The location store 255 stores location information received from user devices associated with users. The location information used by the social networking system 160 may be obtained directly from client devices 130, e.g., at the time a notification is to be sent or at various predetermined time intervals, or the location information may be a last stored location received from the client device 130. The location information may also be obtained along with a request from a user. In addition, the location store 255 may receive updated location information, e.g., in response to a change in the location of a client device 130. In one embodiment, if an updated location is received, the updated location is provided to the relevance and ranking engine 225 for re-ranking and or re-selection of the content objects in view of the updated location information.

Figure 3:
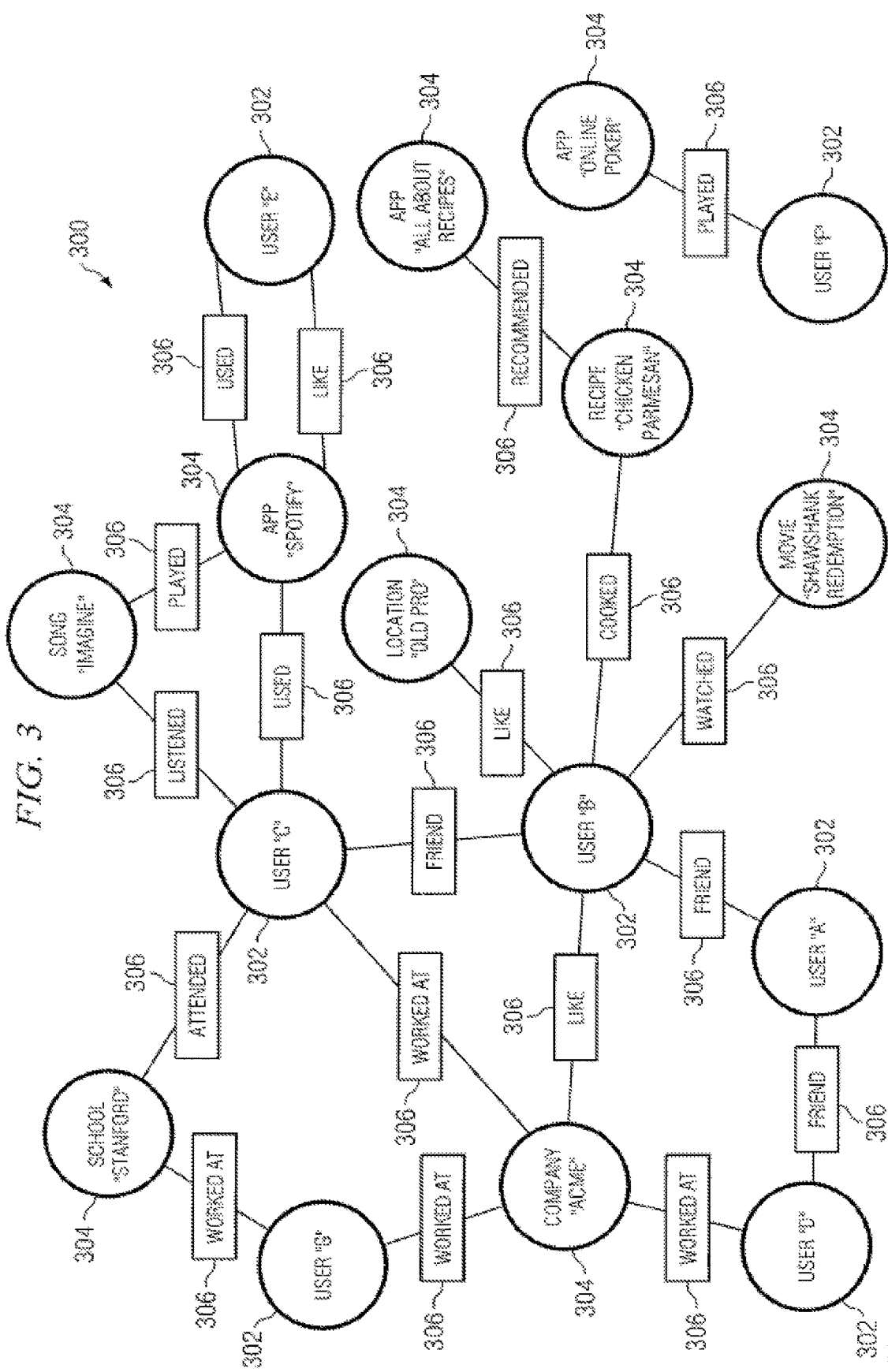
FIG. 3 illustrates an example social graph.

FIG. 3 illustrates an example social graph 300. In particular embodiments, social-networking system 160 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 160, client system 130, or third-party system 170 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 160. In particular embodiments, a user node 302 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages or one or more user-profile pages (which may be webpages).

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to a webpage.

In particular embodiments, a node in social graph 300 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 306 connecting the first user's user node 302 to the second user's user node 302 in social graph 300 and store edge 306 as social-graph information in one or more of data stores 24. In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 160 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 160 may create an edge 306 between a user node 302 and a concept node 304 in social graph 300. As an example and not by way of limitation, a user viewing a concept-profile page (such as, for example, by using a web browser or a special-purpose application hosted by the user's client system 130) may indicate that he or she likes the concept represented by the concept node 304 by clicking or selecting a "Like" icon, which may cause the user's client system 130 to send to social-networking system 160 a message indicating the user's liking of the concept associated with the concept-profile page. In response to the message, social-networking system 160 may create an edge 306 between user node 302 associated with the user and concept node 304, as illustrated by "like" edge 306 between the user and concept node 304. In particular embodiments, social-networking system 160 may store an edge 306 in one or more data stores. In particular embodiments, an edge 306 may be automatically formed by social-networking system 160 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

Figure 4:
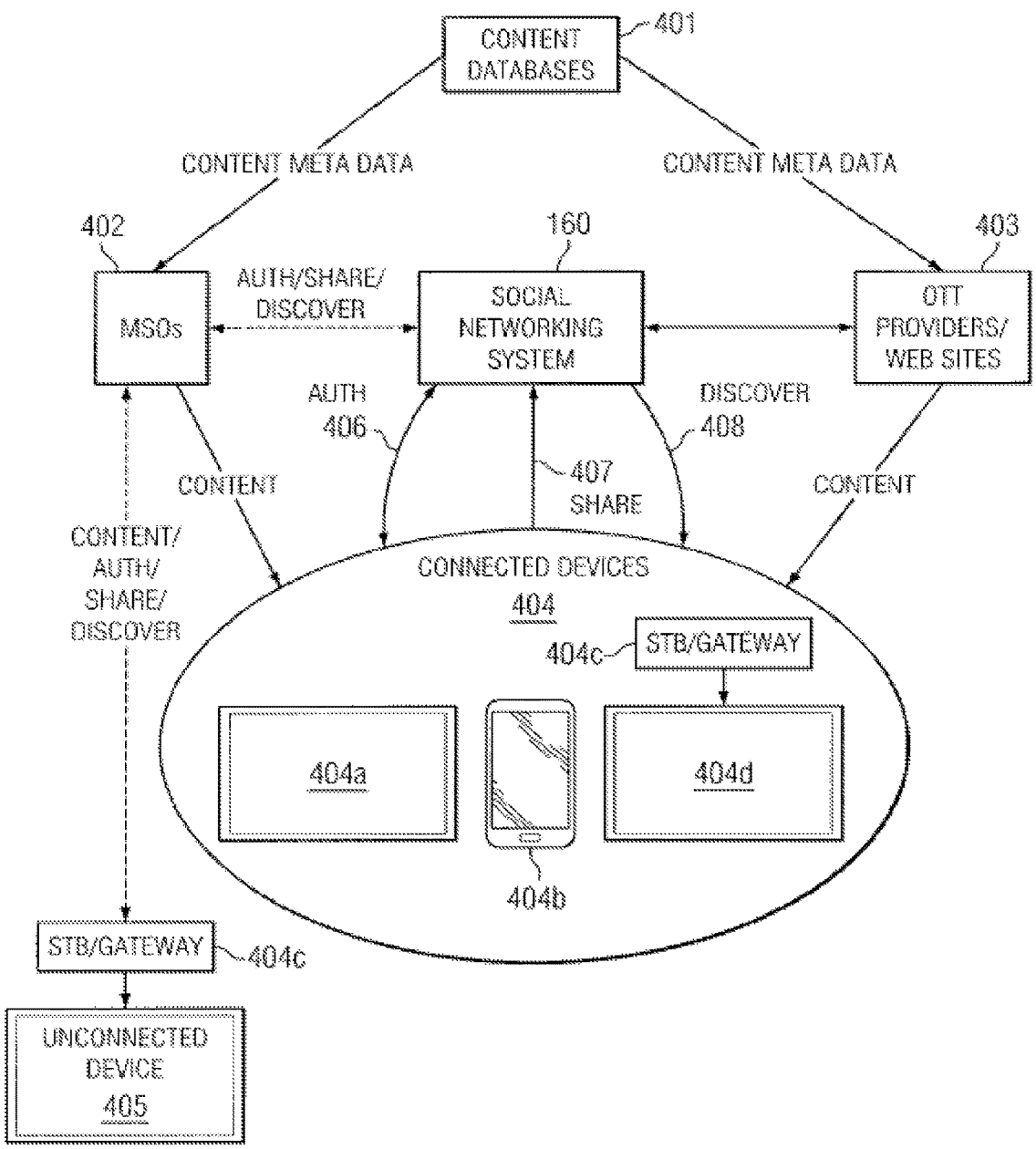
FIG. 4 illustrates an example network environment of an example social-network environment.

FIG. 4 illustrates an example network environment for an example social networking system enabling social TV viewing. Social networking system 160 may be connected via network 110 such as the Internet to a plurality of connected devices 404. Connected devices 404 may include, without limitation, Internet-enabled television sets 404a that connect to network 110 through a local internet service provider (ISP), mobile devices 404b that connect to network 110 through a wireless connection such as a wireless cellular data network, or TVs 404d that connect to the Internet (network 110) through a STB or gateway device 404c. STB/gateway 404c may be any hardware or software that delivers content or possesses a network interface card (NIC) for connecting to a local area network (LAN). For example, STB/gateway 404c may be a cable box provided by an MSO, such as Comcast, Time Warner, AT&T U-verse, or Dish Network. In such examples, STB/gateway 404c may receive content from MSOs 402. As another example, STB/gateway 404c may be a device that streams video from third-party internet sites or services such as OTT providers 403. Examples of such gateways 404c include, without limitation, devices from Roku, Boxee, Apple TV, and Google TV that allow users to access content from OTT providers 403 such as NetFlix, Hulu, Amazon Video, YouTube, and the like. In some embodiments, STB/gateway 404c may be a stand-alone device. In other embodiments, the functionality of STB/gateway 404c may be incorporated into TVs 404d.

In general, a user's social connections or activities can be used to customize or personalize the user's experience with a social TV viewing system such as the system of FIG. 4. Some embodiments may utilize methods to customize a user's experience as described in U.S. patent application Ser. No. 12/759,676 entitled "Token-Activated, Federated Access to Social Network Information," which is incorporated herein by reference. In particular embodiments, connected devices 404 receive content from MSOs 402 or OTT providers 403 while receiving or sending social data to social networking system 160. For example, a user watching a particular TV show or movie on either service may choose to share that he or she is currently viewing the program to his or her friends. Conversely, a user browsing the Electronic Programming Guide (EPG) of an MSO 402 or the content navigator of an OTT provider 403 may be presented with social data including the content that his or her friends on social networking system 160 have watched, are currently watching, or plan to watch. Thus, after exchanging auth messages 406 with social networking system 160 to authenticate the user's social networking identity with his or her connected device 404, connected devices 404 may receive discover messages 408 that identify content being consumed or watched by his or her friends on the social network, and send share messages 407 to inform social networking system 160 of what the user has, is, or plans to watch or "consume." Although FIG. 4 depicts these messages as being sent directly between social networking system 160 and connected devices 404, in particular embodiments, authorization, share, and discover messages 406, 407, and 408 may be exchanged between the provider from which content is being accessed, namely, MSOs 402 and OTT providers 403.

This disclosure contemplates any suitable means of routing messages from viewing devices 404 to social networking system 160.

Although increasingly rare, there are scenarios wherein a particular user of the social networking system has no means of linking his TV or viewing device to social networking system 160. Unconnected devices 405 lack any means of connecting to Internet/network 110. For example, a user may not have a local ISP, and only TV service from an MSO. As another example, a user may have both cable service from an MSO as well as internet access from a local ISP, but his or her STB 404c may not include a NIC. In such configurations, MSO 402 communicates authorization, share, and discover messages with social networking system 160, and unconnected devices 405 communicate, via STB 404c, only with MSOs 402.

In particular embodiments, content may be delivered to user devices 404 and 405 tagged with content identifiers and metadata. For example, Comcast may utilize its own proprietary EPG data format that lists the program name, air date, actors, producer, director, etc. In particular embodiments, content providers 402 and 403 may obtain content identifiers and metadata from content databases 401, such as the Rovi Corporation. Each particular piece of content may be sent from devices 404, or, in particular embodiments, via content providers 402 and 403, as graph data including a graph object and graph action. As previously discussed, social networking system 160 may de-duplicate graph data for the same graph object in a graph data store by comparing various attributes about the content object; for example, name, actors, duration, air date, etc. Thus, social networking system 160 may attribute graph data sent from Hulu that a particular user watched the critically-acclaimed feature film "The Marine" to the same graph object as a user currently watching "The Marine" on Comcast digital cable, irrespective of the source and format of the content metadata.

Figure 5:
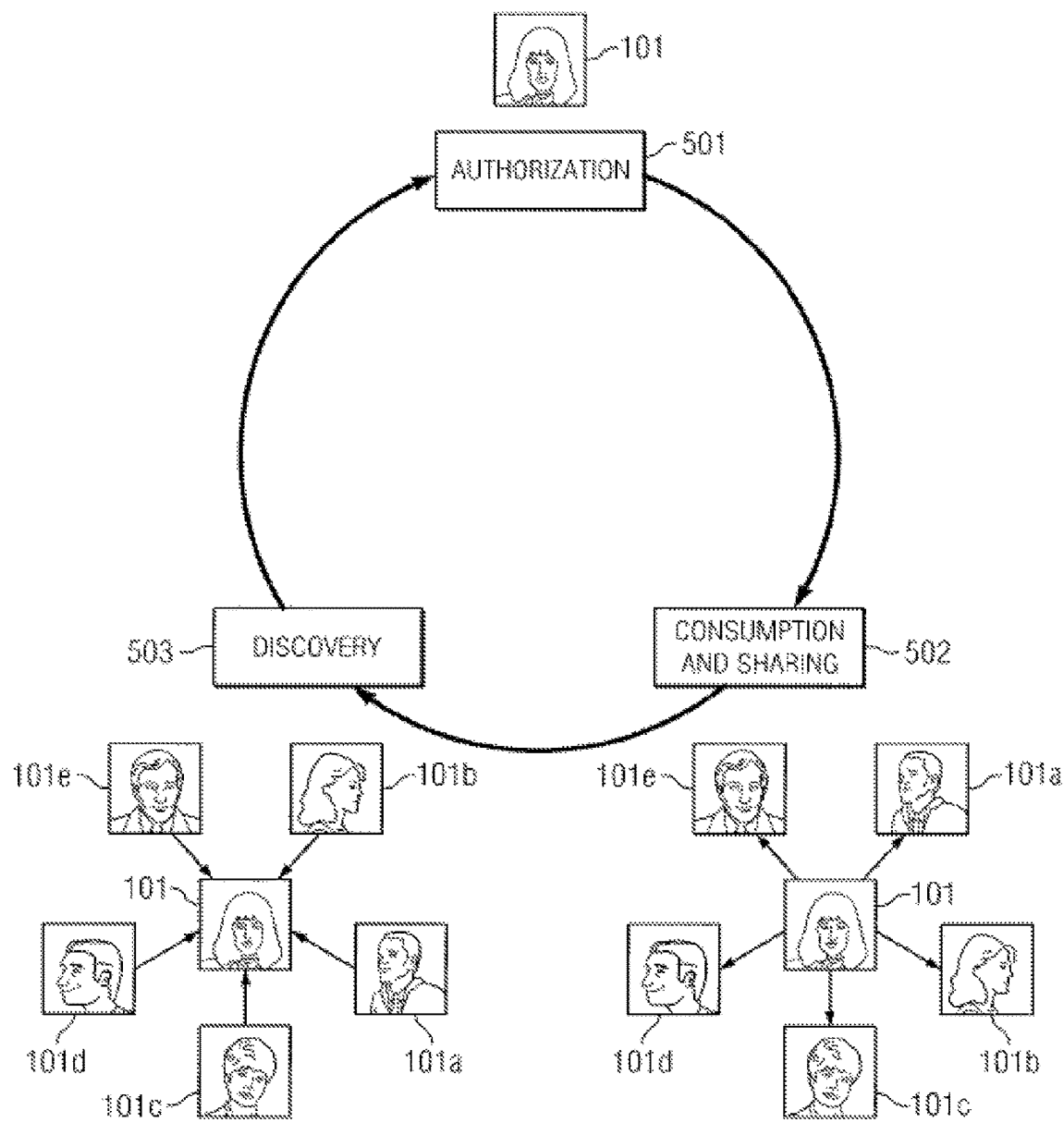
FIG. 5 illustrates an example cycle of sharing of watched video content.

FIG. 5 conceptually illustrates a cycle of sharing of watched video content. At authorization phase 501, a particular user 101 authenticates her social networking user identifier with a device 404 or 405 on which she wishes to browse or view content. As previously discussed, devices 404/405 may be any device on which a user may view content, including a personal computing device including a browser application viewing a website of an OTT provider 403, television, or mobile device running a dedicated application for a content provider. In particular embodiments, a user may associate accounts on multiple external services with his or her social networking identifier, and permit the external services to query the social graph or publish graph data to social networking system 160. For example, user 101 may associate her Hulu account, Netflix account, and ATT U-Verse account with her social networking user identifier and password, thereby sharing all content across multiple content delivery services with the social network, and therefore, her friends on the social network.

At consumption & sharing phase 502, user 101 consumes content by watching or queuing video content, and shares a story of the consumption with social networking system 160. In particular embodiments, user 101 may explicitly share a story of her consumption of the content with social networking system 160 by actively selecting sharing buttons on a user interface. In particular embodiments, sharing occurs passively without user selection. When stories of content consumption by user 101 are sent to social networking system 160, the friends 101a-e of user 101 may view the sharing stories, thereby discovering new content to consume. In particular embodiments, user 101 may specify which of her friends 101a-e may view her consumption stories. In particular embodiments, user 101 may have different privacy settings for actively and passively shared consumption stories At discovery phase 503, user 101 may view consumption stories published by her friends 101a-e. As previously stated, the ability of user 101 to view consumption stories published by the user's friends 101a-e depends on the privacy settings of each individual user 101a-e. Thus, the conceptual framework of FIG. 5 describes a cycle where users are constantly discovering new content shared by their friends, consuming content, and sharing content with their friends. Hence the user experience both on and off social networking system 160 is enhanced.

Figure 6:
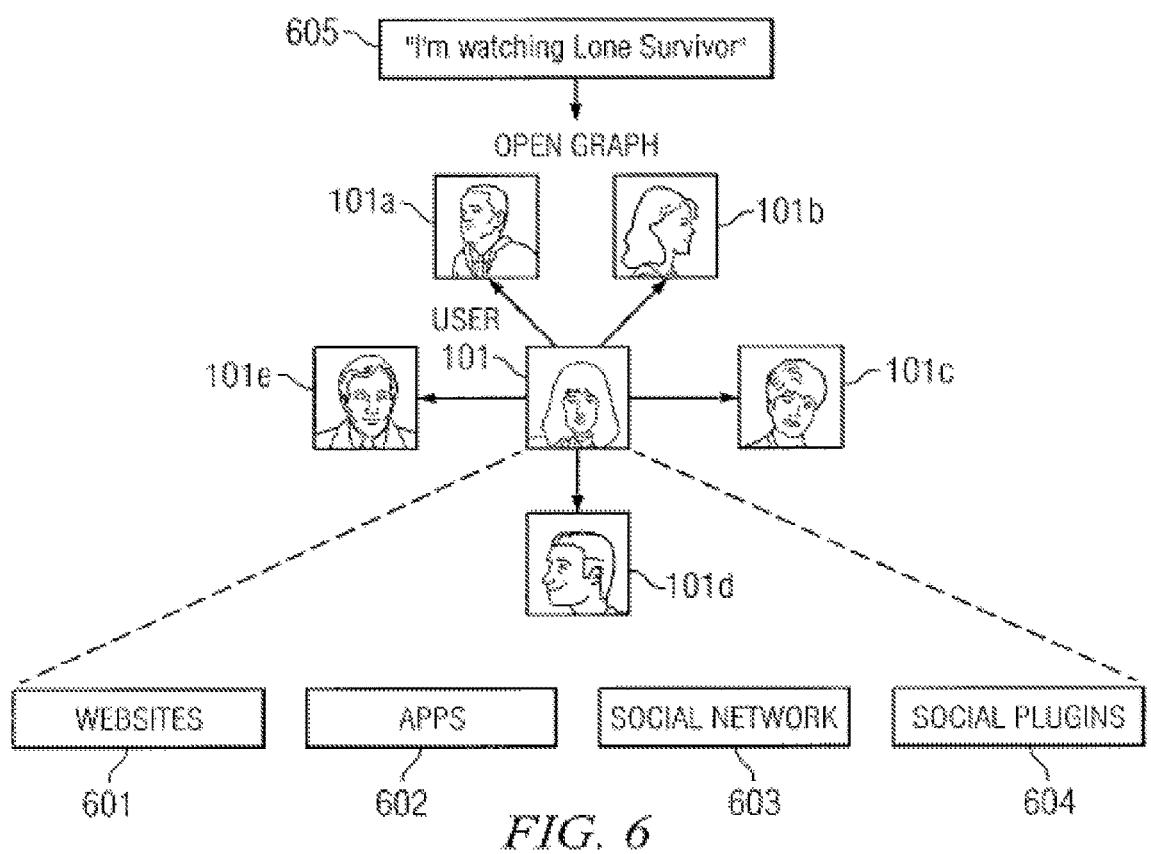
FIG. 6 illustrates example sharing of a story regarding a content object to multiple external services.

FIG. 6 conceptually illustrates publishing a consumption story across multiple distribution channels. In FIG. 6, user 101 shares a statement 605 to social networking system 160 (and consequently, the friends of user 101) that she is currently "watching Lone Survivor."As discussed above, social networking system 160 processes the graph data received from the content service provider from which user 101 is watching "Lone Survivor," and processes the graph data to map it to a single content identifier. The resultant story may be published to a number of channels, such as websites 601, applications ("apps") 602, the social networking system itself 601, and social plug-ins 604.

In particular embodiments, consumption stories are not "pushed" to distribution services 601-604, but rather the service issues a request to social networking system 160 to query the social graph. For example, when a user logs into the clicker website 601 with their social networking ID, a script of a plug-in embedded in the markup language delivered to the user device may issue a query to the social graph containing the user's social networking identifier. In response, social networking system 160 may return all the user's friends consumption stories, and the plug-in may display the consumption stories on a predetermined portion of the page. In particular embodiments, the third party system 170 is responsible for mapping social graph content identifiers received from social networking system 160 to content on its own website.

As another example, when a user accesses a mobile application 602 on his or her mobile device (such as an iPhone or iPad), the application may issue a query to the social graph for consumption stories of the friend whose account is associated with the mobile device. In particular embodiments, social networking system 160 is responsible for the mapping from social graph content identifiers to the content identifiers used by third party system 170. For example, if a user accesses his or her programming guide on her AT&T U-Verse service, the social networking system may return data that associates published consumption stories with programs within the programming guide.

In some embodiments, user 101 may authorize social networking system 160 to directly control the user's DVR or STB. For example, a user's STB/gateway 404c may include a DVR for recording TV shows or other content for later viewing. User 101 may indicate to social networking system 160 one or more preferences regarding to what extent social networking system 160 is authorized to directly control content that is recorded on the user's DVR. In one embodiment, the preferences include an authorization for social networking system 160 to directly program the user's DVR to record TV shows or other content based on what friends 101a-e of user 101 are currently watching or plan to watch. For example, social networking system 160 may determine from posts of friends 101a-e on social networking system

160 that at least one friend is currently watching or planning to watch the show "Lone Survivor." An example of a post may be, "I can't wait to watch Lone Survivor tonight." If user 101 has authorized social networking system 160 to directly control his DVR, social networking system 160 sends instructions to the user's DVR to record the show "Lone Survivor." In certain embodiments, this may include determining a particular start time, channel, and duration for the show "Lone Survivor" and then sending instructions to the user's DVR to begin recording the determined channel at the determined start time and for the determined duration. In some embodiments, the particular start time, channel, and duration of known shows may be determined by communicating with MSOs 402, OTT providers 403, or content databases 401.

In another example, user 101 may indicate an authorization for social networking system 160 to directly program the user's DVR to record TV shows or other content based on the posts of user 101. For example, social networking system 160 may determine from posts of user 101 that the user is interested in the show "Lone Survivor." An example of a post by user 101 may be a comment such as "that show looks interesting" that is made in response to a friend's post about the show "Lone Survivor." If user 101 has authorized social networking system 160 to directly control his DVR based on posts of user 101, social networking system 160 sends instructions to the user's DVR to record the show "Lone Survivor" as described above.

In another example, user 101 may indicate an authorization for social networking system 160 to directly control the user's STB to view TV shows or other content based on content that is shared with user 101 by other users (e.g., friends). For example, social networking system 160 may determine that a friend of user 101 has shared the show "Lone Survivor" with user 101. If user 101 has authorized social networking system 160 to directly control his STB based on content shared by his friends, social networking system 160 may send instructions to the STB of user 101 to view the show "Lone Survivor." This may include, for example, tuning to the appropriate channel to view "Lone Survivor."

In some embodiments, user 101 may indicate a preference that social networking system 160 seeks the user's permission before directly programming the user's DVR. For example, once social networking system 160 determines that at least one friend 101*a-e* of user 101 is currently watching or is planning to watch a particular TV show, social networking system 160 may send an authorization message to user 101 recommending that user 101 records the particular TV show. As a specific example for illustrative purposes only, a particular friend 101*a-e* of user 101 may post the message "I can't wait to watch Lone Survivor tonight" to social networking system 160. Social networking system 160 may then notify user 101 that his friend is planning to watch "Lone Survivor." In certain embodiments, the notification may be via email, text messaging, a post on social networking system 160, or any other appropriate method. The notification may also include a request for user 101 to authorize social networking system 160 to automatically record "Lone Survivor" for the user. For example, the notification may include a hyperlink, button, or any other appropriate method that allows the user to easily approve social networking system 160 to record the show. If the user takes the appropriate steps to authorize social networking system 160 to record the show, social networking system 160 sends instructions to the user's DVR to record the show "Lone Survivor" as discussed above. If the user does not take the appropriate steps to authorize social networking system 160 to record the show, social networking system 160 does not send instructions to the user's DVR to record the show "Lone Survivor."

In certain embodiments, user 101 may authorize one or more friends 101*a-e* to directly control what is recorded on the user's DVR. For example, user 101 may indicate to social networking system 160 that certain friends 101*a-e* are authorized to recommend shows to record on the user's DVR. As a specific example for illustrative purposes only, user 101 may indicate to social networking system 160 that friend 101*a* is authorized to record shows on the DVR of user 101. Friend 101*a* may then interact with social networking system 160 using, for example, a web browser or mobile application to indicate to social networking system 160 that he would like for user 101 to view "Lone Survivor." For example, friend 101*a* may send a message to user 101 telling user 101 the he is planning to watch "Lone Survivor" or inviting or inviting user 101 to watch "Lone Survivor" that friend 101*a* is currently watching. In some circumstances, however, user 101 may not view the message or interact with the invite before the show airs (or after a certain period of time). In such circumstances, social networking system 160 may determine that user 101 will not be able to view or record the show and thus take action to record the show for user 101. To do this, social networking system 160 may determine a particular start time, channel, and duration for the show "Lone Survivor" and then send instructions to the DVR of user 101 to begin recording the determined channel at the determined start time and for the determined duration. As a result, user 101 and friend 101*a* may each view the same show and may subsequently interact via social networking system 160 about the show. Thus, the social interaction between user 101 and friend 101*a* may be improved.

In some embodiments, social networking system 160 may send instructions to a user's STB to pause the current show that is being viewed by user 101 based on interactions of the user with social networking system 160. For example, if user 101 is interacting with social networking system 160 via another client system 130, social networking system 160 may detect this interaction and send instructions to STB/gateway 404*c* of user 101 to pause the current TV show that is being viewed. As one example for illustrative purposes only, user 101 may be interacting with social networking system 160 via a smartphone to, for example, post messages to social networking system 160. If social networking system 160 determines that user 101 has posted to social networking system 160 more than a predetermined number of times within a predetermined period of time, social networking system 160 may determine that user 101 is not currently viewing the particular TV show and thus send instructions to STB/gateway 404*c* of user 101 to pause the TV show. As another example, user 101 may be chatting with friends 101*a-e* using a chat program of social networking system 160. Social networking system 160 may detect that user 101 is interacting with the chat program more than a predetermined amount of time or has typed more than a predetermined amount of text into the chat program and thus send instructions to STB/gateway 404*c* of user 101 to pause any program that is currently being viewed by the user.

In one embodiment, social networking system 160 may send instructions to STB/gateway 404*c* of user 101 to mute or pause the TV when user 101 receives a phone call. For example, a mobile app of the social networking system 160 running on a smartphone of user 101 may detect that user 101 has received a phone call. The mobile app may then send an indication of the phone call to social networking system 160. Social networking system 160 may then send instructions to STB/gateway 404c of user 101 to pause or mute the current TV show. As a result, user 101 may be able to focus on the phone call without having to worry about manually pausing or muting the TV.

Figure 7:
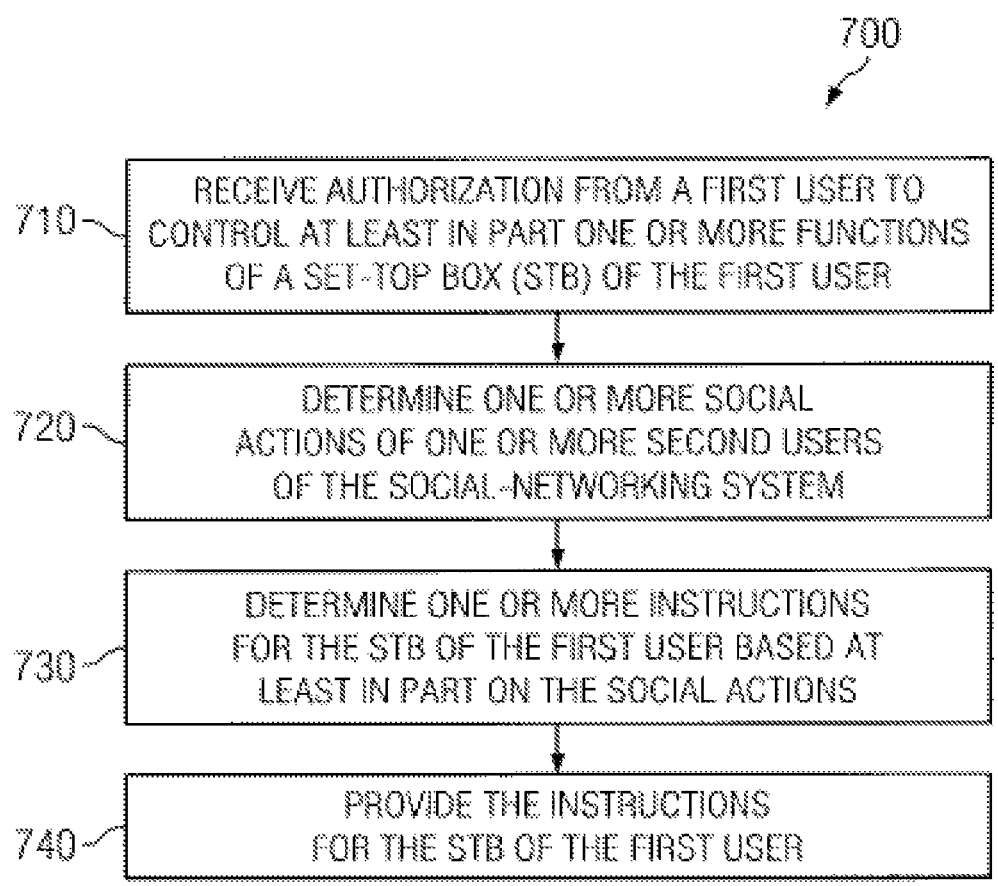
FIG. 7 illustrates an example method for providing instructions to a set-top box (STB) of a user.

FIG. 7 illustrates an example method 700 for providing instructions to a STB of a user based on the user's authorization. Method 700 may begin at step 710 where authorization is received from a first user of a social-networking system to control at least in part one or more functions of a STB of the first user. In some embodiments, the functions may include recording shows or providing setting to record shows, pausing or begin playing shows on a TV, muting or un-muting the volume of the TV, turning on or off closed-captioning on the TV, turning on or off power to the TV, changing the channel being viewed on the TV, and the like. In certain embodiments, the received authorization from the first user may indicate an authorization for the social-networking system to automatically record content on the user's STB based on what the user's friends are currently watching or are planning to watch. In certain embodiments, the received authorization from the first user may indicate an authorization for the social-networking system to recommend to the first user one or more shows to record based on what the user's friends are currently watching or are planning to watch. In certain embodiments, the received authorization from the first user may indicate an authorization for a friend of the first user to directly control content recorded on the first user's STB. In some embodiments, the STB of the first user may refer to STB/gateway 404c described above. In certain embodiments, the STB may include a DVR. In some embodiments, the social-networking system refers to social networking system 160 described above and includes a graph such as social graph 300 described above.

At step 720, one or more social actions of one or more second users of the social-networking system are determined. In certain embodiments, the one or more second users refer to friends 101a-e described above. In some embodiments, the one or more second users are associated with a user node in the social graph of step 710. In some embodiments, the user nodes of the one or more second users are connected to a user node associated with the first user by one or more edges in the social graph. In certain embodiments, the determined social actions of step 720 are related to current or future content consumption by either the second users or the first user. For example, the determined social actions may refer to posts by the first or second users to the social-networking system. In some embodiments, the posts may indicate particular content such as a TV show or movie that the user is currently watching, is planning to watch, is liked by the user, or looks interesting to the user. In certain embodiments, the determined social actions of step 720 refer to any interaction by the first user with the social-networking system. For example, the social actions may refer to interacting with a chat program of the social-networking system, posting messages to the social-networking system, receiving a phone call on a mobile device in which an app of the social-networking system is running, and the like.

At step 730, one or more instructions for the STB of the first user are determined based at least in part on the social actions of step 720. For example, in embodiments where the social actions of step 720 refer to current or future content consumption such as posts that indicate that a user is currently watching or is planning to watch a particular TV show, the determined one or more instructions for the STB may include instructions to record or view the particular TV show. As another example, in embodiments where the social actions of step 720 refer to interactions with the social-networking system such as a user typing in a chat session, the determined one or more instructions for the STB may include instructions to pause the TV show currently being viewed by the user. As yet another example, in embodiments where the social actions of step 720 refer to a mobile app of the social-networking system detecting that a user has received a phone call on a mobile device, the determined one or more instructions for the STB may include instructions to pause or mute the TV show currently being viewed by the user. While particular scenarios and instructions have been discussed, the disclosure anticipates any appropriate instruction being determined based on users' social actions.

At step 740, the instructions determined in step 730 are provided for the STB of the first user. In one embodiment, the instructions are provided by social networking system 160 directly to the DVR or STB of the first user via network 110. In some embodiments, the instructions are provided by social networking system 160 to the DVR or STB of the first user via OTT providers 403 or MSOs 402. In certain embodiments, the instructions are provided to the DVR or STB of the first user via social TV dongle 810 described in more detail below. The disclosure anticipates any appropriate means of providing the instructions to the DVR or STB of the first user. After step 740, method 700 may end.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
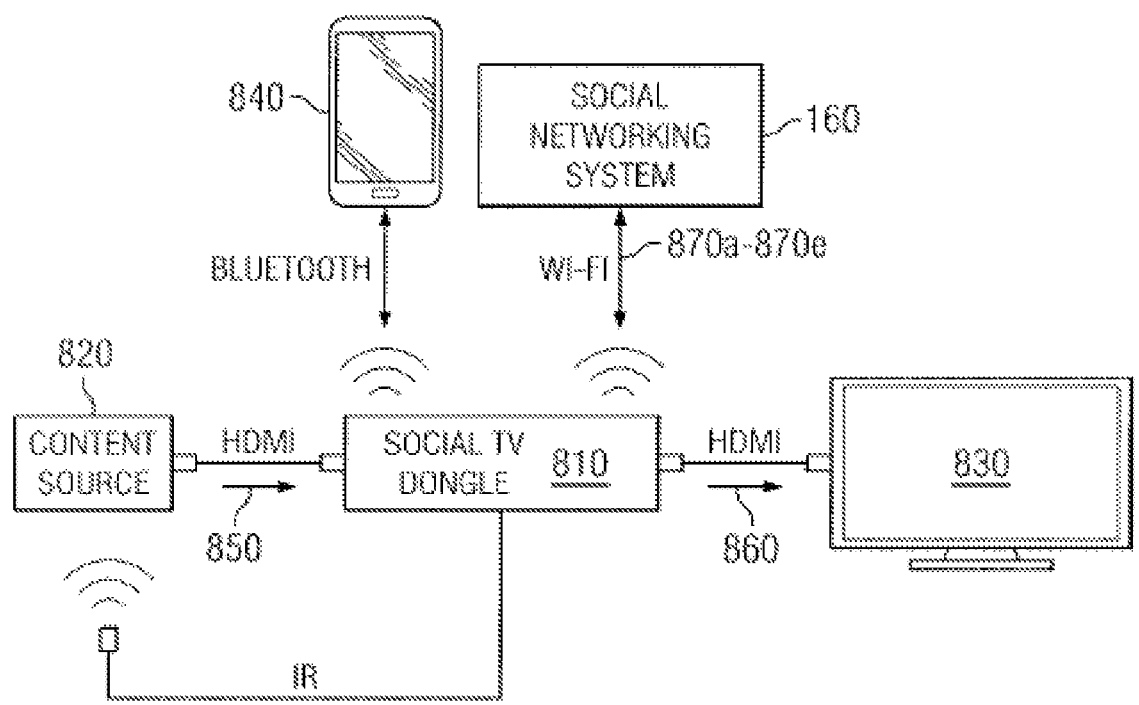
FIG. 8 illustrates an example network environment of an example social TV dongle.

FIG. 8 illustrates a social TV dongle 810 that may be utilized in some embodiments of the network environment of FIG. 4. In general, social TV dongle 810 may be any combination of hardware and software that resides between a content source 820 and a TV 830. Social TV dongle 810 may be communicatively (either bidirectional or unidirectional) coupled to content source 820 and TV 830 via, for example, an HDMI cable or any other appropriate link for sending video streams 850 and 860. Social TV dongle 810 may also be communicatively coupled to one or more mobile devices 840, social networking system 160, and OTT providers 403 such as NetFlix, Hulu, Amazon Video, YouTube, Spotify, and the like. For example, social TV dongle 810 may be wirelessly coupled to mobile device 840 via BLUETOOTH, NFC, or any other appropriate wireless communications protocol. Social dongle 810 may also be communicatively coupled to social networking system 160 and OTT providers 403 via for example, WiFi, Ethernet, or an HDMI cable. In some embodiments, social TV dongle 810 may send instructions via IR to content source 820. In certain embodiments, social TV dongle 810 may be configured as a WiFi access point. In some embodiments, social TV dongle 810 may be communicatively coupled to a network such as the internet via an HDMI cable (e.g., an HDMI cable coupled to content source 820 or TV 830.)

In general, social TV dongle 810 receives a video stream 850 from content source 820 and outputs a modified video stream 860 to TV 830. The modified video stream 860 may include social content from social networking system 160. For example, social TV dongle 810 may overlay advertisements from social networking system 160 onto video stream 850 in order to create modified video stream 860 for display on TV 830. As another example, social TV dongle 810 may overlay (full screen or partial screen) notifications, newsfeeds, tickers, or any other information from social networking system 160 onto video stream 850 in order to create modified video stream 860 for display on TV 830. The modified video stream 860 may also include content from OTT providers 403. For example, TV dongle 810 may overlay videos from NetFlix onto video stream 850 in order to create modified video stream 860 for display on TV 830. A particular embodiment of social TV dongle 810 is discussed in more detail below in reference to FIG. 9. A particular embodiment of how social TV dongle 810 creates modified video stream 860 for display on TV 830 is discussed in more detail below in reference to FIG. 11. In some embodiments, social TV dongle 810 may not be connected to any content source 820 and may instead serve as the only input to TV 830.

Content source 820 may be any device that outputs video stream 850 for display on a TV 830. For example, content source 820 may be a STB or DVR of user 101 such as STB/gateway 404c discussed above. In some embodiments content source 820 may be a gaming console such as an XBOX, Wii, or PLAYSTATION. In some embodiments, content source 820 may be any device from Roku, Boxee, Apple TV, or Google TV that allows users to access content from OTT providers 403 such as NetFlix, Hulu, Amazon Video, YouTube, and the like.

TV 830 may be any device capable of displaying content such as video streams from content source 820 to user 101. For example, TV 830 may be connected device 404, TV 404d, or unconnected device 405 discussed above. Mobile device 840 may be any mobile computing device of user 101 such as a smartphone, tablet computer, laptop computer, and the like. In some embodiments, mobile device 840 is mobile device 404b discussed above.

In operation, social TV dongle 810 receives video stream 850 that is output from content source 820. Social TV dongle 810 creates modified video stream 860 from video stream 850 for display on TV 830. To create modified video stream 860, some embodiments of social TV dongle 810 overlay social content 870 from social networking system 160. For example, social TV dongle 810 may receive video stream 850 associated with a TV show via an HDMI cable from content source 820. Social TV dongle 810 may overlay social content 870 on top of video stream 850 according to instructions received from social networking system 160 before outputting modified video stream 860 to TV 830. As a result, user 101 may be able to view social content 870 from social networking system 160 on TV 830 while watching the TV show. Social content 870 may include an advertisement 870a, notification 870b, newsfeed 870c, ticker 870d, chat session 870e, or any other appropriate social content from social networking system 160. Various embodiments of social content 870 that may be displayed on TV 830 on top of a TV show are discussed in more detail below. While various embodiments are discussed in reference to viewing a TV show on TV 830, it should be understood that social content 870 from social networking system 160 may be displayed by social TV dongle 810 on TV 830 on top of any content (e.g., a video game, a movie, a blank screen, etc.).

In some embodiments, social TV dongle 810 may overly advertisements 870a from social networking system 160 on top of video stream 850 to create modified video stream 860 for display on TV 830. In some embodiments, advertisements 870a may take up the entire screen of TV 830. In other embodiments, advertisements 870a may take up only a portion of the screen of TV 830. Advertisements 870a may be any appropriate advertisement. As one example, advertisement 870a may a full-screen advertisement from social networking system 160 that replaces a broadcast commercial in video stream 850 from, for example, MSO 402 or OTT provider 403. In such embodiments, social TV dongle 810 may analyze incoming video stream 850 in order to determine when a broadcast commercial in the video stream begins. Then, social TV dongle 810 may overlay a full-screen advertisement 870a over the commercial. In one embodiment, advertisement 870a may be for a product that is currently being displayed in a TV show. As an example for illustrative purposes only, consider a TV show in which the product "Mega-Cola" is shown in a particular scene. Social TV dongle 810 may receive an advertisement form social networking system 160 for Mega-Cola and display a small advertisement for Mega-Cola while the product is being shown in the scene. Particular embodiments of determining product placement in a TV show are discussed further below in reference to FIG. 19.

In some embodiments, social networking system 160 may sell advertisements based on what users 101 have explicitly indicated they will watch or record. For example, social networking system 160 may analyze posts to social networking system 160 to determine which users have indicated they are planning to watch a particular show. In some embodiments, social networking system 160 may determine what shows users 101 have instructed a DVR to record. Social networking system 160 may then sell advertisements which are targeted to the group of users that the social networking system 160 determined are planning to watch the particular show.

In some embodiments, social TV dongle 810 may overly notifications 870b from social networking system 160 on top of video stream 850 to create modified video stream 860 for display on TV 830. For example, if one or more friends 101a-e of user 101 have posted messages to social networking system 160 about a particular show, the messages may be displayed on TV 830 while the user is watching the show. In some embodiments, notifications 870b may be relevant to or related to the current show being viewed on TV 830. For example, if a particular friend of user 101 has posted "this episode of Lone Survivor is really good tonight," a notification 870b may appear on TV 830 of user 101 while the show "Lone Survivor" is being viewed. In some embodiments, notification 870b may indicate one or more of the friend's name, the friend's avatar, and the friend's message. For example, notification 870b may include "Friend A says: this episode of Lone Survivor is really good tonight."

In certain embodiments, messages from friends 101a-e are shown to user 1010 at the point in a show in which the messages were posted, regardless of whether the show is being viewed in real-time or time-delayed. To accomplish this, certain embodiments time-stamp posts to social networking system 160 with a time that is relative to a particular show. For example, if a friend 101a posts a comment about a particular show fifteen minutes after the beginning of the show, the comment may be time-stamped with a time that indicates it was posted fifteen minutes into the show. Then, if another user 101 is viewing a recorded version of the same show (i.e., a time-delayed version), the friend's comment may appear at the same point in the show (i.e., fifteen minutes after the beginning of the show) for user 101.

In embodiments where user 101 and friend 101a are both viewing the same live show, social TV dongle 810 may display to user 101 posts by friend 101a about the show immediately after they are posted.

In one embodiment, social TV dongle 810 may overlay newsfeed 870c, ticker 870d, and chat session 870e from social networking system 160 on top of a TV show being viewed by user 101 on TV 830. Newsfeed 870c may refer to any list of social content from social networking system 160 for user 101. For example, newsfeed 870c may include friends' posts, friends' status updates, friends' photo, friends' likes, or any other social content from social networking system 160 according to social graph 300. Ticker 870d may refer to real-time updates of stocks, sports scores, or any other data of user 101. Chat sessions 870e may include messages exchanged between user 101 and one or more friends 101a-e using, for example, a chat interface on a website or mobile device 840. Particular embodiments of chat sessions are discussed in more detail below in reference to FIG. 23.

In some embodiments, social content 870 may be filtered to only display items that are relevant to the show the user is watching. For example, only content in newsfeed 870c of user 101 that is relevant to the particular show user 101 is currently watching may be displayed on top of the show. As another example, only content in ticker 870d that is relevant to the current sport that user 101 is viewing may be displayed on TV 830. For example, if user 101 is currently viewing a baseball game, only baseball scores or baseball-related information from ticker 870d may be displayed on top of the current baseball game being viewed by user 101.

As discussed above, social networking system 160 may overlay broadcast commercials with advertisements 870a from social networking system 160. In some embodiments, social networking system 160 may provide a bidding scheme for displaying advertisements 870a from social networking system 160 for users on TV 830. For example, social networking system 160 may allow MSO 402 to submit a bid to social networking system 160 to display broadcast advertisements on TV 830 instead of advertisements 870a from social networking system 160. Then, based on the bid of MSO 402, social networking system 160 may determine whether or not to overlay a broadcast commercial with advertisements 870a from social networking system 160. As one example, if the bid from MSO 402 is not greater than a predetermined price, social networking system 160 may completely overlay broadcast commercials with advertisements 870a from social networking system 160.

In some embodiments, user 101 may "check in" with social networking system 160 using social TV dongle 810. In some embodiments, user 101 may "check in" by interacting with social TV dongle 810 using mobile device 840 to indicate the current location of user 101 to social networking system 160. For example, user 101 may press a "check in" button displayed in a mobile app of social networking system 160 on mobile device 840 when user 101 is in proximity to social TV dongle 810. Social TV dongle 810 may then send information to social networking system 160 that indicates that user 101 has checked in at home. As a result, a post such as "User 101 has checked in at home" may be posted to social networking system 160 for user 101 and made available to friends 101a-e of user 101. In another example, user 101 may visit the home of friend 101a and press a "Check in" button displayed in a mobile app of social networking system 160 on mobile device 840 when user 101 is in proximity to the social TV dongle 810 of friend 101a. The social TV dongle 810 of friend 101a may then send information to social networking system 160 that indicates that user 101 has checked in at the home of friend 101a. As a result, a post such as "User 101 has checked in at the home of friend 101a" may be posted to social networking system 160 for user 101 and made available to friends 101a-e of user 101.

Figure 9:
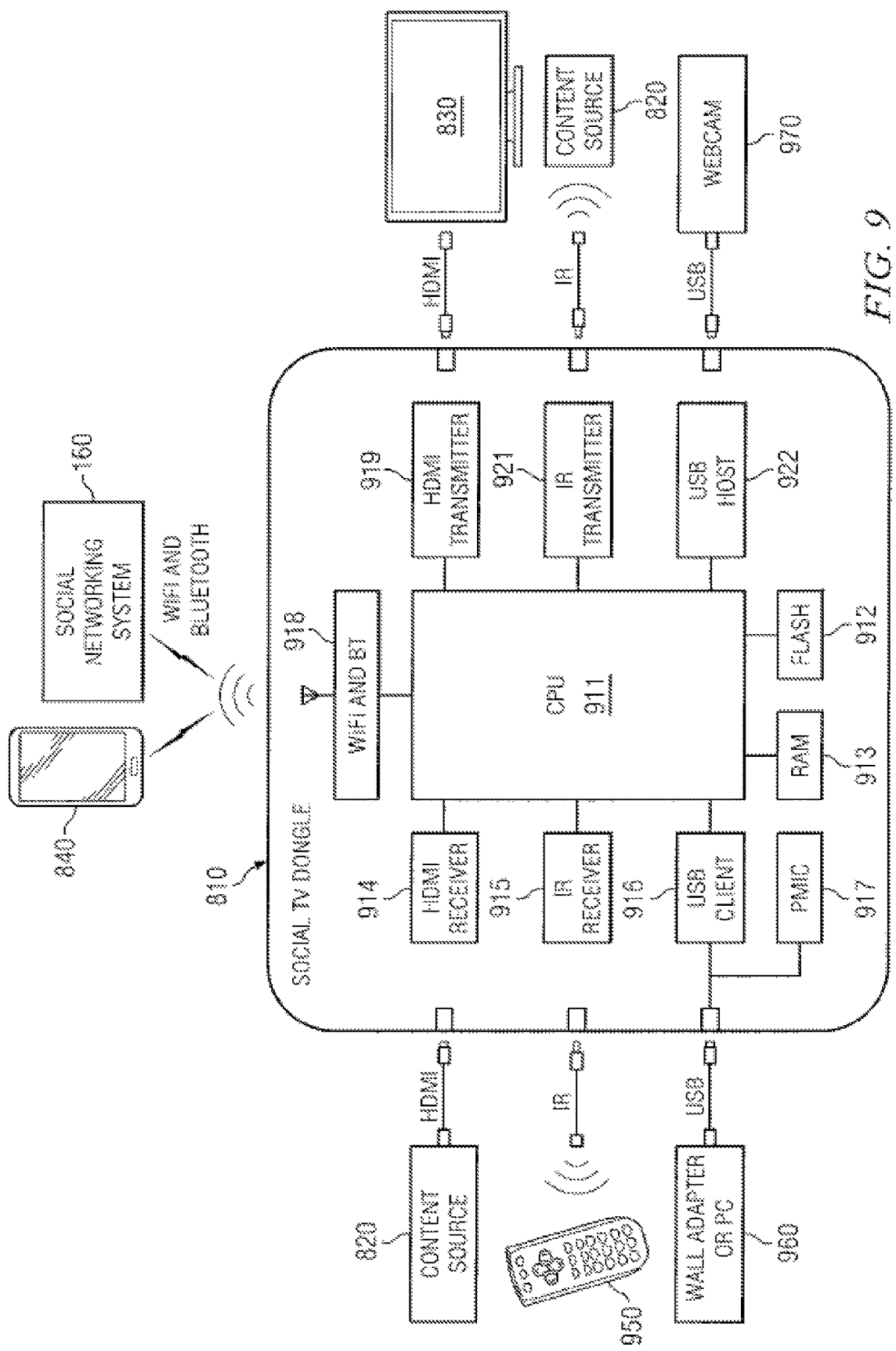
FIG. 9 illustrates an example social TV dongle.

FIG. 9 illustrates a particular embodiment of social TV dongle 810. In this embodiment, social TV dongle 810 includes a CPU 911, flash memory 912, RAM 913, HDMI receiver 914, IR receiver 915, USB client 916, power management IC (PMIC) 917, WiFi/BLUETOOTH transceiver 918, HDMI transmitter 919, IR transmitter 921 and USB host 922. HDMI receiver 914 receives video stream 850 from content source 820 via an HDMI cable. IR receiver 915 receives IR communications from a remote control device 950. USB client 916 communicates with any device such as a PC via USB. PMIC 917 provides power to social TV dongle 810 via a USB cable plugged into a wall adapter or PC 960. WiFi/BLUETOOTH transceiver 918 communicates with mobile device 840 and social networking system 160 using the WiFi and BLUETOOTH, respectively. HDMI transmitter 919 communicates modified video stream 860 to TV 830 via an HDMI cable. IR transmitter 921 communicates IR instructions to STB/gateway 404c. USB host 922 provides USB communications to devices such as a web cam 970. Devices 914-922 are communicatively coupled to CPU 911 via, for example, a bus. CPU 911 controls the operation of social TV dongle 810 and performs the functions of social TV dongle 810 described herein. While a particular embodiment of social TV dongle 810 is illustrated in FIG. 9, social TV dongle 810 may include any appropriate components in any appropriate configuration. In certain embodiments, social TV dongle 810 may be fully or partially implemented in SW. In some embodiments, social TV dongle 810 may be a low-cost implementation that includes a minimal amount of memory or processing power.

In some embodiments, social TV dongle 810 may be configured (e.g., during an initial or installation process, etc.) by an appropriate means. In some embodiments, a quick response (QR) code may be provided by social networking system 160 in order to configure social TV dongle 810. In some embodiments, user 101 may simply scan the QR code using, for example, mobile device 840, in order to configure social TV dongle 810. In some embodiments, audio fingerprinting may be utilized in order to configure social TV dongle 810. For example, social TV dongle 810 may utilize voice recognition to identify user 101 and configure social TV dongle 810 accordingly.

Figure 10:
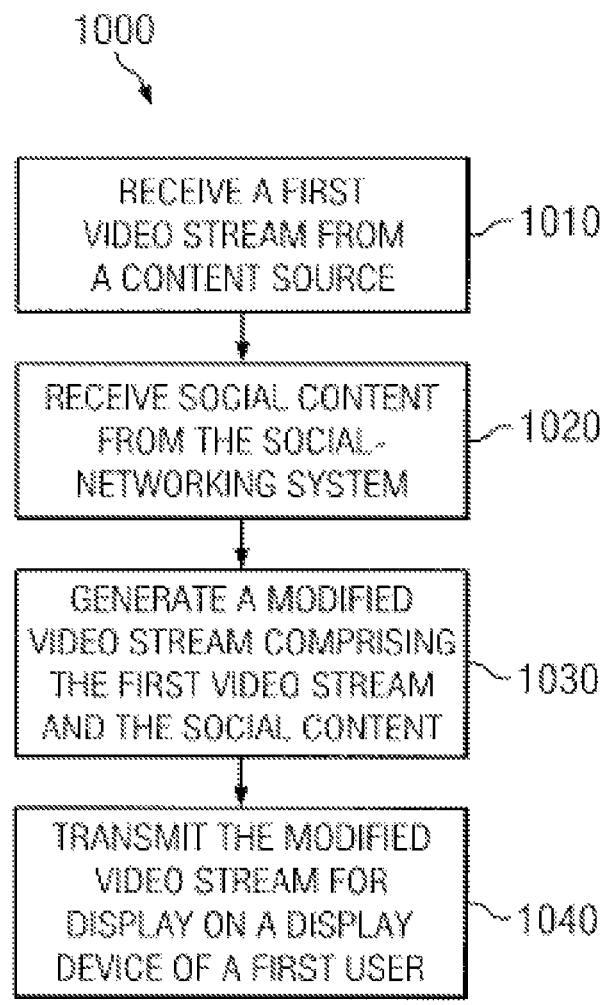
FIG. 10 illustrates an example method for concurrently displaying social content with content being viewed on a TV.

FIG. 10 illustrates an example method 1000 for concurrently displaying social content with shows being viewed on a TV. Method 1000 may begin at step 1010, where a broadcast video stream is received at a social TV dongle from a content source using a first interface. In some embodiments, the first interface may refer to HDMI receiver 914. In some embodiments, the broadcast video stream refers to video stream 850 above. In certain embodiments, the broadcast video stream is received at social TV dongle 810. In some embodiments, the content source may refer to content source 820 above. The broadcast video stream may include broadcast TV shows, recorded shows or movies from a DVR, video game data, pay-per-view movies, content from OTT provider 403, or any other content to be viewed on a TV such as TV 830.

At step 1020, social content is received by the social TV dongle from a social-networking system such as social networking system 160 using a second interface. In certain embodiments, the second interface may refer to WiFi/BLU- ETOOTH transceiver 918. In some embodiments, the social content is received at a social TV dongle 810. In certain embodiments, the social content may refer to stories, messages, posts, notifications, advertisements, newsfeeds, tickers, chat messages, or any other information from the social-networking system. In some embodiments, the social content is related to a social graph such as social graph 300. In some embodiments, the social content is filtered to include only social content that is relevant to what is currently being viewed on a TV such as TV 830.

At step 1030, a modified video stream is generated by the social TV dongle using the broadcast video stream received in step 1010 and at least a portion of the social content received in step 1020. In some embodiments, the modified video stream is modified video stream 860 discussed above. In certain embodiments, the modified video stream is a combination of the first video stream and the social content.

At step 1040, the modified video stream is sent for display on a display device of a first user by the social TV dongle using a third interface. In certain embodiments, the third interface may refer to HDMI transmitter 919. In some embodiments, the modified video stream is sent by social TV dongle 810 to a TV such as TV 830. In other embodiments, the modified video stream is sent to any other appropriate display device such as a computer monitor, a tablet computer, and the like. After step 1040, method 1000 may end.

Particular embodiments may repeat one or more steps of the method of FIG. 10 where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
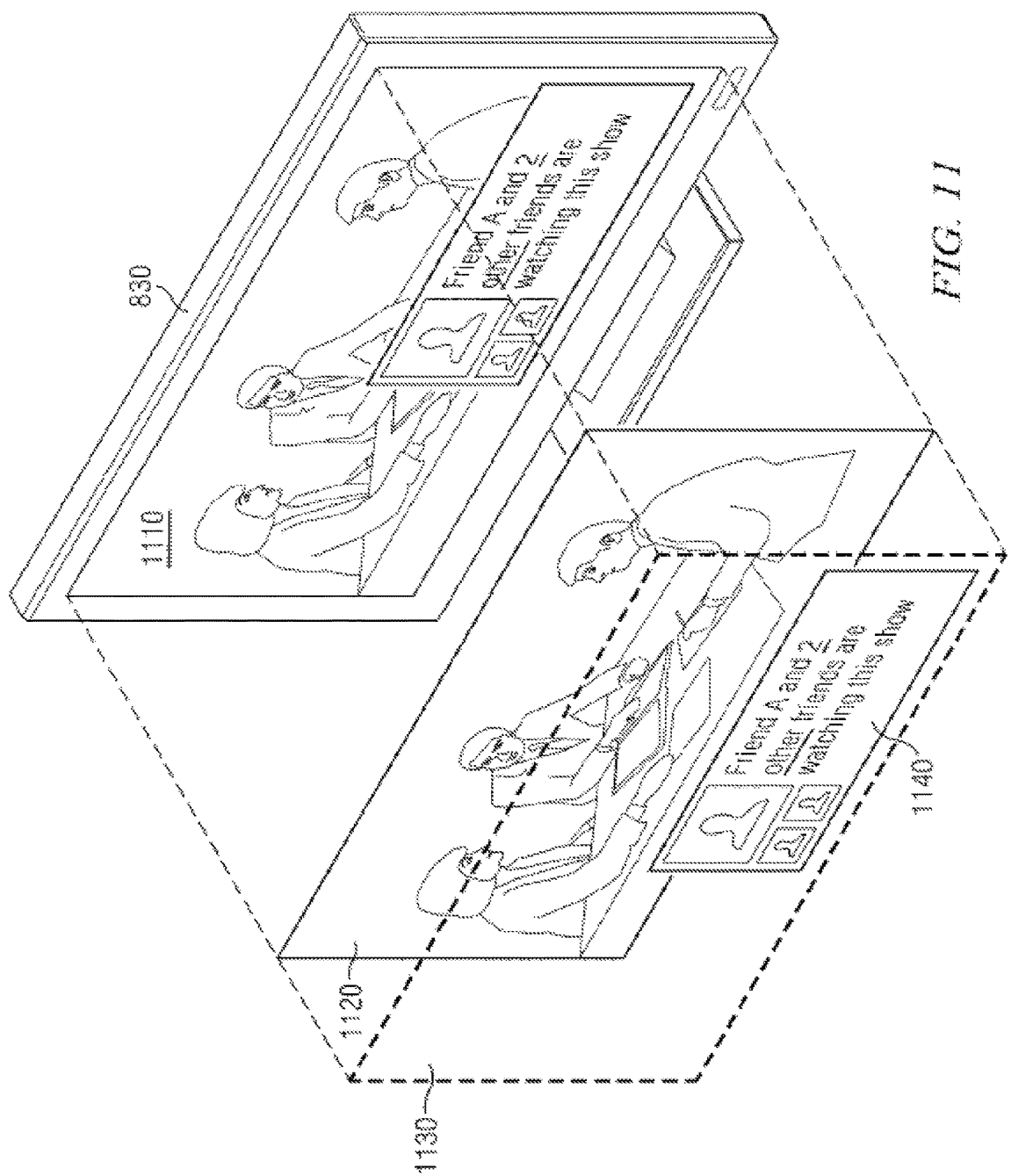
FIG. 11 illustrates an example modified video stream.

FIG. 11 illustrates how particular embodiments of social TV dongle 810 may create modified video stream 860 for display on TV 830. In this embodiment, social TV dongle 810 receives video stream 850 from content source 820. Social TV dongle 810 may then decode incoming video stream 850 into a series of incoming video frames 1120. Social TV dongle 810 then overlays top frame 1130 onto incoming video frame 1120 to create a combined output frame 1110. Combined output frames 1110 are then sent as a modified video stream 860 for display on TV 830. Various embodiments of top frame 1130 are discussed in more detail below.

In some embodiments, top frame 1130 is a composite overlay image that is placed on top of incoming video frame 1120. In certain embodiments, top frame 1130 is a transparent window that includes a social area 1140. Social area 1140 may be a painted portion of top frame 1130 and may comprise a portion of top frame 1130 (e.g., a small corner) or may fill up the entire top frame 1130. Social area 1140 may be opaque or semi-transparent.

In some embodiments, social area 1140 may be painted directly on incoming video frame 1120. In such embodiments, social TV dongle 810 may not create top frame 1130. Instead, any appropriate technology such as frame buffering may be utilized to draw social area 1140 directly on incoming video frame 1120. By drawing social area 1140 directly on incoming video frame 1120, social TV dongle 810 may create output frame 1110 for display on TV 830.

In some embodiments, social area 1140 may include any social content from social networking system 160 such as social content 870 discussed above. For example, social area 1140 may include advertisements 870*a*, notifications 870*b*, newsfeeds 870*c*, tickers 870*d*, hat sessions 870*e*, or any other appropriate social content from social networking system 160. In the illustrated embodiment of FIG. 11, for example, social area 1140 includes social content from social networking system 160 indicating that Friend A and two other friends of user 101 are currently watching the show being viewed by user 101. In some embodiments, social area 1140 may include a facepile (e.g., multiple photos of users of social networking system 160).

In some embodiments, social TV dongle 810 may deduce what is important in incoming video frame 1120 before determining where to place social area 1140. In general, social TV dongle 810 may perform this function in order to avoid placing social area 1140 on top of an important area of the viewing screen. For example, if user 101 is viewing a singing competition show in which a voting telephone number is displayed on the TV screen, social TV dongle 810 may detect the telephone number and avoid placing social area 1140 on top of the telephone number or any location that would obstruct the telephone number. As another example, if user 101 is viewing a sporting event in which sports scores are scrolled along one edge of the TV screen, social TV dongle 810 may detect the scrolling scores and avoid placing social area 1140 on top of the scores or any location that would obstruct the scores. Various methods of how social TV dongle 810 may determine important areas of incoming video frame 1120 are discussed below.

In some embodiments, social TV dongle 810 may determine important areas of incoming video frame 1120 by determining static portions of the display. For example, social TV dongle 810 may compare two or more successive incoming video frames 1120 in order to determine portions of the incoming video frames 1120 that have not changed or have changed less than a predetermined amount. Social TV dongle 810 may determine that the static portions are important areas and therefore may avoid placing social area 1140 on top of the static areas. For illustrative purposes only, consider a televised sporting event in which an area of the screen is dedicated to displaying the score. This dedicated scoreboard typically would change very little, if any, between successive incoming video frames 1120. Social TV dongle 810 may determine the location of the scoreboard on the screen by comparing successive incoming video frames 1120. Social TV dongle 810 may then avoid overlapping the scoreboard with any portion of social area 1140.

In some embodiments, social TV dongle 810 may determine important areas of incoming video frame 1120 by determining any text shown on the display. For example, social TV dongle 810 may analyze incoming video frame 1120 in order to determine if any portion contains text. In some embodiments, this may be accomplished using optical character recognition (OCR) or any other appropriate technique. Social TV dongle 810 may then avoid placing social area 1140 on top of the determined text. For illustrative purposes only, consider a televised singing competition in which a telephone number is displayed on the screen. Social TV dongle 810 may utilize, for example, OCR on incoming video frames 1120 in order to determine that a telephone number is being displayed and the location on the screen of the telephone number. Social TV dongle 810 may then avoid overlapping the telephone number with any portion of social area 1140.

In some embodiments, social TV dongle 810 may determine important areas of incoming video frame 1120 by determining whether any faces are shown on the display. For example, social TV dongle 810 may analyze incoming video frame 1120 using any appropriate facial recognition technology in order to determine if any portion of the screen contains a face. Social TV dongle 810 may then avoid placing social area 1140 on top of any of the determined faces. For illustrative purposes only, consider a televised debate in which the faces of multiple people are displayed on the screen. Social TV dongle 810 may utilize, for example, facial recognition software on incoming video frames 1120 in order to determine that multiple faces are being displayed on the screen and the location on the screen of the faces. Social TV dongle 810 may then avoid overlapping any of the faces with any portion of social area 1140.

In some embodiments, social TV dongle 810 may determine important areas of incoming video frame 1120 using metadata provided by content producers of the program being viewed. For example, social TV dongle 810 may analyze metatdata embedded in incoming video frame 1120 that indicates important areas of the screen. As another example, social TV dongle 810 may receive metadata indicating important areas of the screen for shows from content producers such as MSOs 402. Social TV dongle 810 may then avoid placing social area 1140 on top of any of the important areas as indicated by the metadata.

In certain embodiments, the shape or location of social area 1140 may be dynamically adjusted based on the determined important areas of the screen discussed above. For example, if social area 1140 is displayed at a first location at a first time in a show, it may be resized or moved at a later time in the show if social TV dongle 810 determines that the social area 1140 is overlapping an important area of the screen. For illustrative purposes only, consider a televised singing competition in which a contestant performs during a first portion of the show and then a telephone number to vote for the contestant is displayed on the screen at a later point in the show. If social area 1140 is displayed in the lower center portion of the screen during the contestant's performance during the first portion of the show (e.g., to avoid overlapping the singer's face), it may overlap the telephone number when it is displayed later in the show. To avoid this, social TV dongle 810 may detect that a new important area of the screen has appeared (i.e., the telephone number) and either adjust the size or shape of social area 1140 to avoid the telephone number, or move social area 1140 to avoid the telephone number.

Some embodiments of social TV dongle 810 may resize social area 1140 to mask or hide content in incoming video frames 1120. For example, incoming video frames 1120 may include an EPG from MSO 402. Social TV dongle 810 may detect the portion of the screen occupied by the EPG using, for example, any of the techniques described above for determining important areas of the screen. Social TV dongle 810 may then resize or move social area 1140 to mask the EPG.

In certain embodiments, incoming video frame 1120 may be shrunk or resized in output frame 1110. For example, incoming video frame 1120 may be shrunk to only occupy a portion of output frame 1110 while social area 1140 occupies the remaining output frame 1110. This may be utilized, for example, by social TV dongle 810 to display all or a portion of a programming guide that includes social content from social networking system 160.

Some embodiments of social TV dongle 810 may mask blank or corrupted incoming video frames 1120 due to slow channel switching of content source 820. For example, some STBs are notoriously slow at switching channels. This typically results in the extended display of blank or corrupted frames of video. Some embodiments of social TV dongle 810 may mask this effect and appear to speed up the latency of changing channels. To accomplish this, some embodiments of social TV dongle 810 may fade top frame 1130 in and out of being opaque when social TV dongle 810 detects a channel change in incoming video stream 850. For example, when social TV dongle 810 detects a channel change in incoming video stream 850, it may fade the entire top frame 1130 to black. Then, after a predetermined period of time or when social TV dongle 810 detects that the channel change in complete, top frame 1130 may be faded from black back to transparent. In some embodiments, social TV dongle 810 may display social area 1140 on top frame 1130 while it is opaque. As a result, a user may perceive that the change in channels occurred faster than it actually occurred.

In some embodiments, social area 1140 may include reminders from a calendar associated with user 101. For example, user 101 may store calendar events with social networking system 160. Social networking system 160 may cause reminders for calendared events to appear in social area 1140 at any appropriate time. In some embodiments, social networking system 160 may cause TV 830 to turn on in order to display a calendar reminder in social area 1140.

Figure 12:
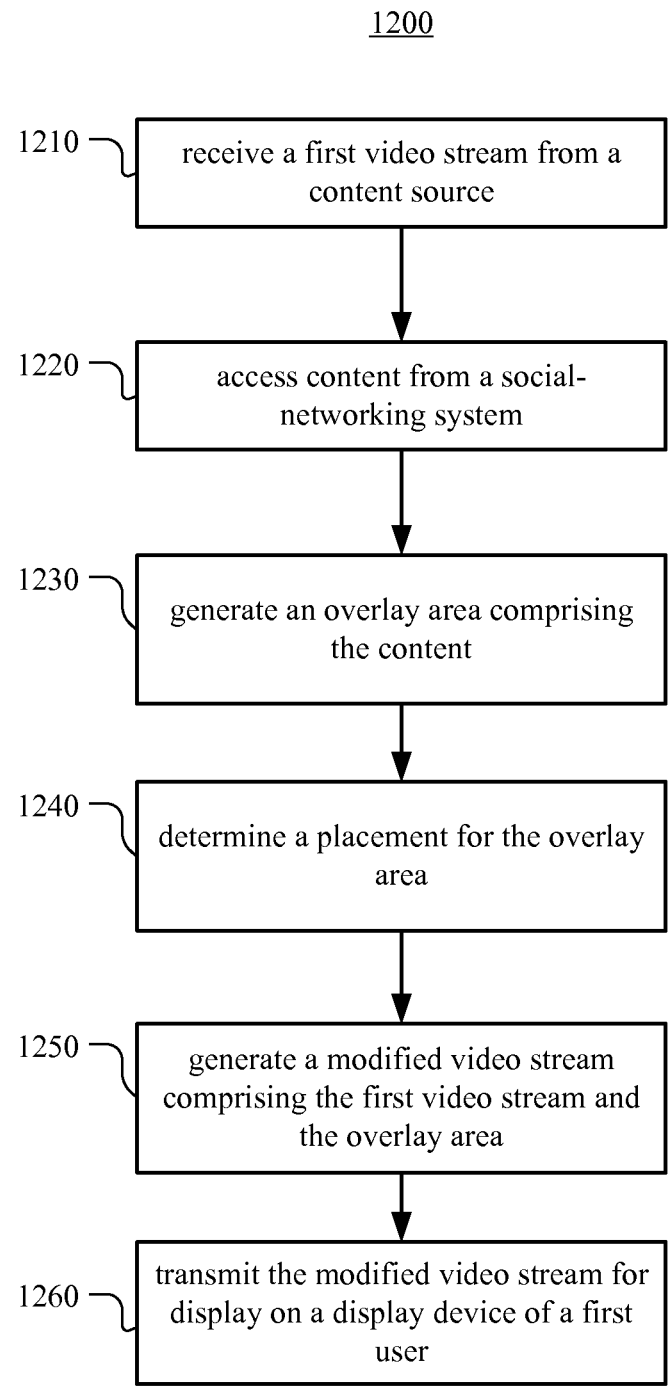
FIG. 12 illustrates an example method for displaying social content on top of content currently being viewed on a TV.

FIG. 12 illustrates an example method 1200 for displaying social content on top of shows currently being viewed on a TV. Method 1200 may begin at step 1210, where a first video stream is received from a content source. In some embodiments, the video stream refers to video stream 850 above. In certain embodiments, the video stream is received at social TV dongle 810. In some embodiments, the content source may refer to content source 820 above. The video stream may include broadcast TV shows, recorded shows or movies from a DVR, video game data, pay-per-view movies, content from OTT provider 403, or any other content to be viewed on a TV such as TV 830.

At step 1220, content from a social-networking system such as social networking system 160 is accessed. In some embodiments, the content is received at a social TV dongle 810. In certain embodiments, the content may refer to social content such as stories, messages, posts, notifications, advertisements, newsfeeds, tickers, chat messages, or any other information from the social-networking system. In some embodiments, the content is related to a social graph such as social graph 300. In some embodiments, the social content is filtered to include only content that is relevant to what is currently being viewed on a TV such as TV 830. In some embodiments, the content may be content (e.g., video content) from OTT provider 403.

At step 1240, an overlay area is generated. In some embodiments, the overlay area includes the content accessed in step 1220 such as stories, messages, posts, notifications, advertisements, newsfeeds, tickers, chat messages, or any other information from the social-networking system. In some embodiments, the generated overlay area may refer to social area 1140 described above.

At step 1250, a placement for the overlay area of step 1240 is determined. In some embodiments, the placement may be based on a determination of important areas of the first video stream of step 1210, as described above. For example, the overlay area may be placed to ovoid any determined important areas of the first video stream such as faces or text. In some embodiments, the overlay area may be dynamically resized to avoid any determined important areas, as described above.

At step 1250, a modified video stream is generated using the first video stream received in step 1010 and the overlay area of step 1230. In some embodiments, the modified video stream is combined output frame 1110. In certain embodiments, the modified video stream is generated by combining incoming video frames 1120 with top frames 1130, as described above. In such embodiments, the top frame 1130 includes the overlay area of step 1240. In some embodiments, the modified video stream is generated by painting the overlay area of step 1240 directly on incoming video frames 1120 of the first video stream.

At step 1260, the modified video stream is sent for display on a display device of a first user. In some embodiments, the modified video stream is sent by social TV dongle 810 to a TV such as TV 830. In other embodiments, the modified video stream is sent to any other appropriate display device such as a computer monitor, a tablet computer, and the like. After step 1240, method 1200 may end.

Particular embodiments may repeat one or more steps of the method of FIG. 12 where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
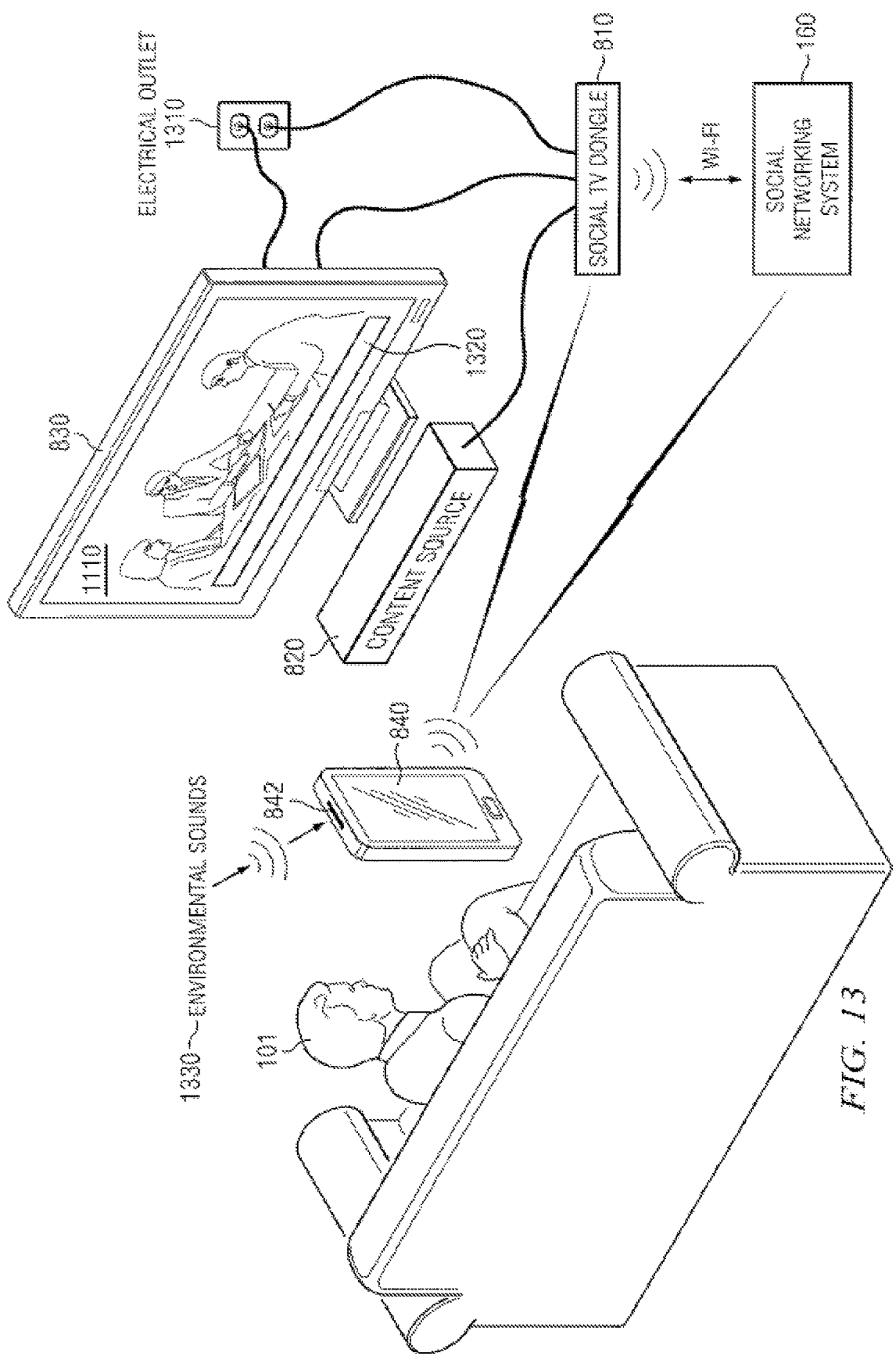
FIG. 13 illustrates an example environment for determining what a user is watching.

FIG. 13 illustrates an environment in which social TV dongle 810 or social networking system 160 determines what user 101 is watching on TV 830. As discussed further below, social TV dongle 810 or social networking system 160, either alone or in combination, may utilize various methods of determining what user 101 is watching on TV 830. These methods may include acoustic fingerprinting, analyzing electrical interference, analyzing signals on an HDMI cable, analyzing closed-captioning, analyzing image stills from an incoming video stream, and analyzing explicit signals from user 101. In embodiments where social TV dongle 810 determines what user 101 is currently watching, social TV dongle 810 may communicate to social networking system 160 what user 101 is viewing and a time associated with the viewing.

In some embodiments, acoustic fingerprinting is used to determine what user 101 is watching on TV 830. For example, while user 101 is watching TV 830, a mobile app associated with social networking system 160 may be running on mobile device 840 of user 101. Mobile device 840 may capture environmental sounds 1330 from the environment using a microphone 842. Environmental sounds 1330 may include, for example, audio from the show being viewed on TV 830. Environmental sounds 1330 are then sent to social networking system 160, either directly or via social TV dongle 810. Social networking system 160 may then analyze environmental sounds 1330 in order to determine what user 101 is watching on TV 830. For example, social networking system 160 may compare environmental sounds 1330 to audio of known TV shows. Based on the comparison, social networking system 160 may determine what show user 101 is watching on TV 830.

In some embodiments, social networking system 160 may utilize environmental sounds 1330 received from multiple users 101 in order to determine whether the multiple users 101 are watching a TV show separately or together. For example, if two users 101 are in the same room while watching the same TV show, environmental sounds 1330 captured by each users' mobile device 840 may be similar. Social networking system 160 may compare environmental sounds 1330 captured from each user and determine that the two users are located in the same environment if the environmental sounds 1330 are substantially similar. Additionally or alternatively, social networking system 160 may compare GPS or other location data sent by the users' mobile devices 840 in order to determine that two or more users are watching the same TV show at the same location. In some embodiments, social networking system 160 may post content to social networking system 160 indicating that the two users are watching the same TV show at the same location.

In some embodiments, social networking system 160 may utilize phase delay to determine what user 101 is watching. For example, most cable providers utilize a unique time delay in sending signals to customers. Social networking system 160 may determine this delay by, for example, analyzing environmental sounds 1330 or signals from an HDMI cable. Once the delay has been determined, social networking system 160 may compare it to known delays of content providers. For example, if the delay is determined to be 102 ms, social networking system 160 may determine that user 101 is watching content from Comcast if Comcast has a known delay of 102 ms. Once a content provider is determined, social networking system 160 may determine what user 101 is watching by cross-referencing environmental sounds 1330 with known schedules of content for the content provider (e.g., if user 101 is determined to be watching Comcast at 6 PM, environmental sounds 1330 may be compared to audio of shows being offered by Comcast at 6 PM).

In some embodiments, electrical interference is utilized to determine what user 101 is currently watching. For example, social TV dongle 810 may be plugged into an electrical outlet 1310 in the home of user 101. TV 830 may also be plugged into the same electrical outlet 1310, or any another electrical outlet 1310 in the home of user 101. Social TV dongle 810, or any other appropriate device plugged into an electrical outlet 1310 in the user's home, may capture electrical interference (e.g., noise) present on a power cord plugged into electrical outlet 1310. This electrical interference may be introduced into the electrical wiring of the user's home by, for example, TV 830. The electrical interference may be due to variance in the electrical load from TV 830 caused by varying sounds or volumes of a TV show being displayed. In some embodiments, the electrical interference may be unique for each TV show. This electrical interference pattern may be captured and sent to social networking system 160. Social networking system 160 may analyze the captured electrical interference pattern and compare it to a database of electrical interference patterns or fingerprints for known TV shows. By comparing the captured electrical interference pattern with the stored electrical interference fingerprints, social networking system 160 may be able match the captured pattern with the pattern of a TV show and thus determine what user 101 is watching on TV 830.

In some embodiments, closed-captioning may be utilized to determine what user 101 is watching on TV 830. For example social TV dongle 810 may receive video stream 850 from content source 820 that contains closed-captioning information 1320. Social TV dongle 810 may analyze video stream 850 and capture closed-captioning information 1320. The captured closed-captioning information 1320 may then be sent to social networking system 160 where it may be analyzed and compared to closed-captioning data of known TV shows. Based on the comparison, social networking system 160 may match the captured closed-captioning information 1320 with closed-captioning of a known TV show and thus determine what user 101 is watching on TV 830.

In some embodiments, explicit signals from a content provider may be utilized to determine what user 101 is watching on TV 830. For example social TV dongle 810 may receive video stream 850 from content source 820 that contains data provided by the content provider via an API. The data may include information that identifies the content being displayed (e.g., title, episode number, time, date, etc.). Social TV dongle 810 may analyze video stream 850 and capture the API data from the content provider. The data may then be sent to social networking system 160 where it may be used to determine what user 101 is watching on TV 830.

In some embodiments, social networking system 160 may determine what one or more users 101 are or will be watching by analyzing explicit signals from the users. For example, social networking system 160 may analyze posts of user 101 to social networking system 160 in order to determine what user 101 is or will be watching. As one example, if user 101 posts "I can't wait to watch 'Lone Survivor' tonight," social networking system 160 may determine that user 101 is planning to watch the show "Lone Survivor." As another example, if two users are chatting about the show "Lone Survivor," social networking system 160 may determine that the users are planning to watch the show "Lone Survivor."

In some embodiments, signals on an HDMI cable are utilized to determine what user 101 is currently watching. For example, social TV dongle 810 may capture electrical patterns of signals travelling across an HDMI cable from content source 820. These electrical patterns may be unique for each TV show. The electrical patterns may be captured and sent to social networking system 160. Social networking system 160 may analyze the captured electrical patterns and compare them to a database of electrical patterns for known TV shows. By comparing the captured electrical patterns with the known electrical patterns, social networking system 160 may be able match the captured patterns with the patterns of a TV show and thus determine what user 101 is watching on TV 830.

In some embodiments, image stills from an incoming video stream are analyzed to determine what user 101 is currently watching. For example, social TV dongle 810 may capture one or more incoming video frames 1120 from video stream 850 received from content source 820. In some embodiments, the captured incoming video frames 1120 may be sent to social networking system 160. Social TV dongle 810 or social networking system 160 may analyze the captured incoming video frames 1120 and compare them to a database of image stills for known TV shows. By comparing the captured incoming video frames 1120 with the known image stills, social networking system 160 or social TV dongle 810 may be able match the captured incoming video frames 1120 with the image stills of a TV show and thus determine what user 101 is watching on TV 830.

In some embodiments, social networking system 160 may, in response to determining what user 101 is currently viewing on TV 830 using the techniques discussed above, post content to social network 300 indicating what user 101 is currently watching. For example, social networking system 160 may post "User 101 is currently watching 'Lone Survivor'" based on a determination using environmental sounds 1330 or any other technique described above. In certain embodiments, social networking system 160 may determine whether to automatically post what user 101 is currently watching based on preferences of user 101.

In some embodiments, social network system 160 may additionally utilize GPS or other location data received from mobile device 840 to determine where user 101 is watching a show. In some embodiments, this data may also be used when posting content to social network 300. For example, social networking system 160 may compare GPS coordinates received from mobile device 840 to known GPS coordinates of the home of user 101. Then, when social networking system 160 posts content to social network 300 regarding what user 101 is currently watching, it may include information about where user 101 is watching the show. For example, if the received GPS coordinates correspond to a home address of user 101, social networking system 160 may post "User 101 is watching 'Lone Survivor' at his home."

In some embodiments, social TV dongle 810 may utilize a microphone or webcam 970 in order to determine interesting points within a show being viewed on TV 830. For example, social TV dongle 810 may perform audio sniffing using a coupled microphone in order to determine increased sounds such as laughter or shouting within a room. Increase sounds from users 101 may be an indication of interesting points of a program such as a funny moment, a scary moment, a shocking moment, and the like. As another example, social TV dongle 810 may utilize webcam 970 to determine movement of viewers within the room. Large movements of users 101 such as jumping may be an indication of interesting points of a program such as a touchdown in a football game. Once social TV dongle 810 determines that an interesting point has occurred, it may send an indication to social networking system social networking system 160. Social networking system 160 may then correlate the indication with a scene or event within the viewed program.

Once it is determined what user 101 is watching on TV 830, any appropriate action may be taken by social networking system 160. In some embodiments, social networking system 160 may add appropriate edges 306 to social graph 300. For example, if social networking system 160 determines that user 101 is watching the show "Lone Survivor," an edge 306 of "watched" may be added between user node 302 for user 101 and concept node 304 for "Lone Survivor." In some embodiments, social networking system 160 may perform advertisement augmentation after determining that user 101 is viewing an advertisement on TV 830. For example, if social networking system 160 determines that user 101 is viewing an advertisement for a specific product on TV 830, another advertisement for that same product may appear in the newsfeed for user 101 (e.g., in a web browser on the user's computer or in a mobile app on the user's mobile device 404b). In some embodiments, a catalog for a specific brand or a website of a product may be displayed on mobile device 404b in response to user 101 viewing a commercial for the brand or product. In some embodiments, an advertisement for a specific product may be displayed in a web browser (e.g., on mobile device 404b or on any computing device) in response to determining that user 101 is watching a particular program. For example, if it is determined that user 101 is watching a show that is typically watched by a certain demographic, an advertisement for a product directed to that demographic may be displayed to user 101.

Figure 14:
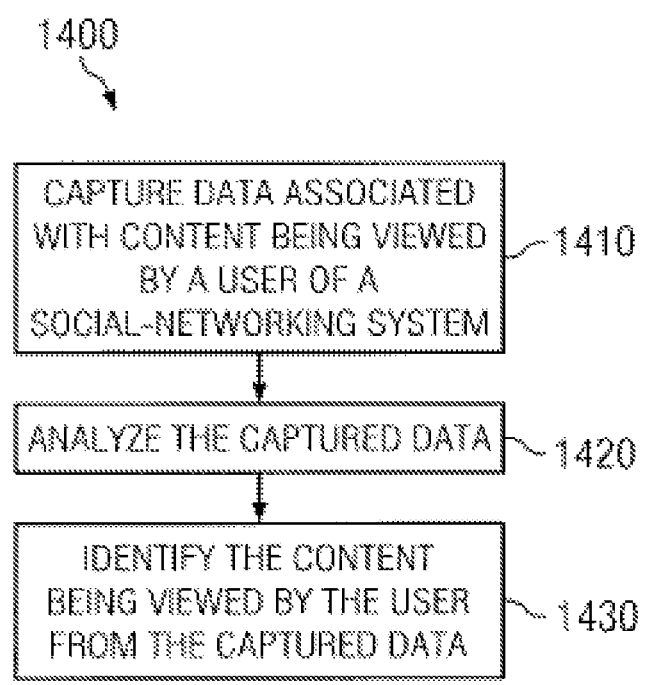
FIG. 14 illustrates an example method for determining what a user is currently watching.

FIG. 14 illustrates an example method 1400 for determining what a user is currently watching. Method 1400 may begin at step 1410, where data associated with content being viewed by a user of a social-networking system is captured. In some embodiments, the content may refer to TV programming such as a TV show or movie. In some embodiments, the content may refer to a video game. The data may be captured by any appropriate device. In some embodiments, the data is captured by social TV dongle 810 described above. In certain embodiments, the data is captured by a mobile device such as mobile device 404b. The data may refer to any appropriate data associated with content being viewed by the user. In some embodiments, the data may refer to: acoustic data such as data associated with environmental sounds 1130; data associated with electrical interference present on an electrical circuit; data associated with signals on an HDMI cable; closed-captioning information; image stills from an incoming video stream; or explicit data posted by the user to the social-networking system.

At step 1420, the data of step 1410 is accessed and analyzed. In some embodiments, the data of step 1410 is analyzed by social TV dongle 810. In certain embodiments, the data of step 1410 is analyzed by social networking system 160.

At step 1430, the content being viewed by the user is identified from the captured data. In some embodiments, the content is identified by comparing captured acoustic data such as environmental sounds 1130 with sounds of known TV shows. In some embodiments, the content is identified by comparing captured electrical interference patterns on an electrical circuit with known electrical interference patterns of TV shows. In some embodiments, the content is identified by comparing captured signals on an HDMI cable with HDMI signals of known shows. In some embodiments, the content is identified by comparing captured closed-captioning information with closed-captioning information of known shows. In some embodiments, the content is identified by comparing captured image stills from an incoming video stream to image stills of known shows. In some embodiments, the content is identified by extracting show titles or other information from explicit data posted by the user to the social-networking system. At step 1440, some embodiments send an indication of the identified content being viewed by the user to the social-networking system. In certain embodiments, other information such as the identity of the user and a time associated with the viewing may be sent to the social-networking system.

Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Figure 15:
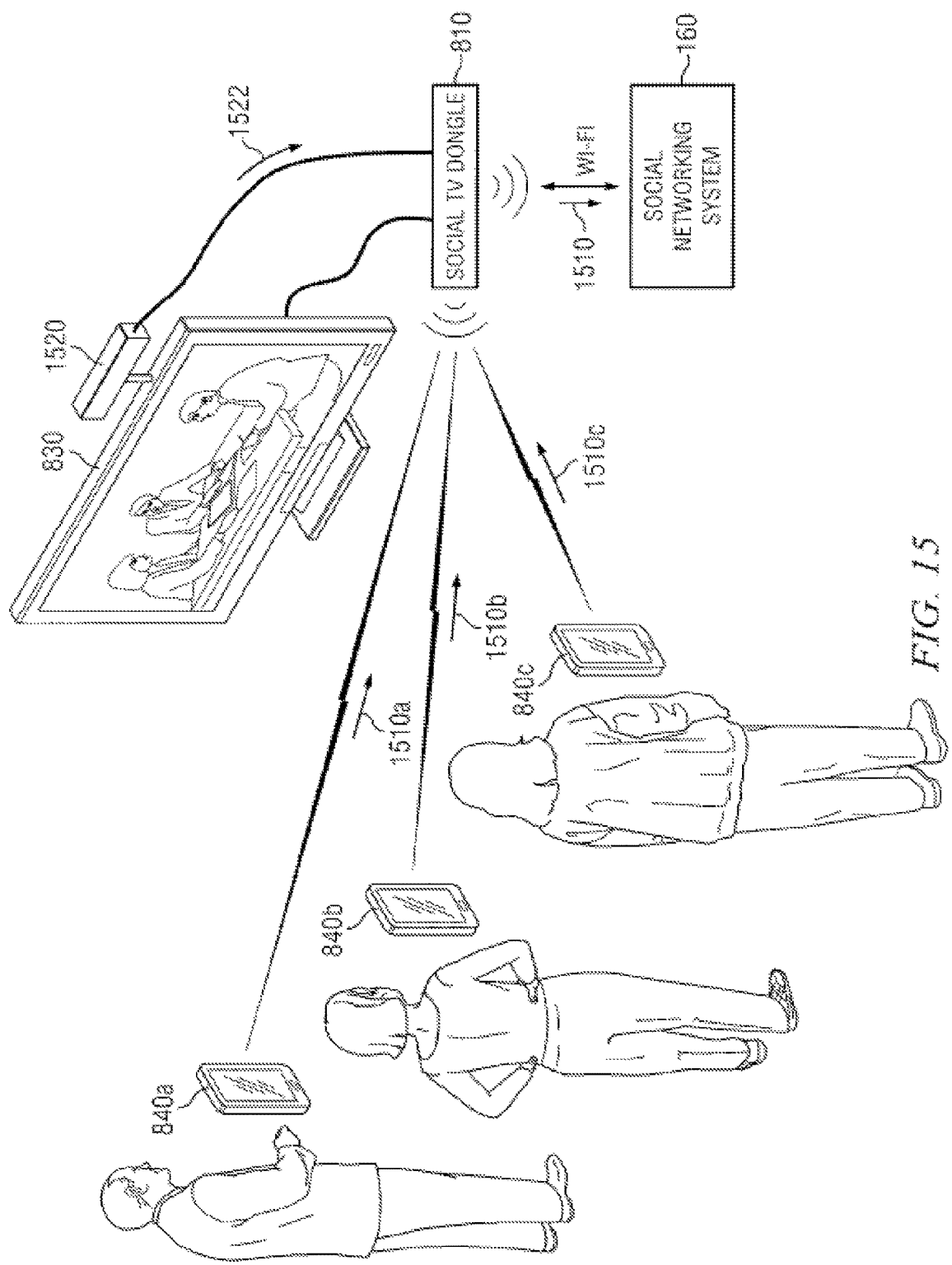
FIG. 15 illustrates an example environment for determining identities of one or more users who are watching content on a TV.

FIG. 15 illustrates an embodiment that determines identities of one or more users 101 who are watching content on TV 830. In some embodiments, social TV dongle 810 determines the identities of the users 101 who are in close proximity to TV 830 by capturing information from the users' mobile devices 840a-c. The captured information may be sent to social networking system 160 where it may be analyzed and compared to stored user information. Then, social networking system 160 may take actions based on the identified users 101. For example, social networking system 160 may cause TV 830 to automatically turn on and display content for the identified users as soon as the identified users enter the room or comes within proximity to TV 830. The displayed content may be, for example, a TV show that one or more friends 101a-e of the identified users are currently watching. In some embodiments, an acknowledgement of the identified user may be displayed on TV 830 (e.g., if "User A" is identified as coming within close proximity to TV 830, social TV dongle 810 may turn on TV 830 and display "User A" or a profile picture of User A on TV 830).

In some embodiments, social TV dongle 810 may determine who is in close proximity to TV 830 by communicating with mobile devices 840 via, for example, WiFi or BLUETOOTH. For example, social TV dongle 810 may communicate with one or more mobile devices 840 in order to capture a unique identifier 1510 associated with the mobile device 840. In one example, the unique identifier 1510 may be a Media Access Control (MAC) address or any other similar unique identifier associated with mobile device 840. Social TV dongle 810 may then communicate the captured unique identifier 1510 of the one or more mobile devices 840 to social networking system 160.

Once social networking system 160 receives unique identifier 1510 from social TV dongle 810, some embodiments may use unique identifier 1510 to identify the users watching TV 830. In one example, users 101 may have the unique identifiers 1510 of their devices stored with social networking system 160. Social networking system 160 may then compare the stored unique identifiers with the received unique identifier 1510 from social TV dongle social TV dongle 810 in order to identify the users watching TV 830.

Social networking system 160 may take any action based on the determined identities of the users within proximity to TV 830. In one example, social networking system 160 may send instructions to social TV dongle 810 to display social media content on TV 830 based on the identity of the user. In another example, social TV dongle 810 may automatically turn on TV 830 when it detects that a particular user 101 has entered the room or has come within close proximity to TV 830 or social TV dongle 810. Social TV dongle 810 may then display programming such as weather, traffic, or a show on TV 830 that one or more friends of the identified user are currently watching.

In some embodiments, social networking system 160 may perform automatic parental control of content viewable on TV 830 based on the identities of the users within proximity to TV 830. For example, social networking system 160 may determine that the identities of all users viewing TV 830 are less than a predetermined age. This may be determined using, for example, user data stored with social networking system 160. Social networking system 160 may then take action to block any adult or otherwise objectionable content on TV 830. In some embodiments, adults associated with a particular TV 830 may indicate to social networking system 160 certain channels or content that should be blocked when no adult is within proximity to TV 830.

In some embodiments, a motion sensing input device 1520 such as a KINECT or a camera such as webcam 970 may be utilized to determine when users are in close proximity to TV 830. For example, motion sensing input device 1520 may be coupled to social TV dongle 810 via USB or any other appropriate method and may send an indication 1522 to social TV dongle 810 when one or more users have come within close proximity to TV 830 or have left the room. Social TV dongle 810 may then take any appropriate action such as turning TV 830 on or off. In some embodiments, motion sensing input device 1520 may also be utilized to determine user identities. For example, when motion sensing input device 1520 detects movement, webcam 970 may capture images of users within close proximity to TV 830. These images may be sent to social networking system 160 where they may be compared to images associated with users of social networking system 160. Based on the comparison, social networking system 160 may identify the users in close proximity to TV 830 and take any appropriate action described above.

In certain embodiments, a camera such as webcam 970 may be utilized by social TV dongle 810 to determine when users are in the room and whether the users are actually watching TV 830. For example, social TV dongle 810 or social networking system 160 may analyze images captured by webcam 970 in order to determine how many users are in the room. As another example, social TV dongle 810 or social networking system 160 may analyze images captured by webcam 970 in order to determine how many users leave the room when, for example, a commercial begins showing on TV 830. In certain embodiments, social TV dongle 810 or social networking system 160 may analyze images captured by webcam 970 in order to determine which scenes or advertisements get the most attention by users 101. For example, images from webcam 970 may be analyzed to determine if users are using mobile device 840 at any point during a show or advertisement. In certain embodiments, social TV dongle 810 or social networking system 160 may analyze images captured by webcam 970 in order to determine the identity of users 101, subject to privacy settings. For example, facial recognition or body-size recognition may be utilized to compare captured images of users 101 with images associated with users 101 on social networking system 160 (e.g., a profile picture).

In some embodiments, a camera of a second screen of user 101 may be utilized to determine the identity of user 101. For example, mobile device 840 may include a front-facing camera that is utilized to capture an image of user 101 that may be used to identify user 101, subject to privacy settings. In certain embodiments, mobile application 602 captures an image of user 101 and sends the image to social TV dongle 810 or social networking system 160. The image may be analyzed using, for example, a facial recognition process, in order to determine an identity of user 101. Any appropriate action may then be performed according to the identity of user 101.

As one example of using a camera of a second screen to identity user 101, user 101 may sit down to watch TV 830 while holding a mobile device 840. Once user 101 selects a program from, for example, a social programming guide discussed below in reference to FIG. 31, a photo of user 101 is captured using the mobile device 840 of user 101. The captured image may then be analyzed using facial recognition in order to determine the identity of user 101. Once the identity of user 101 is determined, actions such as publishing content to social graph 300 may be performed. For example, if it is determined that the name or identity of user 101 is "User A" after user 101 selects the program "Lone Survivor" to watch from the social programming guide, a post of "User A is watching Lone Survivor" may be published to social graph 300, subject to privacy settings.

As another example, user 101 may launch a mobile app on mobile device 840 in order to view a social programming guide as discussed below in reference to FIG. 31. Once user 101 launches the mobile app, a photo of user 101 may be captured using the mobile device 840 of user 101. The captured image may then be analyzed using facial recognition in order to determine the identity of user 101. Once the identity of user 101 is determined, a customized social programming guide for the identified user may be presented. For example, a social programming guide that is customized with content for "User A" may be presented when it is determined that the identity of user 101 is "User A."

In some embodiments, social TV dongle 810 may utilize gaze detection to determine a user's interest. For example, webcam 970 or any other coupled camera or gaze-detection device may be utilized by social networking system 160 to track movements of the eyes of user 101. Social TV dongle 810 may then determine what areas of the screen the user is watching. This may be used to determine, for example, whether the user is looking at a product placed in a show. As another example, the gaze detection may be used to determine whether the user is looking at the screen at all. If the gaze detection determines that a user is not looking at TV 830 during a commercial, social networking system 160 may infer that the user is not interested in the product in the advertisement. This data may then be provided to the advertiser for a fee. In some embodiments, if gaze detection determines that a user is not watching the current program, social TV dongle 810 may present an indication to user 101 to, for example, change the current channel or turn off TV 830. In some embodiments, if gaze detection determines that a user is intensely watching the current program, social TV dongle 810 may, for example, take action to increase how long information is presented to user 101 on TV 830 (e.g., slow down a ticker that is scrolling across the screen of the TV).

In certain embodiments, social TV dongle 810 may determine whether a user has performed a gesture and take any appropriate action based on the determined gesture. For example, social TV dongle 810 may utilize any device such as a KINECT or a camera such as webcam 970 to determine that a user has performed a "shhhh" gesture (i.e., holding an index finger up to the user's lips). In response to determining the user has performed this gesture, social TV dongle 810 may take any appropriate action such as lowering the volume of TV 830, muting the volume of TV 830, or turning off TV 830. Examples of other possible gestures may include gestures to change the channel of TV 830, turn up the volume of TV 830, turn on TV 830, and the like.

In some embodiments, social networking system 160 may utilize other analytics to infer interests of user. For example, social networking system 160 may detect which users are watching a particular show based on information from social graph 300 (e.g., a user explicitly shares that he is watching the particular show). Social networking system 160 may then analyze location information such as GPS data from mobile devices 840 in order to determine the location of friends 101a-e of the user. Social networking system 160 may determine that all of the user's friends within a predetermined radius of the user can be inferred as watching the same show as the user.

In some embodiments, social TV dongle 810 may display content from social networking system 160 when it is determined that no user is in the room or when it is determined that users are not watching TV 830. For example, when social TV dongle 810 determine that no users are watching TV 830, social TV dongle 810 may display content such as a dashboard, a stock ticker, photos from friends, notifications, or any other social content from social networking system 160.

Figure 16:
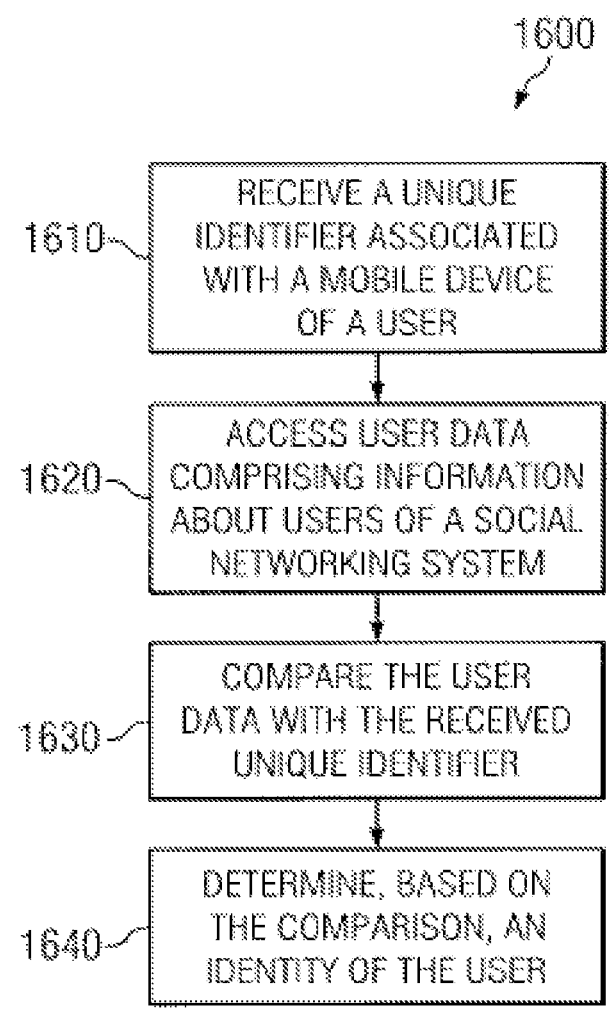
FIG. 16 illustrates an example method for determining identities of one or more users who are watching content on a TV.

FIG. 16 illustrates an example method 1600 for determining identities of one or more users who are watching content on a TV. The method may begin at step 1610, where a unique identifier associated with a mobile device of a user is received. In some embodiments, the unique identifier is received by social networking system 160 from social TV dongle 810. In some embodiments, the unique identifier may be a MAC address or any other similar unique identifier associated with a mobile device. In some embodiments, the user is in proximity to the social TV dongle 810. In some embodiments, the user is viewing content on a display device such as TV 830.

At step 1620, user data comprising information about users of a social-networking system user is accessed. In some embodiments, the user data is a data repository of social networking system 160. In some embodiments, the user data may be social graph 300. The user data may store unique identifiers associated with devices of the users of the social-networking system.

At step 1630, the user data is compared with the received unique identifier. In some embodiments, this may refer to searching a database of the social-networking system to determine whether the received unique identifier matches stored unique identifier of the users.

At step 1640, an identity of the user is determined based on the comparison in step 1630. For example, if the received unique identifier matches a stored unique identifier for a particular user, it may be determined that the particular user owns the mobile device of step 1610. Thus, it may be determined that the particular user is currently watching the display device.

Particular embodiments may repeat one or more steps of the method of FIG. 16, where appropriate. Although this disclosure describes and illustrates particular steps of the method of FIG. 16 as occurring in a particular order, this disclosure contemplates any suitable steps of the method of FIG. 16 occurring in any suitable order. Moreover, although this disclosure describes and illustrates particular components, devices, or systems carrying out particular steps of the method of FIG. 16, this disclosure contemplates any suitable combination of any suitable components, devices, or systems carrying out any suitable steps of the method of FIG. 16.

Figure 17:
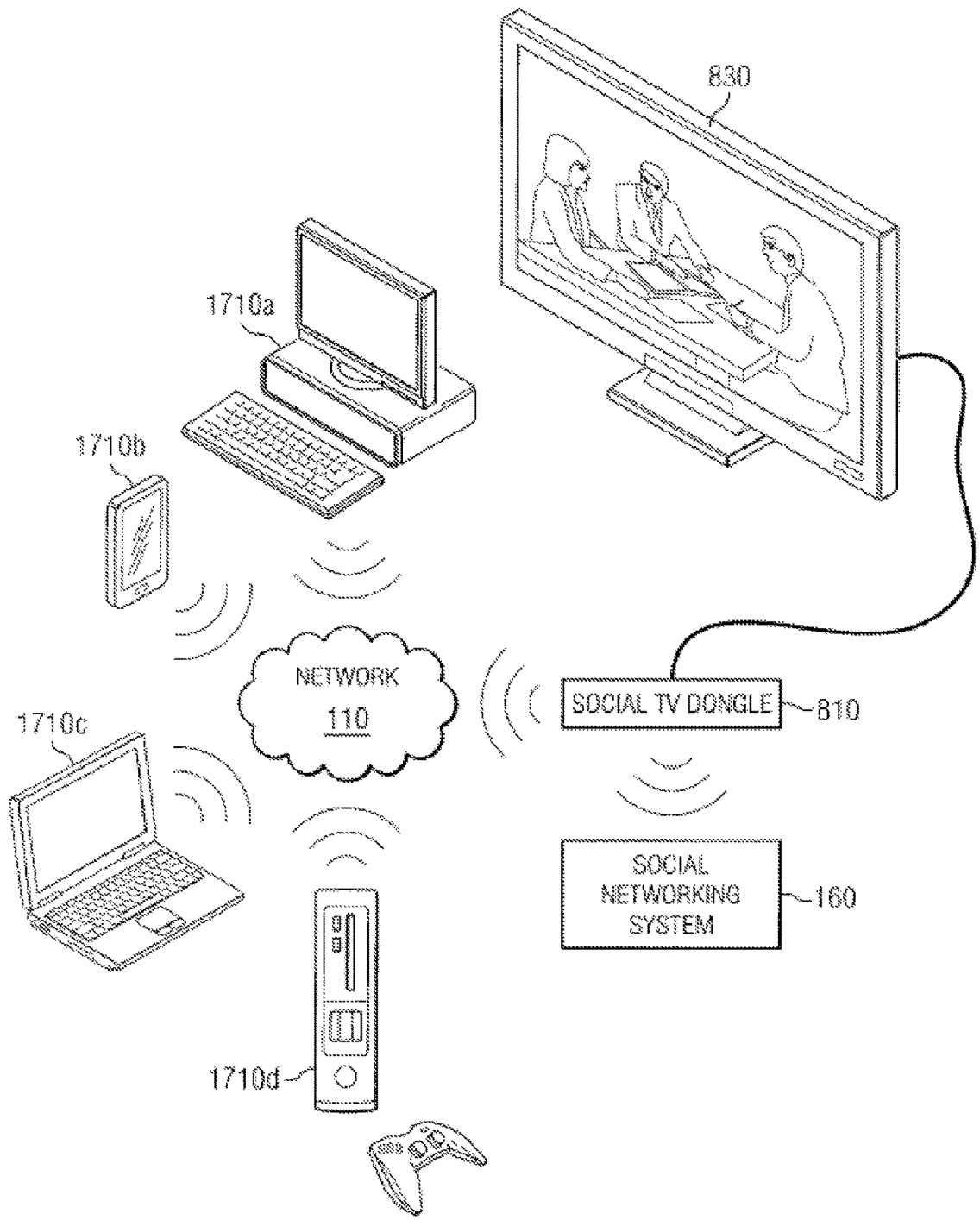
FIG. 17 illustrates an example environment for determining one or more user products.

FIG. 17 illustrates an embodiment of social TV dongle 810 that may determine one or more user products 1710 of user 101. In the illustrated embodiment, user devices 1710 may include a personal computer 1710a, a mobile device 1710a such as a smartphone, a laptop computer 1710c, a gaming console 1710d, or any other appropriate user device. User devices 1710 communicate with network 110 or social TV dongle 810 via a wireless communications protocol such as WiFi or BLUETOOTH.

In general, social TV dongle 810 may identify user products 1710 of user 101 by wirelessly communicating either directly with user devices 1710 or via network 110. For example, social TV dongle 810 may utilize WiFi or BLUETOOTH sniffing to capture uniquely identifying information from each user device 1710. The information captured from user devices 1710 may include, for example, a MAC address, a serial number, a unique product identification number, or any other data that may be used to identify the specific models or manufacturers of user devices 1710. Once captured, the unique identifiers of user devices 1710 may be analyzed by social TV dongle 810 or sent to social networking system social networking system 160 for analysis. In some embodiments, the captured unique identifiers may be compared to a database of unique identifiers in order to identify user devices 1710.

Social networking system 160 may utilize the information obtained from user devices 1710 to deliver specific content to TV 830. For example, if social networking system 160 determines that user 101 is utilizing an IPHONE as mobile device 1710b, social networking system 160 may communicate to social TV dongle 810 to display advertisements on TV 830 directed to IPHONE users. As another example, if social networking system 160 determines that user 101 is utilizing an XBOX as gaming console 1710d, social networking system 160 may communicate to social TV dongle 810 to display advertisements on TV 830 directed to XBOX users. For example, social networking system 160 may cause advertisements for specific XBOX games to be displayed on TV 830.

In some embodiments, signals on an HDMI cable may be utilized by social TV dongle 810 to identify equipment such as STB/gateway 404c or a gaming consoler coupled either directly or indirectly to social TV dongle social TV dongle 810. For example, some devices send a unique identification in signals sent via HDMI. Social TV dongle 810 may capture this information from the HDMI cable and utilize it to determine what equipment is being used by user 101 as described above.

Figure 18:
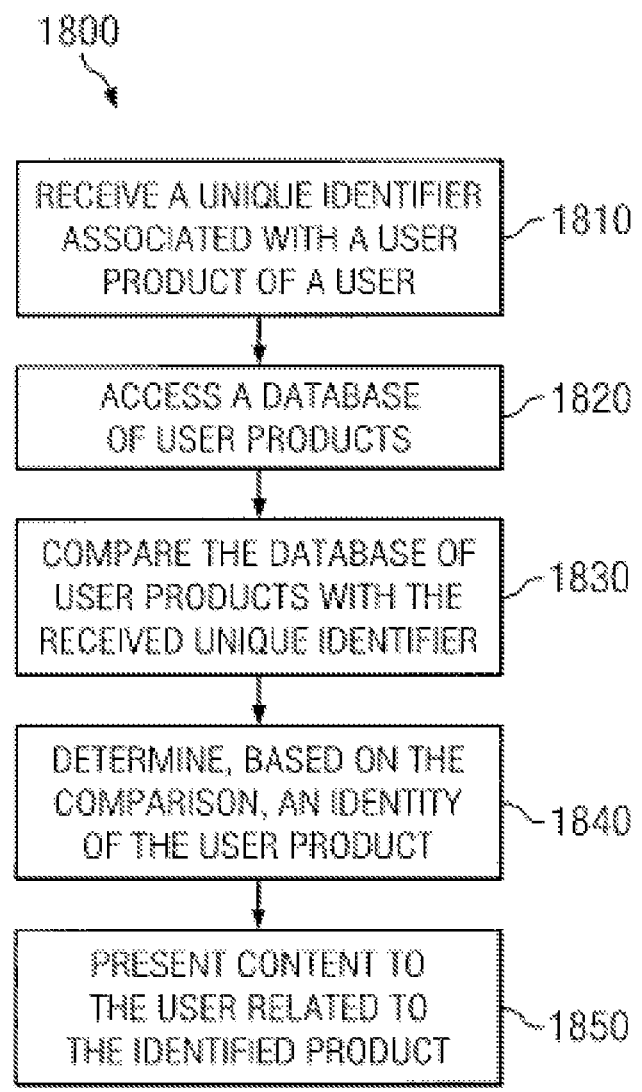
FIG. 18 illustrates an example method for determining one or more user products.

FIG. 18 illustrates an example method 1800 for determining one or more user products. The method may begin at step 1810, where a unique identifier associated with a user product of a user is received. In some embodiments, the unique identifier is received by social networking system 160 from social TV dongle 810. In some embodiments, the unique identifier may be a MAC address or any other similar unique identifier associated with a user device. In some embodiments, the user is in proximity to the social TV dongle 810. In some embodiments, the user is viewing content on a display device such as TV 830. The user product may refer to any other product that user owns. For example, the user product may be a laptop computer, a smartphone, a gaming console, and the like.

At step 1820, a database of known user products is accessed. The database may include unique identifiers of known products. At step 1830, the received unique identifier is compared to the database of known products. Based on this comparison, an identity of the user product may be determined in step 1840. For example, it may be determined that the user owns a specific gaming console.

At step 1850, content related to the identified user product may be presented to the user. For example, if it is determined in step 1840 that the user owns a specific gaming console, advertisements for games for that gaming console may be presented to the user. As another example, if it is determined in step 1840 that the user owns a specific brand of laptop, advertisements for other products with that brand may be presented to the user.

Particular embodiments may repeat one or more steps of the method of FIG. 18, where appropriate. Although this disclosure describes and illustrates particular steps of the method of FIG. 18 as occurring in a particular order, this disclosure contemplates any suitable steps of the method of FIG. 18 occurring in any suitable order. Moreover, although this disclosure describes and illustrates particular components, devices, or systems carrying out particular steps of the method of FIG. 18, this disclosure contemplates any suitable combination of any suitable components, devices, or systems carrying out any suitable steps of the method of FIG. 18.

Figure 19:
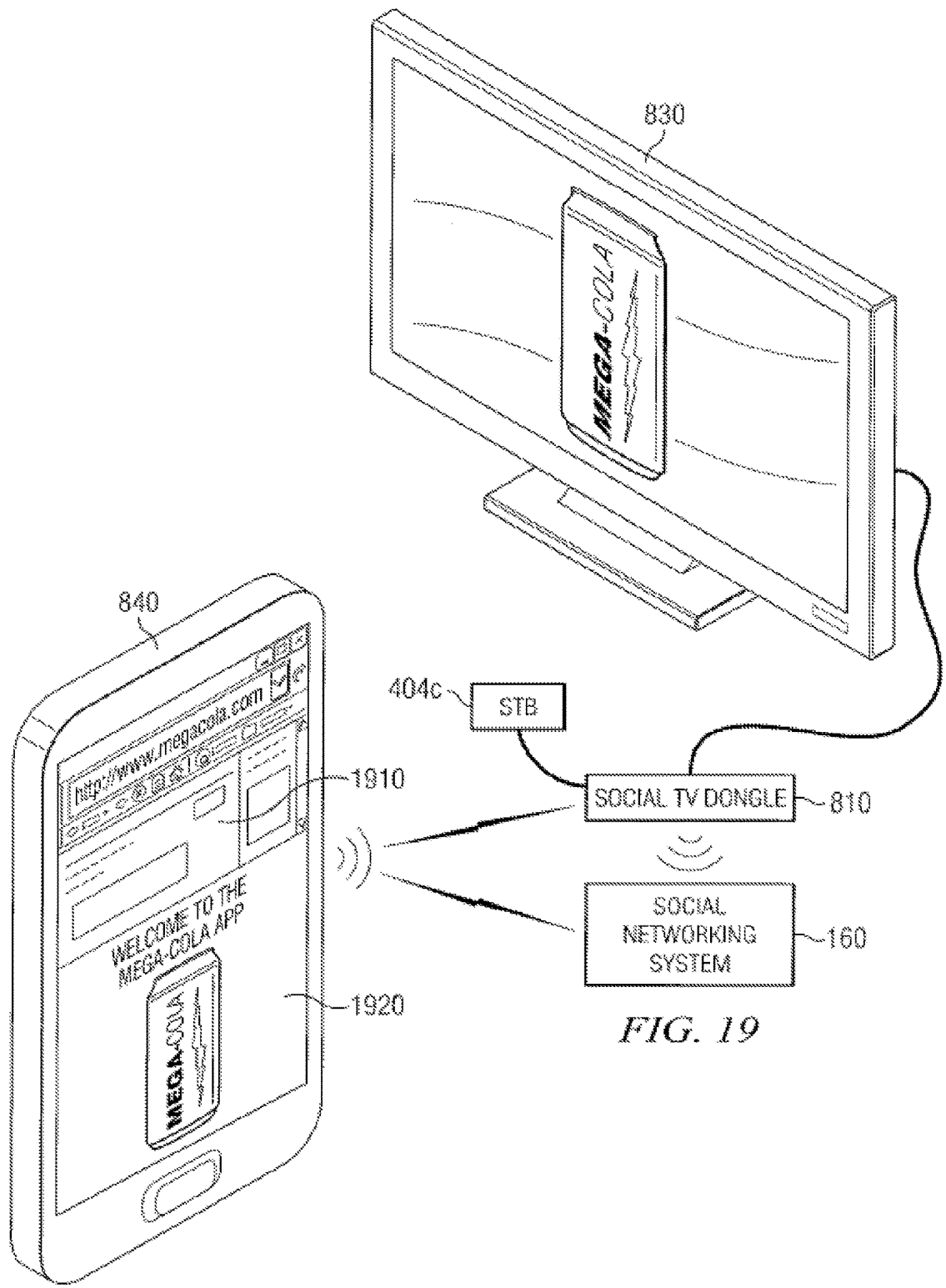
FIG. 19 illustrates an example environment for determining products placed in programs.

FIG. 19 illustrates embodiments that may determine products placed in programs being viewed on TV 830. In general, many TV shows and movies utilize product placement to show specific products to users viewing that show. For example, a particular episode of a TV show may show an actor consuming a specific product such as "Mega-Cola" as illustrated on the screen of TV 830 in FIG. 19. As another example, a scene of a movie may show actors utilizing a laptop in which the logo of the manufacturer of the laptop is visible. In certain embodiments, social TV dongle 810 or social networking system 160 may utilize various methods, such as those described below, to determine which products are being shown on TV 830. In some embodiments, social TV dongle 810 or social networking system 160 may take any appropriate action once a determination is made that a specific product is being shown on TV 830. For example, a website or mobile app of the determined product may appear on mobile devices 840 of users determined to be viewing TV 830 as described above.

In some embodiments, closed-captioning information may be utilized to determine specific products being shown on TV 830. For example, social TV dongle 810 may capture closed-captioning information embedded in video stream 850 from content source 820. Social TV dongle 810 may then analyze the captured closed-captioning data in order to search for any known products. In some embodiments, the captured closed-captioning information may be compared to a database of known products. If any words from the captured closed-captioning information match, for example, product names in the database of known products, social TV dongle 810 may determine that the matched product is being shown or has been recently shown on TV 830. In some embodiments, the captured closed-captioning information may be sent to social networking system 160. Social networking system 160 may then search the database of known products in order to identify specific products being shown on TV 830.

In certain embodiments, logo scraping may be utilized to determine specific products placed in a program shown on TV 830. For example, social TV dongle 810 may analyze individual frames of video stream 850 from content source 820 in order to identify logos of known products. Social TV dongle 810 may utilize any appropriate method such as image comparison to search for known logos. For example, captured image stills of video stream 850 may be compared to logos in a database of known products. If any portion of a captured image still matches a logo of a known product, social TV dongle 810 may determine that the matched product is being shown or has been recently been shown on TV 830. In some embodiments, the captured image stills may be sent to social networking system 160. Social networking system 160 may then search the database of known product logos in order to identify specific products being shown on TV 830.

In some embodiments, social TV dongle 810 may analyze audio from TV 830 (e.g., from an HDMI audio stream or captured using a microphone) in order to determine that a specific product has been mentioned, subject to privacy settings. For example, if an actor says "Mega-Cola" in a show or advertisement, social TV dongle 810 may search a database of known products for "Mega-Cola." If the product is found in the database, social TV dongle 810 may determine that the matched product is being mentioned or has been recently been mentioned on TV 830. In some embodiments, the captured audio may be sent to social networking system 160. Social networking system 160 may then search the database of known products in order to identify specific products mentioned on TV 830.

In some embodiments, OCR may be utilized to determine specific products being shown on TV 830. For example, social TV dongle 810 may utilize OCR on captured image stills from video stream 850 in order to identify specific text being shown on the screen. Social TV dongle 810 may then analyze the captured text in order to identify known products. In some embodiments, the captured text may be compared to a database of known products. If any words from the captured text match, for example, product names in the database of known products, social TV dongle 810 may determine that the matched product is being shown or has been recently shown on TV 830. In some embodiments, the captured text may be sent to social networking system 160. Social networking system 160 may then search the database of known products in order to identify specific products being shown on TV 830.

If social TV dongle 810 or social networking system 160 determines that a specific product is being shown on TV 830 or has been mentioned on TV 830, any appropriate action related to the specific product may be taken. In one example, mobile device 840 of the user may display a website 1910 associated with the product that is currently being shown or mentioned on TV 830. As a specific example for illustrative purposes only, consider a TV show in which the product "Mega-Cola" is shown being consumed by an actor. Social TV dongle 810 may utilize any appropriate method such as those discussed above to determine the identity (e.g., the specific brand or product name) of the displayed product. In this case, social TV dongle 810 determines that the specific product "Mega-Cola" has been shown on TV 830. Social TV dongle 810 may then cause a website 1910 associated with the specific product (i.e., "Mega-Cola) being shown to be displayed on mobile device 840. In some embodiments, social TV dongle 810 may communicate directly with a mobile app on mobile device 840 in order to display website 1910. In some embodiments, social networking system 160 may communicate with the mobile app on mobile device 840 in order to display website 1910.

In some embodiments, mobile device 840 of the user may display a website 1910 that allows viewers to purchase products that are currently being shown or mentioned on TV 830. For example, social TV dongle 810 or social networking system 160 may determine that a specific product "Mega-Cola" has been shown on TV 830 either in an advertisement or in a program. Based on this determination, a website 1910 may be displayed on mobile device 840 that allows the user to purchase "Mega-Cola." In some embodiments, the displayed website 1910 may be a website of a sponsor who has purchased the right for the website of the sponsor to be displayed for certain products shown on TV 830.

In some embodiments, a mobile app 1920 associated with a specific product may be launched on mobile device 840 in response to a determination that the specific product is or has been recently shown or mentioned on TV 830. For example, if social TV dongle 810 or social networking system 160 determines that the specific product "Mega-Cola" is or has been recently shown being consumed by an actor in a TV show, instructions may be communicated to mobile device 840 to launch a mobile app 1920 associated with "Mega-Cola." As a result, the viewing experience of user 101 may be enhanced because additional information about the specific products being shown on TV 830 may be automatically presented to the user.

Figure 20:
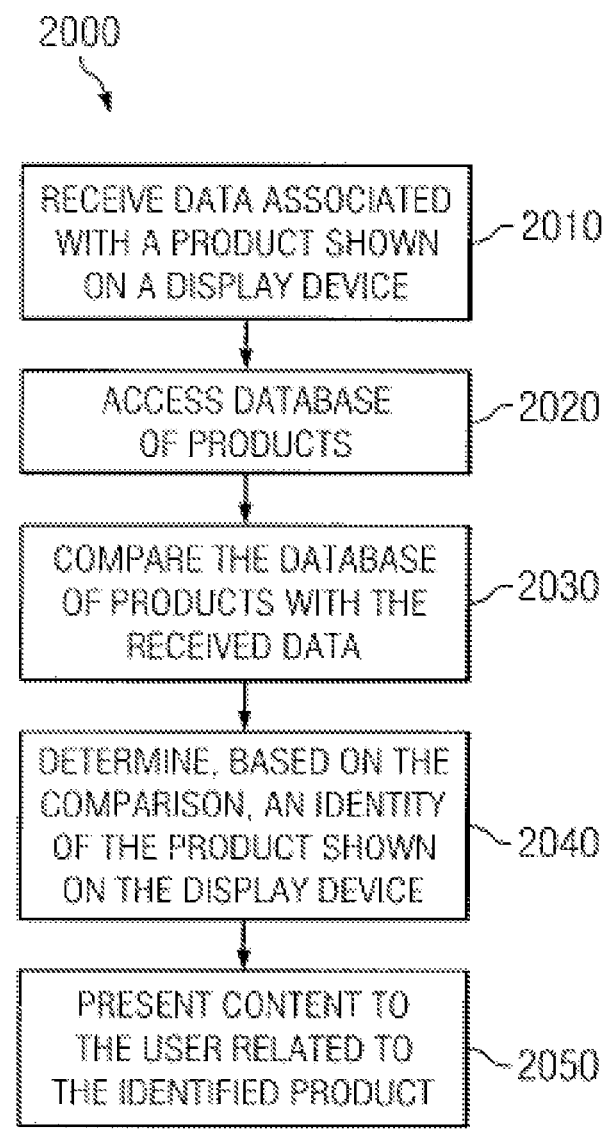
FIG. 20 illustrates an example method for determining products placed in programs.

FIG. 20 illustrates an example method 2000 for determining products placed in programs. The method may begin at step 2010, where data associated with a product shown on a display device is received. In some embodiments, the data is received by social networking system 160 from social TV dongle 810. In some embodiments, the data may include data obtained via OCR, logo-scraping, closed-captioning information, or any other appropriate data.

At step 2020, a database of known products is accessed. In some embodiments, the database may include one or more of product names, logos, product images, and the like. At step 2030, the database of known products is compared with the received data. Based on the comparison, an identity of the product shown on the display device is determined in step 2040.

At step 2050, content related to the identified product shown on the display may be presented to the user. In some embodiments, this content may be presented on a second screen of the user. For example, if it is determined in step 2040 that a specific brand of cola was advertised on the display device, a website for the cola may appear on a mobile device of the user. As another example, a mobile app associated with the determined product may appear on the mobile device of the user.

Particular embodiments may repeat one or more steps of the method of FIG. 20, where appropriate. Although this disclosure describes and illustrates particular steps of the method of FIG. 20 as occurring in a particular order, this disclosure contemplates any suitable steps of the method of FIG. 20 occurring in any suitable order. Moreover, although this disclosure describes and illustrates particular components, devices, or systems carrying out particular steps of the method of FIG. 20, this disclosure contemplates any suitable combination of any suitable components, devices, or systems carrying out any suitable steps of the method of FIG. 20.

Figure 21:
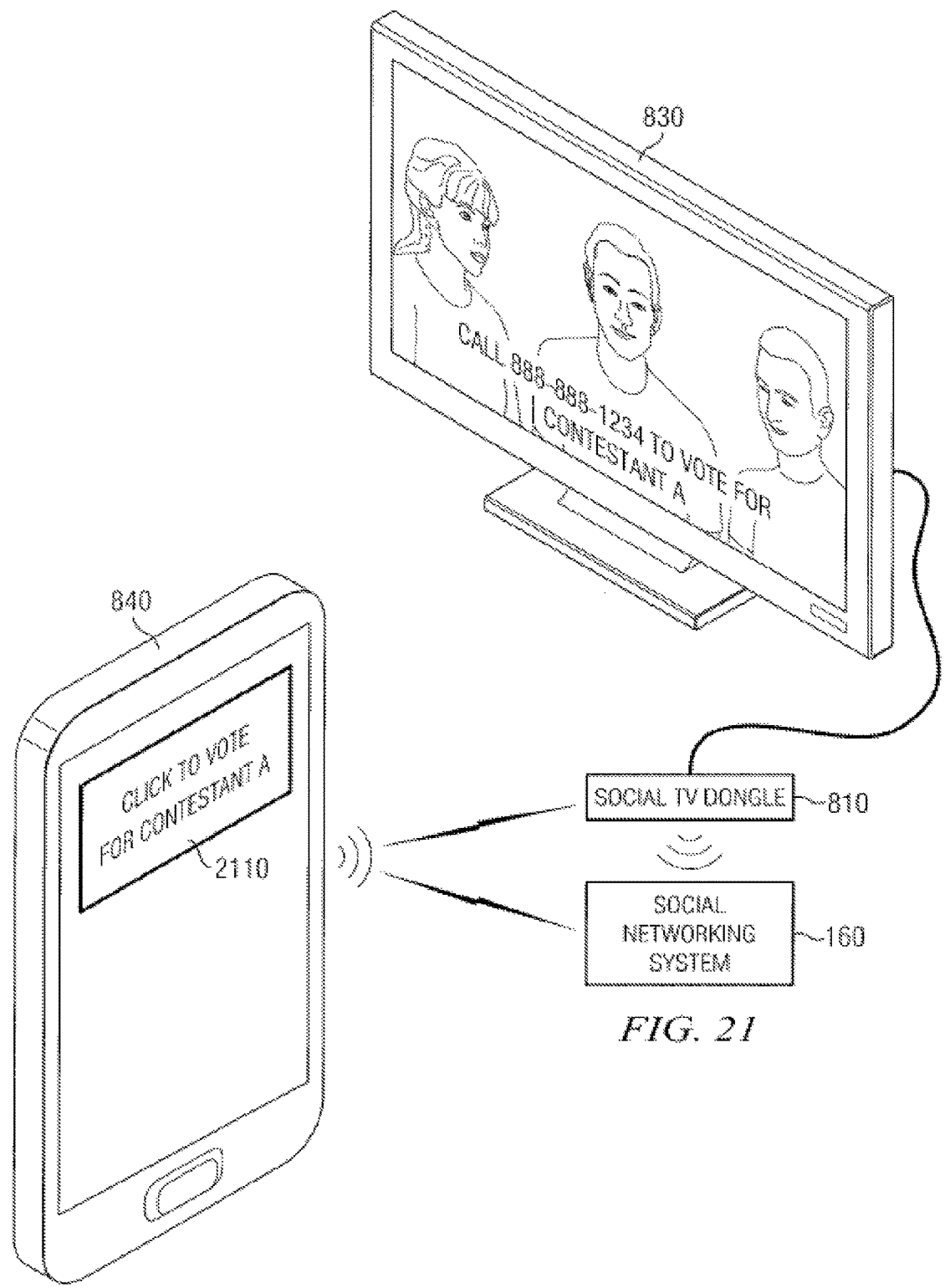
FIG. 21 illustrates an example environment in which a second screen is utilized to present information related to what is currently being displayed on a TV.

FIG. 21 illustrates embodiments in which a second screen of a device of user 101 is utilized to present information related to what is currently being displayed on TV 830. In some embodiments, the second screen of user 101 may be mobile device 840 such as a smartphone, a tablet computer, or any other appropriate display device. Some embodiments present a call-to-action 2110 on a second screen that is related to content being displayed on TV 830. In some embodiments, an API is provided that permits content providers or advertisers to include audio in programming that triggers call-to-action 2110 or any other content on mobile device 840.

In some embodiments, call-to-action 2110 may be presented on a second screen of user 101 in response to what is currently being displayed on TV 830. In general, call-to-action 2110 may refer to a solicited response in user 101. In some embodiments, call-to-action 2110 may be in the form of a clickable button that performs a predefined action when clicked. For example, as illustrated in FIG. 21, a singing competition program on TV 830 may solicit user 101 to vote for contestants by dialing a telephone number. Concurrently with the display of the telephone number, call-to-action 2110 may be presented on a second screen of user 101 such as mobile device 840. In this example, call-to-action 2110 is a button that appears on mobile device 840 that allows user 101 to click the button to vote for contestant A without having to dial the telephone number displayed on TV 830.

Call-to-action 2110, or any other content displayed on a second screen of user 101 such as mobile device 840, may be displayed in response to instruction from social networking system 160 or social TV dongle 810. For example, social networking system 160 may send instructions to mobile device 840 either directly or via social TV dongle 810 to display call-to-action 2110. In certain embodiments, the instructions are sent to mobile device 840 based on metadata embedded in video stream 850. For example, metadata embedded within video stream 850 may indicate to display a certain call-to-action 2110 at a certain time in a program. Social TV dongle 810 or social networking system 160 may analyze the metadata and then send the instructions to mobile device 840 to display call-to-action 2110 at the appropriate time.

In some embodiments, call-to-action 2110, or any other content displayed on a second screen of user 101 such as mobile device 840, may be displayed in response to an advertisement on TV 830. For example, when an advertisement for a specific product is being displayed on TV 830, a call-to-action 2110 for the specific product may be displayed on a second screen of user 101 such as mobile device 840. As a specific example, when an advertisement for a specific product is being displayed on TV 830, a call-to-action 2110 that says "CLICK HERE TO LEARN MORE ABOUT THIS PRODUCT" may appear on mobile device 840. This call-to-action 2110 may, for example, display a website or a mobile app for the specific product being shown on TV 830 when pressed.

In certain embodiments, an API may be provided to content producers in order to present information related to what is currently being displayed on TV 830 to a second screen of user 101. For example, social networking system 160 may provide an API to content producers that displays call-to-action 2110 based on certain audio or video being displayed on TV 830. To illustrate this, consider the TV show illustrated in FIG. 21. In this show, the content provider desires that call-to-action 2110 appear on mobile device 840 when the telephone number appears on the screen of TV 830. To accomplish this, some embodiments of mobile device 840 or social TV dongle 810 may listen for a specific tone or audio emitted from TV 830. When the correct sound is detected, call-to-action 2110 may be displayed.

In certain embodiments, content may be displayed on a second screen of user 101 in order to provide a simulcast viewing experience for user 101. For example, consider a scenario where user 101 is watching a sporting event on TV 830. Concurrent with viewing the sporting event, social networking system 160 may cause sports scores to be displayed on a second screen of user 101 such as mobile device 840. In some embodiments, a scoreboard of the current game being watched may be displayed on the second screen. For example, if user 101 is viewing a baseball game on TV 830, a box score of the current baseball game (e.g., current score, pitch count, etc.) may be displayed on mobile device 840. In some embodiments, sports scores of other similar games to what is currently being viewed may be displayed on the second screen of user 101. For example, if user 101 is viewing a football game on TV 830, scores of other football games may be displayed on mobile device 840.

In some embodiments, TV 830 may be utilized as a second screen for mobile device 840 of user 101. For example, user 101 may view programming on mobile device 840 from OTT provider 403 (e.g., Netflix). While user 101 is viewing content on mobile device 840 from OTT provider 403, social area 1140 may be displayed on TV 830. For example, chat sessions or other messages from social networking system 160 that are related to the current program may be displayed in social area 1140 on TV 830. As another example, a web browser of social networking system 160 may be utilized on mobile device 840. While the user is utilizing the web browser on mobile device 840, social area 1140 may be displayed on TV 830.

Figure 22:
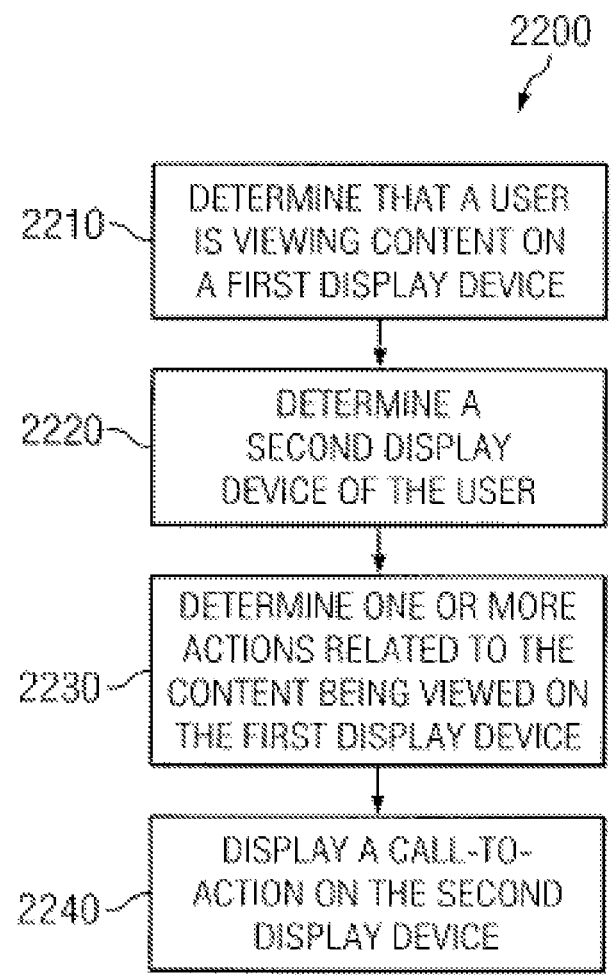
FIG. 22 illustrates an example method for utilizing a second screen to present information related to what is currently being displayed on a TV.

FIG. 22 illustrates an example method 2200 for utilizing a second screen to present information related to what is currently being displayed on a TV. The method may begin at step 2210, where it is determined that a user is viewing content on a first display device. For example, it may be determined that the user is viewing a show on TV 830. In some embodiments, any appropriate method may be determined that a user is viewing content on the first display device. For example, social TV dongle 810 may utilize BLUETOOH, WiFi, acoustic fingerprinting, GPS data, electrical interference, closed-captioning, explicit signals from the user, HDMI signal, or any other appropriate method to determine that the user is viewing the content. In some embodiments, the display device may be a TV, a smartphone, a computer, a tablet computer, and the like.

At step 2220, a second display device of the user is determined. For example, social TV dongle 810 may determine that the user is interacting with a smartphone while viewing the content on the first display device. As another example, social TV dongle 810 may determine that the user is interacting with a tablet computer while viewing the content on the first display device.

At step 2230, one or more actions related to the content being viewed on the first display device are determined. For example, it may be determined that certain text has been displayed on the first display device. As another example, it may be determined that a certain sound has been emitted from display device. As yet another example, it may be determined that certain metadata is embedded in a video stream.

At step 2240, a call-to-action is displayed on the second display device. In some embodiments, the call-to-action solicits a response from the user related to the determined one or more actions. For example, if it is determined in step 2230 that a user is invited to vote for a specific contestant in a talent competition program, a call-to-action voting button may appear on the second display device. The call-to-action voting button may cause an indication to be sent to social networking system 160 or any other location where the user's vote may be tallied.

Particular embodiments may repeat one or more steps of the method of FIG. 22, where appropriate. Although this disclosure describes and illustrates particular steps of the method of FIG. 22 as occurring in a particular order, this disclosure contemplates any suitable steps of the method of FIG. 22 occurring in any suitable order. Moreover, although this disclosure describes and illustrates particular components, devices, or systems carrying out particular steps of the method of FIG. 22, this disclosure contemplates any suitable combination of any suitable components, devices, or systems carrying out any suitable steps of the method of FIG. 22.

Figure 23:
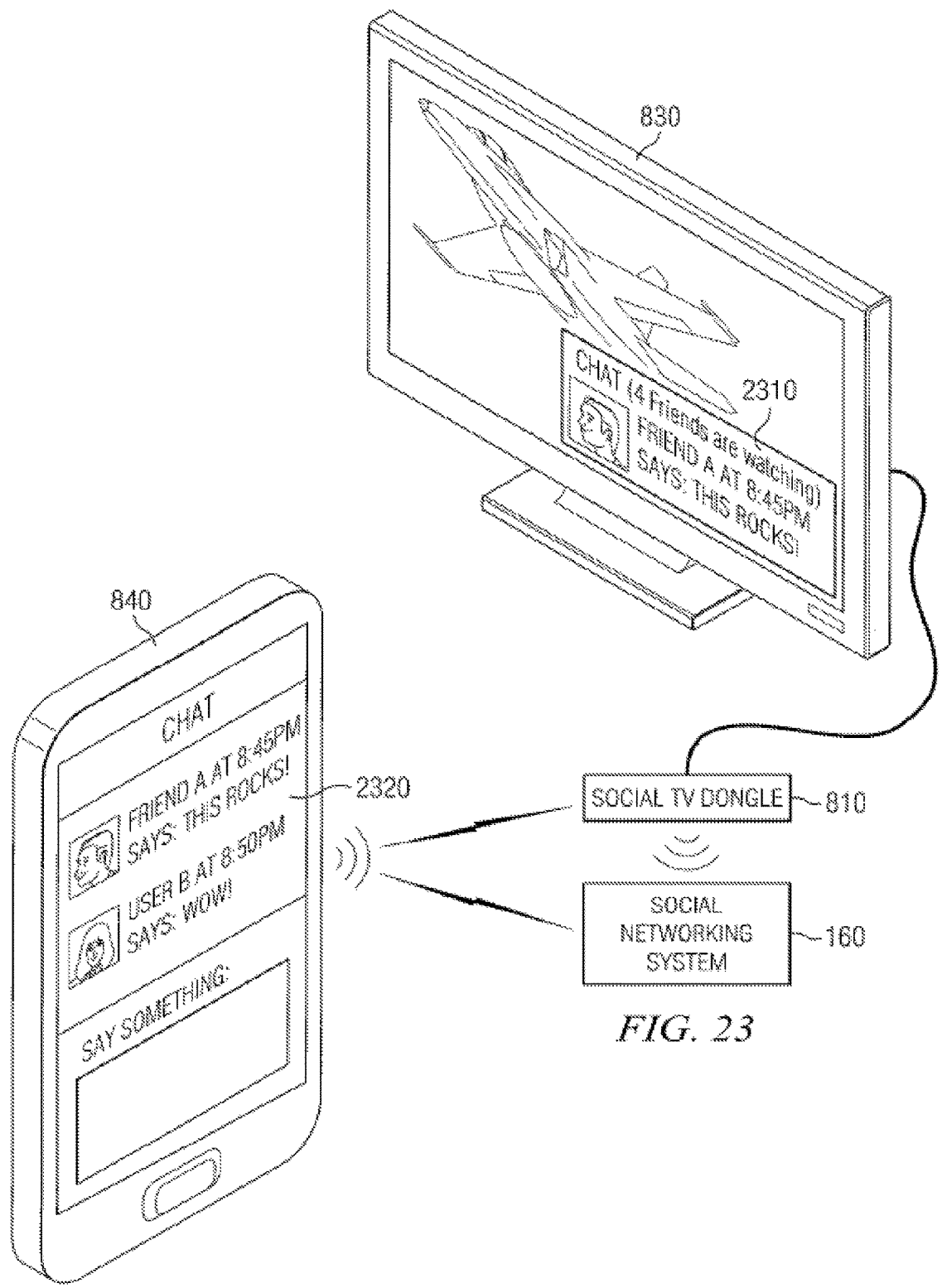
FIG. 23 illustrates an example environment for utilizing a second screen to participate in a chat session related to what is currently being displayed on a TV.

FIG. 23 illustrates embodiments in which a second screen of a device of user 101 is utilized to allow user 101 to participate in chat sessions related to what is currently being displayed on TV 830. In some embodiments, the second screen of user 101 may be mobile device 840 such as a smartphone, a tablet computer, or any other appropriate display device. In general, when user 101 selects a show to watch on TV 830, the show may be displayed on TV 830 and a mobile chat app 2320 may be automatically launched on mobile device 840 of user 101 that provides a dedicated chat experience for the show being viewed. This may enable user 101 to view chat messages from other users such as friends 101a-e who are currently watching the show or have watched the show in the past. In addition, user 101 may be able to post chat messages about the show. The chat messages may be time-stamped to allow the messages to appear to other users during the appropriate time during the show even if the show is being viewed in time-delay (e.g., from a DVR).

Mobile chat app 2320 may provide various chat experiences for user 101. In some embodiments, mobile chat app 2320 may include a general lobby for the show currently being viewed. For example, if the show being viewed is one of multiple episodes of a particular series, mobile chat app 2320 may include a general lobby for the particular series. In some embodiments, mobile chat app 2320 may include chat rooms for specific seasons or episodes of a particular series. Some embodiments may provide private chat rooms in which users 101 may conduct private conversations about the current show that are not posted to social networking system 160.

In operation, when user 101 selects a program to view on TV 830, mobile chat app 2320 may be automatically launched on mobile device 840. Alternatively, user 101 may manually launch mobile chat app 2320 on mobile device 840. In some embodiments, user 101 may be presented with options to join various chat rooms such as a general lobby for the particular series, chat rooms for specific seasons or episodes of a particular series, and private chat rooms. Once user 101 has selected a chat room, one portion of mobile chat app 2320 may begin displaying chat messages about the show currently being viewed on TV 830. In some embodiments, chat messages from both friends 101a-e and other users who are not friends of user 101 may be displayed in chat app 2320. The chat messages displayed in mobile chat app 2320 may automatically update as users post chat message about the current show. As a result, user 101 may be able to quickly jump into a chat environment with friends and strangers about a specific show user 101 is currently viewing on TV 830.

In certain embodiments, a portion of chat app 2320 may provide an area that allows user 101 to create chat messages. As illustrated in FIG. 23, for example, a lower portion of mobile chat app 2320 may provide a text input area that allows user 101 to enter text using mobile device 840 in order to create a chat message about the current show being viewed on TV 830. In some embodiments, voice recognition may be utilized to enter text into mobile chat app 2320. In one example, a microphone of mobile device 840 may be utilized to capture spoken chat messages by one or more users 101. Mobile device 840 may then convert the spoken chat messages into text that is displayed in the text input area of mobile chat app 2320. User 101 may then edit or approve the chat message for posting to social networking system 160. In another example, voice recognition may be utilized to automatically add a conversation taking place in a room to a chat session (with our without the use of a second screen of user 101 such as mobile device 840). For example, a microphone coupled to social TV dongle 810 or a microphone of mobile device 840 may capture a conversation between two or more users watching a show on TV 830. This conversation may be analyzed by social TV dongle 810 or sent to social networking system 160 for analysis using voice recognition. The conversation may be converted to chat messages and automatically posted to a chat room associated with the show currently being viewed on TV 830. In some embodiments, the conversation may be determined by subtracting audio of what the user is currently watching from the captured audio.

In certain embodiments, chat message displayed in mobile chat app 2320 on mobile device 840 are concurrently shown on TV 830 in a chat area 2310. In some embodiments, chat area 2310 may be social area 1140 described above. Chat area 2310 may be any shape, size, or transparency and may be located in any location on the screen of TV 830. In some embodiments, chat area 2310 may be placed on TV 830 to avoid important areas of the screen, as discussed above. In certain embodiments, the shape, size, or location of chat area 2310 may be dynamically altered, as discussed above. For example, chat area 2310 may be located to avoid overlapping faces, static portions of the screen such as a scoreboard, or any other determined important area of the screen. In some embodiments, social networking system 160 may send chat messages to social TV dongle 810 for display in chat area 2310.

The chat messages that are displayed in chat area 2310 on TV 830 may in some embodiments include all the chat messages that are displayed in chat app 2320. However, some embodiments may filter the chat messages to only display chat messages that are important to user 101 in chat area 2310 on TV 830. For example, FIG. 23 illustrates two chat message displayed in chat app 2320 of user 101—one chat message from Friend A and one chat message from User B. Friend A may refer to friends 101a-e of user 101 and User B may refer to any other user of social networking system 160 who does not have a connection in social graph 300 to user 101 (e.g., is not a friend of user 101). Because user 101 may not want to view every chat message on TV 830 about the current program being viewed, social networking system 160 may cause only chat messages of friends 101a-e of user 101 to be displayed in chat area 2310 on TV 830. For example, as illustrated in FIG. 23, only the chat message from Friend A of user 101 is displayed in chat area 2310 on TV 830 of user 101. Social networking system 160 may determine what chat message to display in chat area 2310 on TV 830 using preferences from user 101 (e.g., user 101 indicates only to display chat messages of friend, friends of friends, chat messages according to likes, etc.), connections to user 101 in social graph 300, or any other appropriate method.

In some embodiments, chat messages associated with programs being viewed on TV 830 may be time-stamped to allow the chat messages to be synced with the program and later viewed at the same point within the program as when the chat messages were originally posted. For example, many users utilize a DVR to view recorded programs at a later time from when they were originally broadcast. To allow users who are viewing recorded or time-shifted content to also view chat messages related to the content, some embodiments time-stamp chat messages and store the chat messages to be displayed at a later time when the content is being viewed. For example, social networking system 160 may store time-stamped chat messages in a data repository such as a database. The chat messages may be time-stamped with, for example, an absolute time (e.g., Feb. 1, 2010 at 23:12) or a time relative to the content associated with the chat message (e.g., 0:16 after the beginning of the program). In addition, some embodiments may store other metadata with the chat messages such as an identification of the user who posted the chat message, an identification of the content associated with the chat message, and the like. Then, when users view the content at a later time, the stored chat messages related to the content may be retrieved and displayed to the users at the appropriate time in the content. For example, if a particular friend of a user made the comment "THIS ROCKS!" during a point of a show, that comment may appear at that same point of the show to users viewing the show at a later time. The comments may appear on mobile device 840, TV 830, or both devices concurrently. As a result, users may be able to view relevant chat messages about the content currently being viewed even if the content is being viewed at a later time from when the content originally aired.

In some embodiments, chat messages related to content being viewed on TV 830 may be organized by social networking system 160 for presentation to users 101 of social networking system 160. For example, social networking system 160 may organize all chat messages about a particular TV show into comment threads based on the content. In some embodiments, this may include comment threads for particular shows, particular episodes, particular seasons, etc. These comment threads may then be viewed by users 101 using, for example, a web browser. In certain embodiments, social networking system 160 may dynamically form groups of users 101 based on detected shared content experience. For example, if social networking system 160 detects that certain users 101 have all viewed a particular TV show, social networking system 160 may recommend that each of the users join a group on social networking system 160 for that particular show.

In some embodiments, user 101 may participate in a video chat about the current show being viewed. For example, webcam 970 coupled to social TV dongle 810 may capture video of user 101 as he is watching a particular show. At the same time, other webcams 970 may capture video of other users watching the particular show. Social networking system 160 may then display the videos of each user in small boxes within chat area 2310 on TV 830. For example, social networking system 160 may display the videos of a certain number of friends of user 101 who are also currently watching the particular show. In some embodiments, face detection may be utilized to only display the face or head of users 101 within chat area 2310. In certain embodiments, gestures of user 101 for video chats may be captured and analyzed as discussed above. For example, user 101 may perform a "shhhh" gesture in order to mute one or more other users being displayed in the video boxes within chat area 2310 on TV 830. Social TV dongle 810 may capture and determine this gesture by user 101 and mute the appropriate video of the user within chat area 2310 that user 101 indicates to mute.

In some embodiments, an indication of second screen augmentation is presented to user 101. For example, an indication such as an icon may be presented to user 101 to indicate that a certain program is available for second-screen interaction (e.g., the user may chat about the program on a mobile device while watching the program on a TV). In some embodiments, the indication may be shown in a newsfeed or a list view of available programs. In some embodiments, the indication may be presented either before or after user 101 selects to tune to a particular program.

Figure 24:
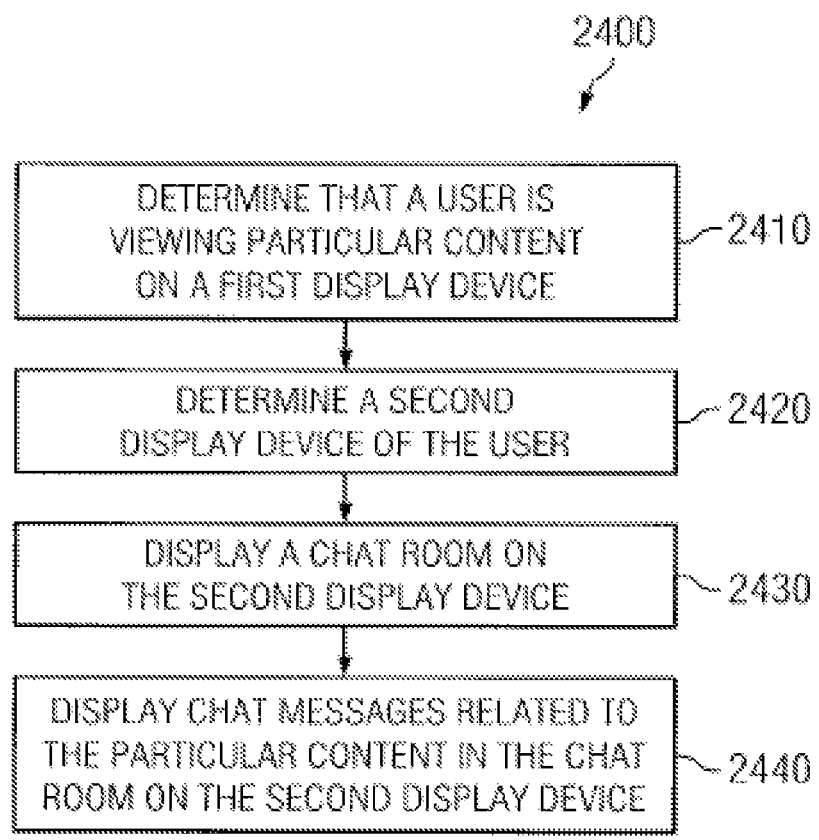
FIG. 24 illustrates an example method for utilizing a second screen to participate in a chat session related to what is currently being displayed on a TV.

FIG. 24 illustrates an example method 2400 for utilizing a second screen to participate in a chat session related to what is currently being displayed on a TV. The method may begin at step 2410, where it is determined that a user is viewing particular content on a first display device. For example, it may be determined that the user is viewing a particular show on TV 830.

At step 2420, a second display device of the user is determined. In some embodiments, the second display device is a mobile device of the user. In some embodiments, the second display device is TV 830.

At step 2430, a chat room is displayed on the second display device. The chat room may include various rooms such as a general lobby for a particular series of a show. In some embodiments, the chat room may include chat rooms for specific seasons or episodes of a particular series. Some embodiments may provide private chat rooms in which users may conduct private conversations about the current show.

At step 2440, chat messages related to the particular content are displayed in the chat room on the second display device. The chat message may be determined from a social graph such as social graph 300. In some embodiments, chat messages from friends and non-friends of the user are displayed in the chat room. In certain embodiments, only chat message from friends are displayed in the chat room. In some embodiments, the user may specify preferences regarding what chat messages to display. In certain embodiments, important chat message are displayed on both the first and second display devices.

Particular embodiments may repeat one or more steps of the method of FIG. 24, where appropriate. Although this disclosure describes and illustrates particular steps of the method of FIG. 24 as occurring in a particular order, this disclosure contemplates any suitable steps of the method of FIG. 24 occurring in any suitable order. Moreover, although this disclosure describes and illustrates particular components, devices, or systems carrying out particular steps of the method of FIG. 24, this disclosure contemplates any suitable combination of any suitable components, devices, or systems carrying out any suitable steps of the method of FIG. 24.

Figure 25:
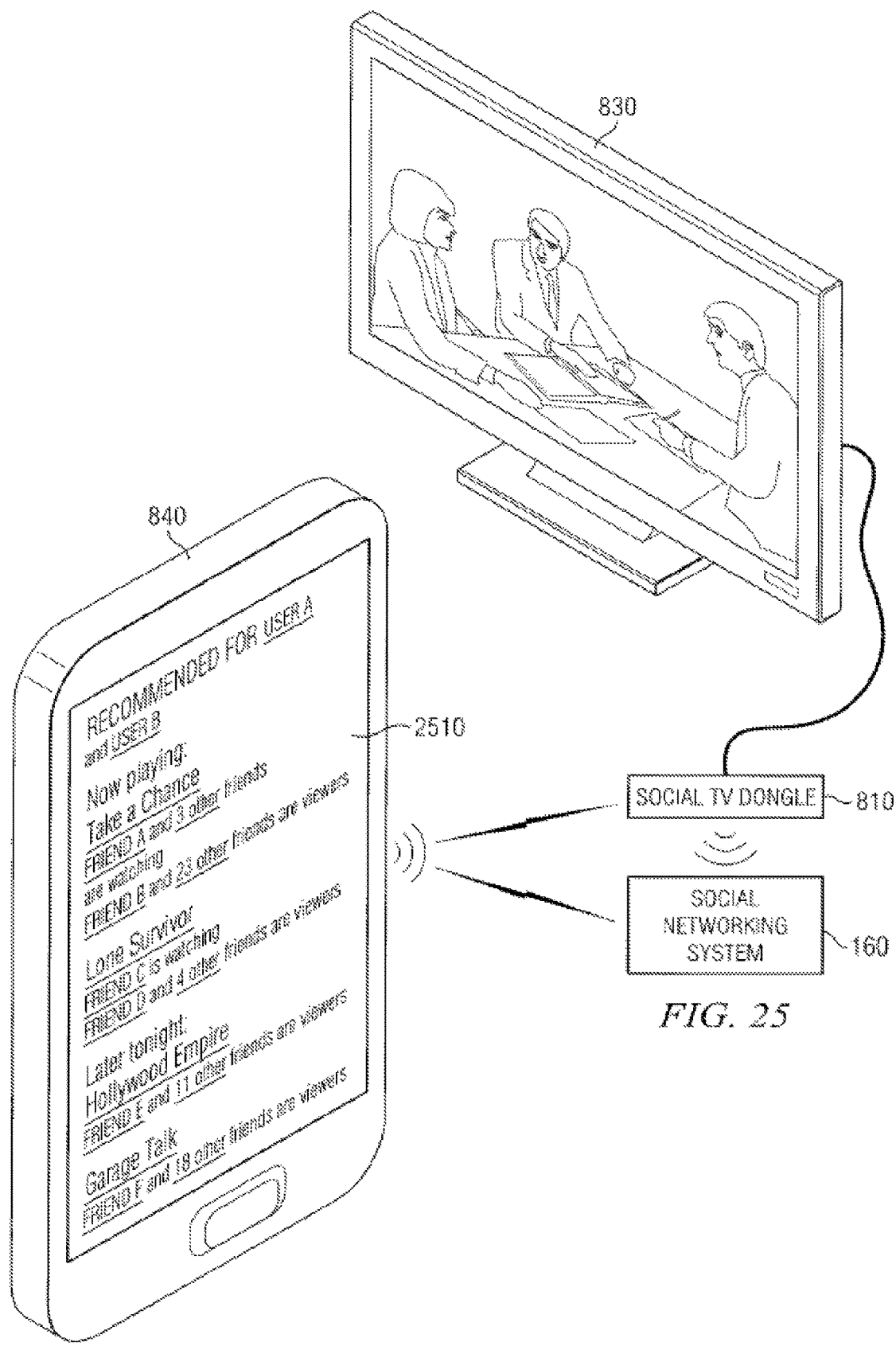
FIG. 25 illustrates an example playlist for content to be viewed on a TV.

FIG. 25 illustrates embodiments in which a playlist 2510 for content to be viewed on TV 830 is generated and presented to one or more users 101. In some embodiments, playlist 2510 is a shared playlist that combines interests of two or more users. In general, playlist 2510 is generated using users' interests as determined by social networking system 160 using social graph 300. In some embodiments, playlist 2510 is generated by MSO 402 using information obtained from social networking system 160 about one or more users 101. In some embodiments, playlist 2510 is generated by social networking system 160. Playlist 2510 may be displayed on mobile device 840, TV 830 (e.g., as a programming guide), or any other appropriate device. Playlist 2510 may allow multiple users 101 to view content that is relevant to all of their interests. As a result, the social experience of the users may be increased.

In certain embodiments, playlist 2510 is a list of one or more movies, TV shows, or other content to be viewed on TV 830. The content of playlist 2510 may be determined based on the interests of two or more users. For example, consider a couple trying to decide what to watch together on TV 830. The couple may seek a recommendation using, for example, mobile device 840 or remote control device 950. In some embodiments, MSO 402 may detect the requested recommendation and send a query to social networking system 160 for information about the users. In some embodiments, social networking system 160 may detect the requested recommendation using, for example, social TV dongle 810 and proceed to query social graph 300 for information about the users. The information may include, for example, what the users are doing, posts of the users, likes of the users, mutual friends of the users, posts or likes by mutual friends of the users, programming guides of mutual friends of the users, etc. This information may then be used to determine content to include in playlist 2510. As a specific example, if the users and their mutual friends have recently discussed the topic "weddings" on social networking system 160, then playlist 2510 may include TV shows or movies about weddings.

In certain embodiments, social TV dongle 810 may determine who is viewing TV 830 in order to determine content to provide in playlist 2510. For example, social TV dongle 810 may utilize any method discussed above to determine who is in close proximity to TV 830 or social TV dongle 810. These methods may include utilizing BLUETOOTH to gather information from multiple mobile devices 840 as discussed above, utilizing webcam 970 and facial recognition technology to detect users' faces in the room, using voice recognition to detect users' voices, etc. Once social TV dongle 810 or social networking system 160 determines who is in the room, social graph 300 may be queried to determine the interests of all the determined users. The interests of all the determined users may then be combined to determine the content for playlist 2510. Particular embodiments of determining shared interests are discussed further below.

In certain embodiments, social networking system 160 may utilize social coefficients to determine content for playlist 2510. For example, social networking system 160 may first query social graph 300 to determine social coefficients of programs for an individual user 101. In some embodiments, this may involve determining social coefficients of all available content in social networking system 160. Some embodiments may utilize coefficients as described in U.S. patent application Ser. No. 12/978,265 entitled "Contextually Relevant Affinity Prediction in a Social Networking System," which is incorporated herein by reference. Social networking system 160 may utilize the following information from social graph 300 in determining coefficients of specific programs for individual user 101:

- the number of friends 101*a-e* of user 101 who have liked the specific program
- the total number of users of social networking system 160 who have liked the specific program
- the number of friends 101*a-e* of user 101 who are currently watching the specific program
- the total number of users of social networking system 160 who are currently watching the specific program
- a taste algorithm (e.g., users who liked the specific program will also like this other program.)

Social networking system 160 may then combine the information above in order to determine a coefficient associated with user 101 for each program. For example, consider a scenario in which a query of social graph 300 for the specific program yielded the following results:

- the number of friends 101*a-e* of user 101 who have liked the specific program=5
- the total number of users of social networking system 160 who have liked the specific program=1000
- the number of friends 101*a-e* of user 101 who are currently watching the specific program=2
- the total number of users of social networking system 160 who are currently watching the specific program=250

The combination of these example results would yield a coefficient of 5+1000+2+250=1257 for this program for user 101. Social networking system 160 then performs similar calculations in order to determine coefficients of other programs for user 101. In certain embodiments, the resulting coefficients of all shows are then ranked for user 101. A predetermined number of the top-ranked shows may then be presented to user 101 in playlist 2510.

In embodiments where it is determined that multiple users 101 are viewing TV 830, social networking system 160 may first determine specific programs to recommend to each individual user 101 as discussed above (e.g., using social coefficients) and then perform group aggregation in order to determine recommendations for the group of users 101. For example, consider a scenario where three users 101 are seeking recommendations on what to watch on TV 830. Social networking system 160 may first determine social coefficients as discussed above for a first show for each of the three users. Social networking system 160 may then average the three coefficients for the first show to determine an averaged coefficient for the first show. Social networking system 160 may then perform similar computations for other shows to determine averaged coefficients for each show. The average coefficients may then be ranked for the three users and a predetermined number of the top-ranked shows (or shows that have a coefficient greater than a predetermined amount) may then be presented in a shared playlist 2510 for the three users. As a specific example, the following coefficients may be determined for shows A, B, and C for the three users:

User 1: show A coefficient=30; show B coefficient=50, show C coefficient=2
User 2: show A coefficient=100; show B coefficient=40, show C coefficient=1
User 3: show A coefficient=200; show B coefficient=300, show C coefficient=3

The coefficients above may then be averaged to determine average coefficients as follows:

Show A average coefficient=(30+100+300)/3=110
Show B average coefficient=(50+40+300)/3=130
Show C average coefficient=(2+1+3)/3=2

The average coefficients may then be ranked for the three users and a predetermined number of the top-ranked shows (or shows that have a coefficient greater than a predetermined amount) may then be presented in a shared playlist 2510 for the three users. In the above example, Show B may be listed first in playlist 2510, followed by Show A, and then Show C.

In some embodiments, weighting factors may be used in determining average coefficients of a group of users. For example, consider a family that includes a father, a mother, and a child. Social networking system 160 may apply weights to the coefficients of the father, mother, and child in calculating the average coefficients above. For example, if social networking system 160 determines that the father watches the most TV shows, social networking system 160 may apply a higher weight to his coefficients than the mother or child. Or, if social networking system 160 determines that most of the TV shows watched in the house are children's shows, it may apply a higher weight to the child's coefficients than the mother or father. Thus, recommendations in playlist 2510 may be altered to prioritize content for the person who consumes the most TV shows.

In some embodiments, social networking system 160 finds the union of individual show recommendations when determining what content to display in a shared playlist 2510. For example, if two users are seeking recommendations on what to watch on TV 830, social networking system 160 may first determine shows to recommend for each individual user as discussed above. Social networking system 160 may then determine whether there are any common recommended shows for the two users. For example, if Shows A and B are recommended to a first user and Shows A and C are recommended to a second user, Show A may be included in a shared playlist 2510 for the two users, since it was recommended to both users.

As discussed above, a taste algorithm may be utilized by social networking system 160 to determine recommendations to include in playlist 2510. For example, social networking system 160 may first determine first programs that user 101 watched, liked, or otherwise interacted with on social networking system 160. In some embodiments, the first programs may be determined using social graph 300 or social TV dongle 810. In some embodiments, the programs may be any of live TV, programming from OTT provider 403 such as Netflix, programs from a DVR, on-demand programming, and the like. Once the first programs have been determined, social networking system 160 may then search social graph 300 to determine other users or friends 101*a-e* of user 101 who also watched, liked, or otherwise interacted with the first program on social networking system 160. Social networking system 160 may then search social graph 300 for second programs that the determined users or friends watched, liked, or otherwise interacted with on social networking system 160. The determined second programs may then be recommended to user 101 in playlist 2510 as discussed above. In some embodiments, weighting factors may be utilized in determining what shows to recommend to a user. For example, second programs viewed by a user's friends may have a higher weight in determining recommendations for a user than second programs viewed by users who are not friends.

As an example for illustrative purposes only, consider a scenario where a first user has liked the program "Garage Talk" in the past. Social networking system 160 may query social graph 300 in order to determine other users or friends of the first user who have also liked "Garage Talk." For example, social networking system 160 may determine that Friend A and User B also liked "Garage Talk." Social networking system 160 may then query social graph 300 for other shows liked by the other users or friends who also liked "Garage Talk." For example, social networking system 160 may determine that Friend A and User B, who liked "Garage Talk," also liked the shows "Shop Journal" and "Cars Galore." Social networking system 160 may then recommend "Shop Journal" and "Cars Galore" to the first user. If, for example, Friend A liked "Shop Journal" and User B (who is not a friend of the first user) liked "Cars Galore," then "Shop Journal" may appear higher in playlist 2510 than "Shop Journal."

In some embodiments, social networking system 160 may cross-reference the actors or the people who were involved in making a particular program in determining what shows to recommend to user 101 in playlist 2510. For example, social networking system 160 may access an external database such as the Internet Movie Database (IMDb) in order to determine the actors, producers, writers, etc. of a particular show liked or watched by user 101 or the connections of user 101. Social networking system 160 may then cross-reference the determined information with other shows in order to determine other shows that the actors, producers, writers, etc. were also involved with. As an example for illustrative purposes only, consider a scenario where friend 101*a* of user 101 likes Show A that features Actors A and B. Social networking system 160 may recommend Show A to user 101 if it determines that user 101 likes Actor B. That is, because both user 101 and friend 101*a* like actors that are in a particular show, social networking system 160 may recommend that user 101 and friend 101*a* watch the same show.

In some embodiments, other data points may be used to infer how much a user liked a particular show. For example, social networking system 160 may determine how much of a particular show a user watched before changing the channel, turning off TV 830, or any other action that indicates disinterest in a TV show. Some embodiments may determine this using, for example, social TV dongle 810 discussed above. In certain embodiments, social networking system 160 may determine that a user began viewing a show and then checked in at another location before the end of the show. In certain embodiments, this may indicate that the user became disinterested in the show. In some embodiments, social networking system 160 may determine where the user checked before the end of the show. If, for example, the user stopped watching a sporting event and then checked in at a sports bar, social networking system 160 may determine that the user did not become disinterested in the sporting event but instead went to a location to continue watching the sporting event with others. Social networking system 160 may utilize posts to social networking system 160, GPS data from mobile device 840, or any other appropriate data to determine whether the user became disinterested in a particular show.

In certain embodiments, social networking system 160 may determine trending shows to recommend to user 101 in playlist 2510. For example, social networking system 160 may analyze posts, likes, or any other interaction with social networking system 160 in order to determine shows that are trending. Shows that are trending may be, for example, shows that have received the most likes within a predetermined period. Social networking system 160 may then include one or more trending shows in playlist 2510.

In some embodiments, users 101 may be notified when a particular program is viewed by a large percentage of their friends. For example, if over half of friends 101*a-e* of user 101 are currently viewing or plan to view a particular program, a notification of the program may be sent to user 101 via social networking system 160. In some embodiments, social networking system 160 may determine that a large percentage of a user's friends are watching or are planning to watch a program using one or more of the coefficients discussed above, close friends of the user (i.e., using social graph 300), similar tastes, and the like. In some embodiments, the notification may include a link or button that allows user 101 to press to begin watching the recommended show.

In some embodiments, social networking system 160 may provide a "best for you" recommendation to user 101 in playlist 2510. The "best for you" recommendation may be the program chosen from the currently available programs that user 101 is most likely to watch. In some embodiments, social networking system 160 may first determine programs that are currently available to watch (e.g., programs that are currently airing, programs that are available via pay-per-view, programs that are recorded on a DVR, programs available from services such as Hulu and Netflix, etc.). Social networking system 160 may then perform any appropriate method to rank the available programs according to what user 101 is likely to want to watch. In some embodiments, this may include using social coefficients described above. Social networking system 160 may then choose the top-ranked program and present an option to user 101 to view the program. In certain embodiments, the top-ranked program may be presented to user 101 along with an indication such as "best for you" or any other appropriate indication.

Figure 26:
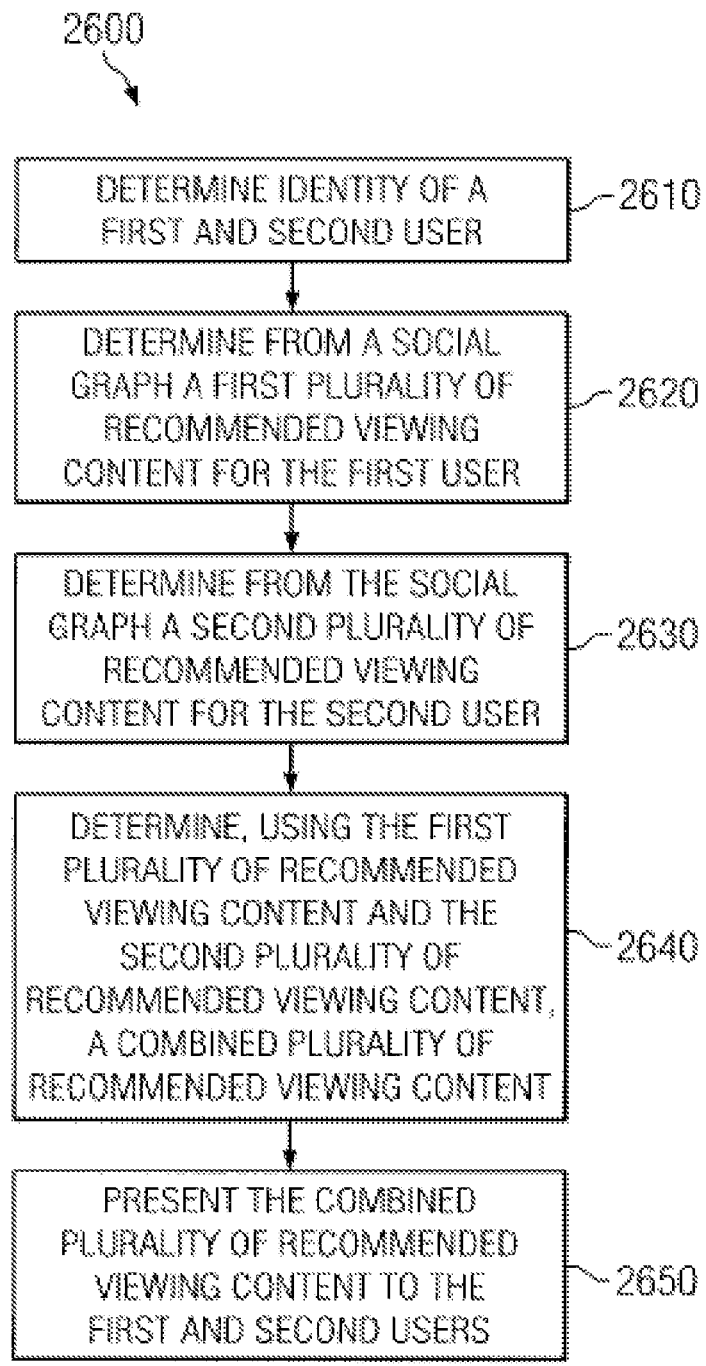
FIG. 26 illustrates an example method of generating an example shared playlist.

FIG. 26 illustrates an example method 2600 for generating an example shared playlist. The method may begin at step 2610, where identities of a first and second user are determined. This may be accomplished by, for example, analyzing MAC addresses of the users' mobile devices.

At step 2620, a first plurality of recommended viewing content for the first user is determined. In certain embodiments, social graph 300 is utilized to determine the first plurality of recommended viewing content. In some embodiments, social coefficients may be used to determine the first plurality of recommended viewing content.

At step 2630, a second plurality of recommended viewing content for the second user is determined. In certain embodiments, social graph 300 is utilized to determine the second plurality of recommended viewing content. In some embodiments, social coefficients may be used to determine the second plurality of recommended viewing content.

At step 2640, a combined plurality of recommended viewing content is determined using the first plurality of recommended viewing content and the second plurality of recommended viewing content. In some embodiments, social coefficients may be used to determine the combined plurality of recommended viewing content. In some embodiments, the combined plurality of recommended viewing content may be the union of the first and second plurality of recommended viewing content.

At step 2650, the combined plurality of recommended viewing content is presented to the first and second users. In some embodiments, the combined plurality of recommended viewing content is displayed on a mobile device of one or both of the first and second users. In certain embodiments, the combined plurality of recommended viewing content is displayed on a TV that both users are viewing.

Particular embodiments may repeat one or more steps of the method of FIG. 26, where appropriate. Although this disclosure describes and illustrates particular steps of the method of FIG. 26 as occurring in a particular order, this disclosure contemplates any suitable steps of the method of FIG. 26 occurring in any suitable order. Moreover, although this disclosure describes and illustrates particular components, devices, or systems carrying out particular steps of the method of FIG. 26, this disclosure contemplates any suitable combination of any suitable components, devices, or systems carrying out any suitable steps of the method of FIG. 26.

Figure 27:
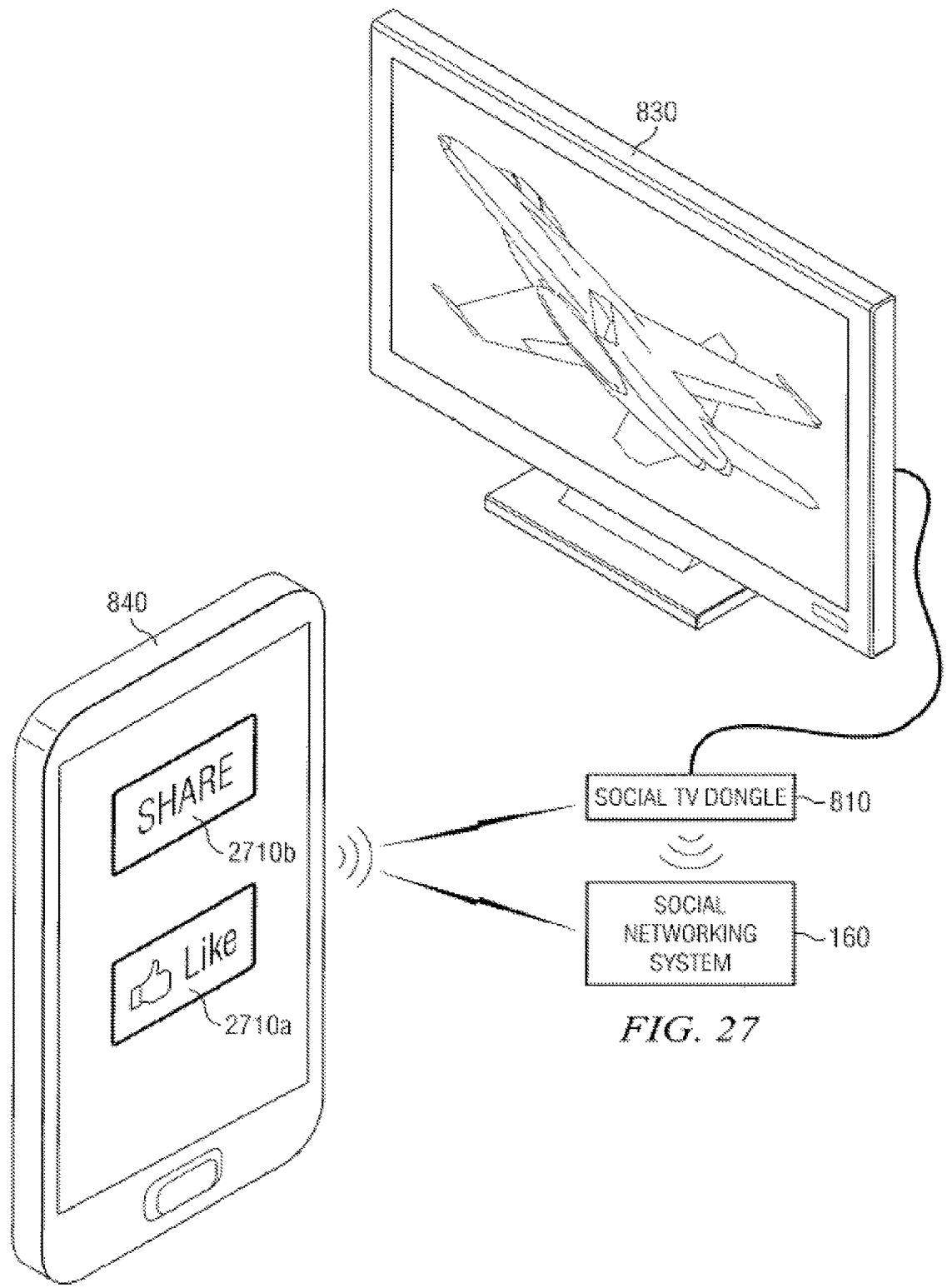
FIG. 27 illustrates example time-sensitive buttons that may be displayed in response to what is being shown on a TV.

FIG. 27 illustrates embodiments in which time-sensitive buttons 2710 may be displayed on mobile device 840 in response to what is being shown on TV 830. In general, time-sensitive buttons 2710 allow user 110 to post content to social networking system 160 that is synced with what is being displayed on TV 830. Time-sensitive buttons 2710 may include, for example, a like button 2710*a* and a share button 2710*b* as discussed below. User 101 may press or otherwise interact to select buttons 2710 when viewing content on TV 830. Mobile device 840 communicates an indication of the interaction with buttons 2710 to social networking system 160 either directly or via social TV dongle 810.

In certain embodiments, time-sensitive button 2710 may be a like button 2710*a* that allows user 101 to indicate to social networking system 160 that he likes content being shown on TV 830. For example, user 101 may press like button 2710*a* during a particular chase scene of a show "East Street" being viewed on TV 830. An indication of the user pressing like button 2710*a* during the chase scene may be sent to social networking system 160 where a post such as "User 101 likes the chase scene in East Street" may be posted to the wall of user 101. As another example, user 101 may press like button 2710a that appears on mobile device 840 during a commercial or advertisement for a specific product such as "Mega-Cola." An indication of the user pressing like button 2710a during the advertisement may be sent to social networking system 160 where a post such as "User 101 likes Mega-Cola" may be posted to the wall of user 101. In certain embodiments, the indication of the user pressing like button 2710a may cause an edge to be created in social graph 300. For example, if user 101 presses like button 2710a during a commercial or advertisement for "Mega-Cola," an edge 306 may be created between user node 302 for user 101 and a concept node 304 (e.g., a product page) for "Mega-Cola."

In some embodiments, like button 2710a may be used to indicate to social networking system 160 that user 101 likes any granularity of content on TV 830. For example, like button 2710a may be used to indicate that user 101 likes a particular channel, content provider, show, season, episode, scene, actor, product shown in a program, product shown in an advertisement or commercial, piece of music, or any other content shown on TV 830. In certain embodiments, like button 2710a may automatically appear on mobile device 840 while user 101 is watching content on TV 830. In some embodiments, like button 2710a may be manually displayed on mobile device 840 by user 101 by, for example, launching a mobile app on mobile device 840.

In certain embodiments, time-sensitive button 2710 may be a share button 2710b that allows user 101 to share content being shown on TV 830 with other users of social networking system 160. For example, user 101 may press share button 2710b during a particular play of a sporting event being viewed on TV 830. An indication of the user pressing share button 2710b during the particular play may be sent to social networking system 160 where a post that includes a clip or an image of the particular play may be posted to the wall of user 101. As another example, user 101 may press share button 2710b on mobile device 840 during a particular conversation occurring on TV 830. An indication of the user pressing share button 2710b during the conversation may be sent to social networking system 160 where a post that includes the text of the conversation (e.g., from subtitles or closed-captioning) may be posted to the wall of user 101.

In some embodiments, share button 2710b may be used to share any granularity of content shown on TV 830 with other users of social networking system 160. For example, share button 2710b may be used to share images, clips (e.g., short videos), text, music, or any other content shown on TV 830 with users of social networking system 160. In certain embodiments, share button 2710b may automatically appear on mobile device 840 while user 101 is watching content on TV 830. In some embodiments, share button 2710b may be manually displayed on mobile device 840 by user 101 by, for example, launching a mobile app on mobile device 840.

In some embodiments, a mobile app of social networking system 160 running on mobile device 840 may include an area that allows user 101 to explicitly share content currently being viewed. For example, the mobile app may include a text entry area in which the user can type a message such as "I'm watching Lone Survivor." In some embodiments, the text entry area may autocomplete a user's message. For example, if the user types "I'm watching," the mobile app may query the user's content providers (e.g., MSO 402) in order to determine what the user is currently watching. The mobile app may then autocomplete the user's phrase using the name of the program currently being viewed.

Figure 28:
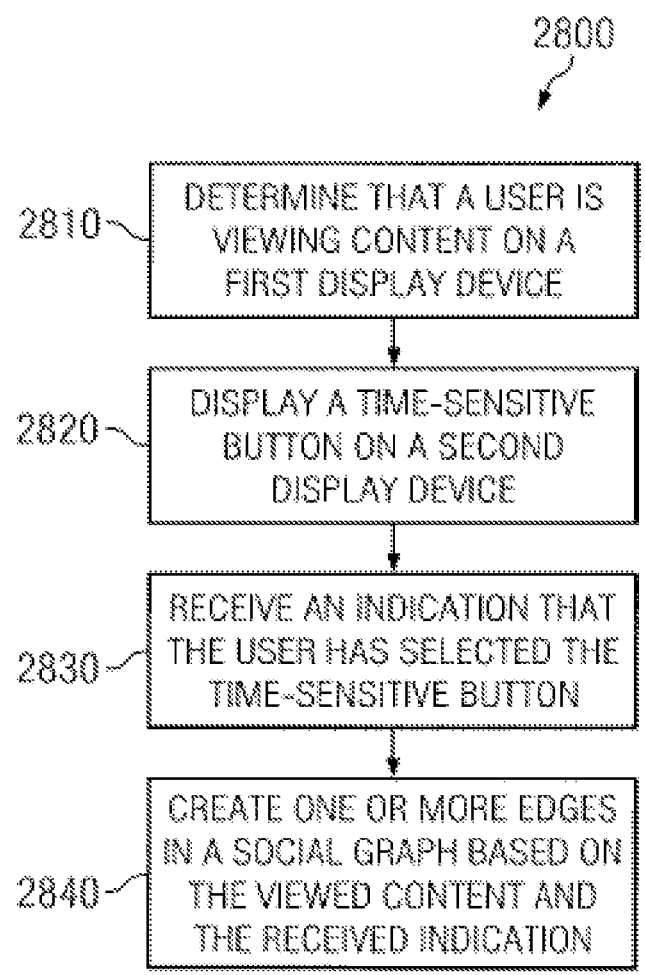
FIG. 28 illustrates an example method for displaying time-sensitive buttons in response to what is being shown on a TV.

FIG. 28 illustrates an example method 2800 for displaying time-sensitive buttons in response to what is being shown on a TV. The method may begin at step 2810, where it is determined that a user is viewing content on a first display device. For example, it may be determined that the user is viewing a particular show on TV 830.

At step 2820, a time-sensitive button is displayed on a second display device of the user. In some embodiments, the time-sensitive button is a like button. In some embodiments, the time-sensitive button is a share button. The time-sensitive button may appear automatically (e.g., from social networking system 160), or the user may manually launch the time-sensitive button using, for example, a mobile app on a mobile device.

At step 2830, an indication that the user has selected the time-sensitive button is received. In some embodiments, it is received at social networking system 160. In certain embodiments, the indication corresponds to the user pressing the time-sensitive button.

At step 2840, one or more edges are created in a social graph based on the viewed content and the received indication. For example, if the user presses the time-sensitive like button during a commercial for a specific product, social networking system 160 may add a "like" edge between nodes for the user and the specific product. As another example, if the user presses the time-sensitive share button during a movie, social networking system 160 may add a "recommend" edge between nodes for the user and the movie in the social graph.

Particular embodiments may repeat one or more steps of the method of FIG. 28, where appropriate. Although this disclosure describes and illustrates particular steps of the method of FIG. 28 as occurring in a particular order, this disclosure contemplates any suitable steps of the method of FIG. 28 occurring in any suitable order. Moreover, although this disclosure describes and illustrates particular components, devices, or systems carrying out particular steps of the method of FIG. 28, this disclosure contemplates any suitable combination of any suitable components, devices, or systems carrying out any suitable steps of the method of FIG. 28.

Figure 29:
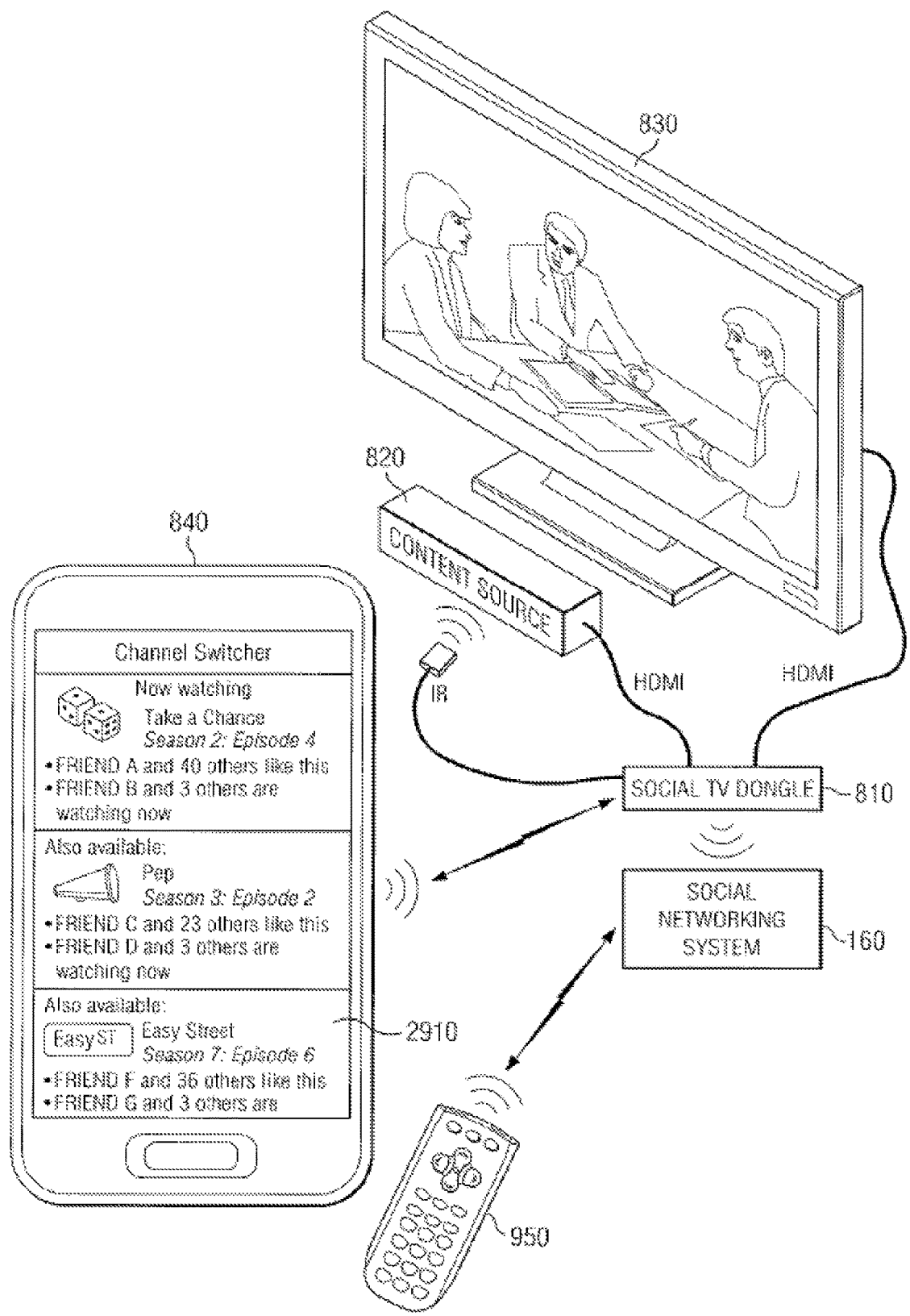
FIG. 29 illustrates an example environment in which devices may be utilized as smart remote controls for a TV.

FIG. 29 illustrates embodiments in which devices may be utilized as smart remote controls for TV 830. In some embodiments, mobile device 840 may display a channel switching mobile app 2910 that a user may interact with to control what is being viewed on TV 830. In some embodiments, remote control device 950 may be utilized to interact with social TV dongle 810 in order to control what is being viewed on TV 830. Social TV dongle 810 may control what is being viewed on TV 830 by sending commands via IR to content source 820. In some embodiments, social TV dongle 810 may be the only source of content for TV 830 and may receive content to display from social networking system 160. In some embodiments, channel switching mobile app 2910 may automatically appear when user 101 comes within close proximity to social TV dongle 810. In certain embodiments, channel switching mobile app 2910 replaces a lock screen of mobile device 840.

In some embodiments, user 101 may interact with channel switching mobile app 2910 on mobile device 840 to control what is viewed on TV 830. For example, user 101 may launch channel switching mobile app 2910 that displays available content to watch on TV 830. The available content may be, for example, a social programming guide (SPG) discussed below in reference to FIG. 31, recommendations as discussed above in reference to FIG. 25, or any other available content from social networking system social networking system 160, MSO 402, or OTT provider 403. In some embodiments, channel switching mobile app 2910 may display one or more facepiles (e.g., multiple photos of users of social networking system 160). In some embodiments, social content is provided in channel switching mobile app 2910. As illustrated in FIG. 29, for example, social data from social networking system 160 may be included next to shows that user 101 may select to watch. The social data may include, for example, friends or connections of user 101 who are currently watching the show, friends or connections of user 101 who like the show, friends or connection of user 101 who are planning to watch the show, or any other available social data for the show from social networking system 160. In addition, channel switching mobile app 2910 may include a button or link for each show that a user may press or otherwise interact with to begin watching the show. Once pressed, mobile device 840 may send an indication of the interaction to social TV dongle 810 or social networking system 160. Social TV dongle 810 may subsequently send IR commands to content source 820 in order to, for example, tune content source 820 to the appropriate channel for the selected show.

In some embodiments, user 101 may utilize remote control device 950 in order to interact with social TV dongle 810 and thus control what is viewed on TV 830. For example, a dedicated button may be included on remote control device 950 that allows control of social TV dongle 810. In some embodiments, the dedicated button may launch a user interface on TV 830 from social TV dongle 810 for controlling functions of TV 830. User 101 may then use general controls of remote control device 950 to control function of social TV dongle 810 or TV 830. Social TV dongle 810 may subsequently send IR commands to content source 820 in order to, for example, tune content source 820 to the appropriate channel for a selected show.

Figure 30:
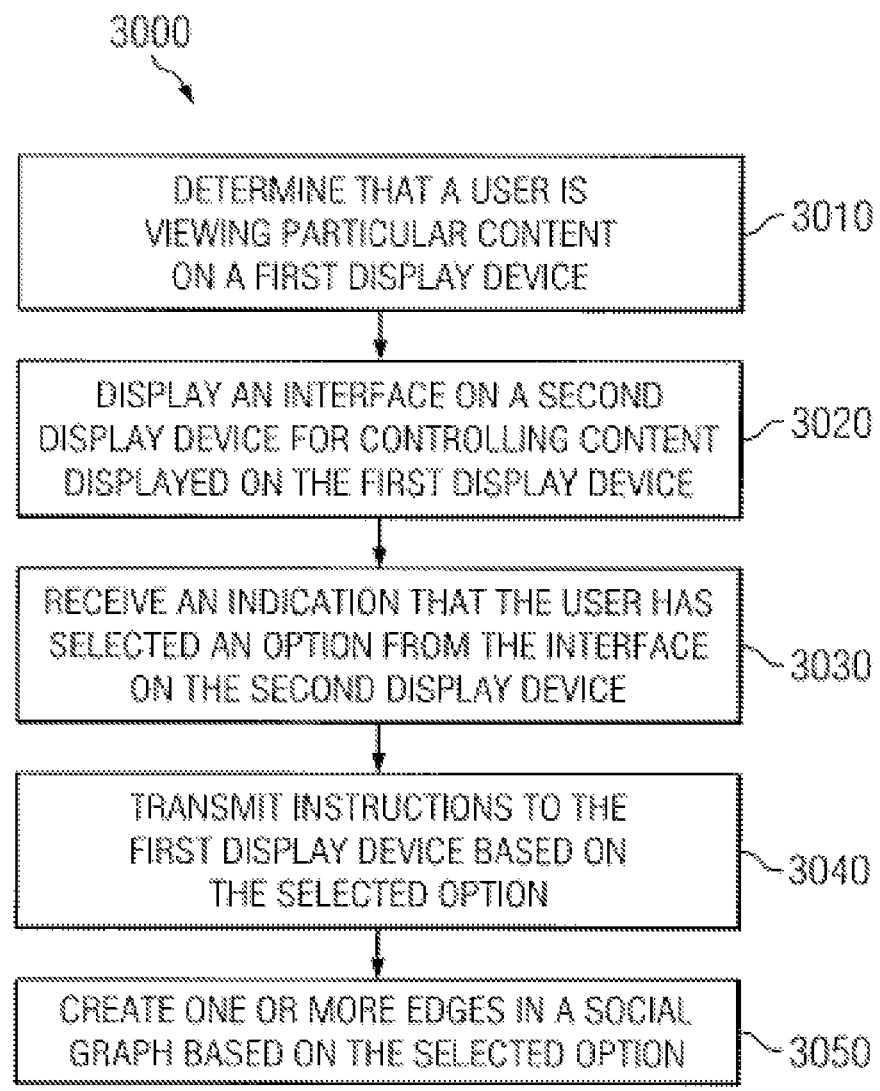
FIG. 30 illustrates an example method for utilizing devices as smart remote controls for a TV.

FIG. 30 illustrates an example method 3000 for utilizing devices as smart remote controls for a TV. The method may begin at step 3010 where it is determined that a user is viewing particular content on a first display device. For example, it may be determined that the user is viewing a particular show on TV 830.

At step 3020, an interface is displayed on a second display device for controlling content displayed on the first display device. In some embodiments, the interface may include shows or movies that the user may select to watch on the first display device. In certain embodiments, the interface may be displayed on a mobile device of the user.

At step 3030, an indication that the user has selected an option from the interface on the second display device is received. In some embodiments, the indication is received at social networking system 160. In certain embodiments, the indication corresponds to the user pressing a button, link, or icon on the interface.

At step 3040, instructions are sent to the first display device based on the selected option. In some embodiments, the instructions are sent to the first display device via social TV dongle 810. For example, the instructions may be to display a certain show or movie. In certain embodiments, social TV dongle 810 may send instructions via, for example, IR to content source 820.

At step 3050, one or more edges in a social graph are created based on the selected option. For example, if the user presses an icon to begin viewing a particular program, social networking system 160 may add a "watched" edge between nodes for the user and the particular program.

Particular embodiments may repeat one or more steps of the method of FIG. 30, where appropriate. Although this disclosure describes and illustrates particular steps of the method of FIG. 30 as occurring in a particular order, this disclosure contemplates any suitable steps of the method of FIG. 30 occurring in any suitable order. Moreover, although this disclosure describes and illustrates particular components, devices, or systems carrying out particular steps of the method of FIG. 30, this disclosure contemplates any suitable combination of any suitable components, devices, or systems carrying out any suitable steps of the method of FIG. 30.

Figure 31:
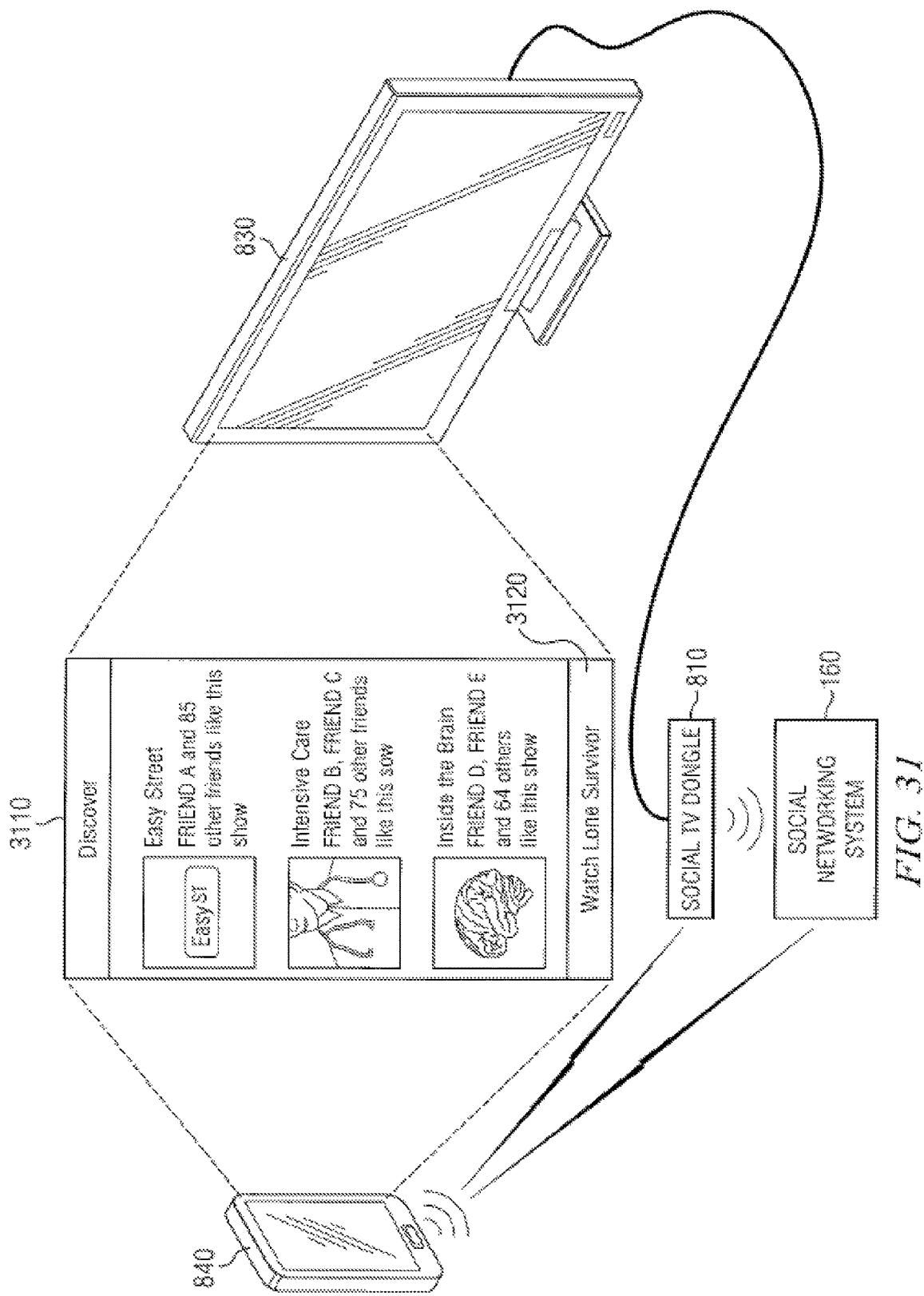
FIG. 31 illustrates an example social programming guide (SPG).

FIG. 31 illustrates a social programming guide (SPG) 3110 which may be displayed on mobile device 840 or TV 830. In general, SPG 3110 provides an easy and convenient way for user 101 to view and select available content to display on TV 830. Unlike a typical EPG that lists programs based on channel numbers, SPG 3110 aggregates content from multiple sources (e.g., OTT providers 403, MSOs 402, on-demand programming, DVRs, etc.) into a convenient list of content according to the user's interests. The user is not required to know where the content is being sourced from (e.g., from a STB or a DVR) or what channel is associated with the content. Instead, the user may simply tap an icon for an available program in SPG 3110 and the show will be displayed on TV 830. In certain embodiments, the available content in SPG 3110 is presented in the form of graphics similar to apps on mobile device 840.

SPG 3110 may include any available content to be viewed on TV 830. For example, SPG 3110 may include content from MSOs 402 that would typically be selected using a STB such as STB/gateway 404c. SPG 3110 may also include content from OTT provider 403 such as Hulu and Netflix. Content in SPG 3110 may also be on-demand content and may include an indication of the price to view the on-demand content. In some embodiments, SPG 3110 may display a facepile proximate to available content. The facepile may include, for example, images of other users (e.g., friends) who are watching the content, who are planning to watch the content, who have liked the content, or have interacted with the content in any other way on social networking system 160.

In some embodiments, the content in SPG 3110 may include recommended content for one or more users 101. For example, social networking system 160 may determine who is in the room and then tailor the content in SPG 3110 according to the determined user(s). For example, content in SPG 3110 may include recommended content from playlist 2510 described above.

In some embodiments, SPG 3110 may be displayed on mobile device 840 using, for example, a mobile app of social networking system 160. In some embodiments, SPG 3110 may be displayed on TV 830. In embodiments where SPG 3110 is displayed on TV 830, it may overlay or cover a programming guide from MSOs 402. In certain embodiments, SPG 3110 may completely replace the user interface of a STB or DVR. In some embodiments, the overlay methods described above in reference to FIGS. 8-12 may be utilized to hide the programming guide or channel numbers from MSO 402. As a result, users 101 may have an easier time locating relevant content to watch. In addition, there may be less confusion because users are not required to switch between multiple input sources.

In certain embodiments, sponsored shows may be included in SPG 3110. For example, a particular show or movie may be sponsored by MSO 402 or OTT provider 403. An icon 3120 for the sponsored show may appear in SPG 3110 where it may be more likely to be selected by the user. In some embodiments, the icon 3120 of the sponsored program may appear intermingled with recommended programs. In certain embodiments, as illustrated in FIG. 31, the icon 3120 of the sponsored program may appear in a separate portion of SPG 3110 (e.g., at the bottom of the screen of mobile device 840). In certain embodiments, MSO 402 or OTT provider 403 may pay a fee for a sponsored program to be included in SPG 3110.

In some embodiments, a particular icon in SPG 3110 may be a personalized queue for user 101. This personalize queue may include content that is the most recommended content for user 101 and may dynamically update. For example, social networking system 160 may determine recommendations for user 101 using the methods described above in reference to FIGS. 25-26. The recommendations may then be loaded into the personalized queue so that user 101 may simply push the icon of his personalized queue to being watching content recommended by social networking system 160. The content in the personalized queue may be a playlist that automatically plays the content sequentially without the user having to interact with mobile device 840, TV 830, or social TV dongle 810. In some embodiments, an "ADD TO QUEUE" indication may be available to user 101 in, for example, SPG 3110. This indication may allow user 101 to quickly place a program into his personalized queue. In some embodiments, when user selects an "ADD TO QUEUE" indication to add Show A to his personalized queue, social networking system 160 may automatically post a message such as "User 101 is planning to watch Show A" to social networking system 160. In some embodiments, friends 101a-e of user 101 may suggest programs into the personalized queue of user 101. This may be controlled by preferences of user 101.

In some embodiments, a particular icon in SPG 3110 may be a recommendation queue for user 101. This recommendation queue may include content that has been recommended to user 101 by friends 101a-e. For example, a particular friend 101a may want user 101 to view a particular show. He may indicate this to social networking system 160 using any appropriate button or link on social networking system 160. Social networking system 160 may then load the recommended show into the recommendation queue so that user 101 may simply push icon 3120 of his recommendation queue to being watching content recommended by his friends.

Figure 32:
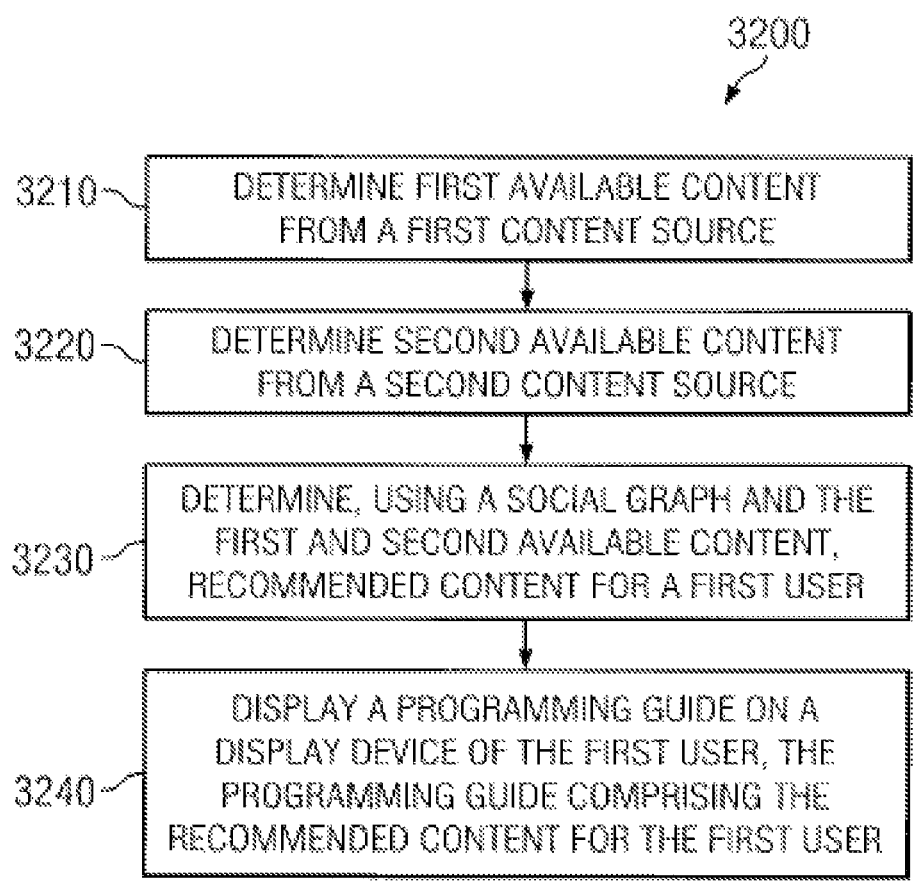
FIG. 32 illustrates an example method for providing an SPG.

FIG. 32 illustrates an example method 3200 for providing a SPG. The method may begin at step 3210, where first available content from a first content source is determined. For example, one or more TV shows may be determined from a source such as MSO 402. At step 3220, first available content from a second content source is determined. For example, one or more programs may be determined from a source such as OTT provider 403. In some embodiments, the first and second sources are different sources. In certain embodiments, the content sources may include a DVR, a STB, a website, a cable provider, an on-demand provider, and the like.

At step 3230, recommended content for a first user is determined. In some embodiments, the recommended content is determined using a social graph and the first and second available content. In some embodiments, social networking system 160 may query a social graph in order to determine social coefficients for each of the first and second available content. The social coefficients may be used in some embodiments to determine the recommended content.

At step 3240, a programming guide is displayed on a display device of the first user. In some embodiments, the programming guide includes the recommended content for the first user. In some embodiments, the programming guide masks the first and second content sources. That is, some embodiments mask channel numbers of the recommended content. In some embodiments, the programming guide is SPG 3110.

Particular embodiments may repeat one or more steps of the method of FIG. 32, where appropriate. Although this disclosure describes and illustrates particular steps of the method of FIG. 32 as occurring in a particular order, this disclosure contemplates any suitable steps of the method of FIG. 32 occurring in any suitable order. Moreover, although this disclosure describes and illustrates particular components, devices, or systems carrying out particular steps of the method of FIG. 32, this disclosure contemplates any suitable combination of any suitable components, devices, or systems carrying out any suitable steps of the method of FIG. 32.

Figure 33:
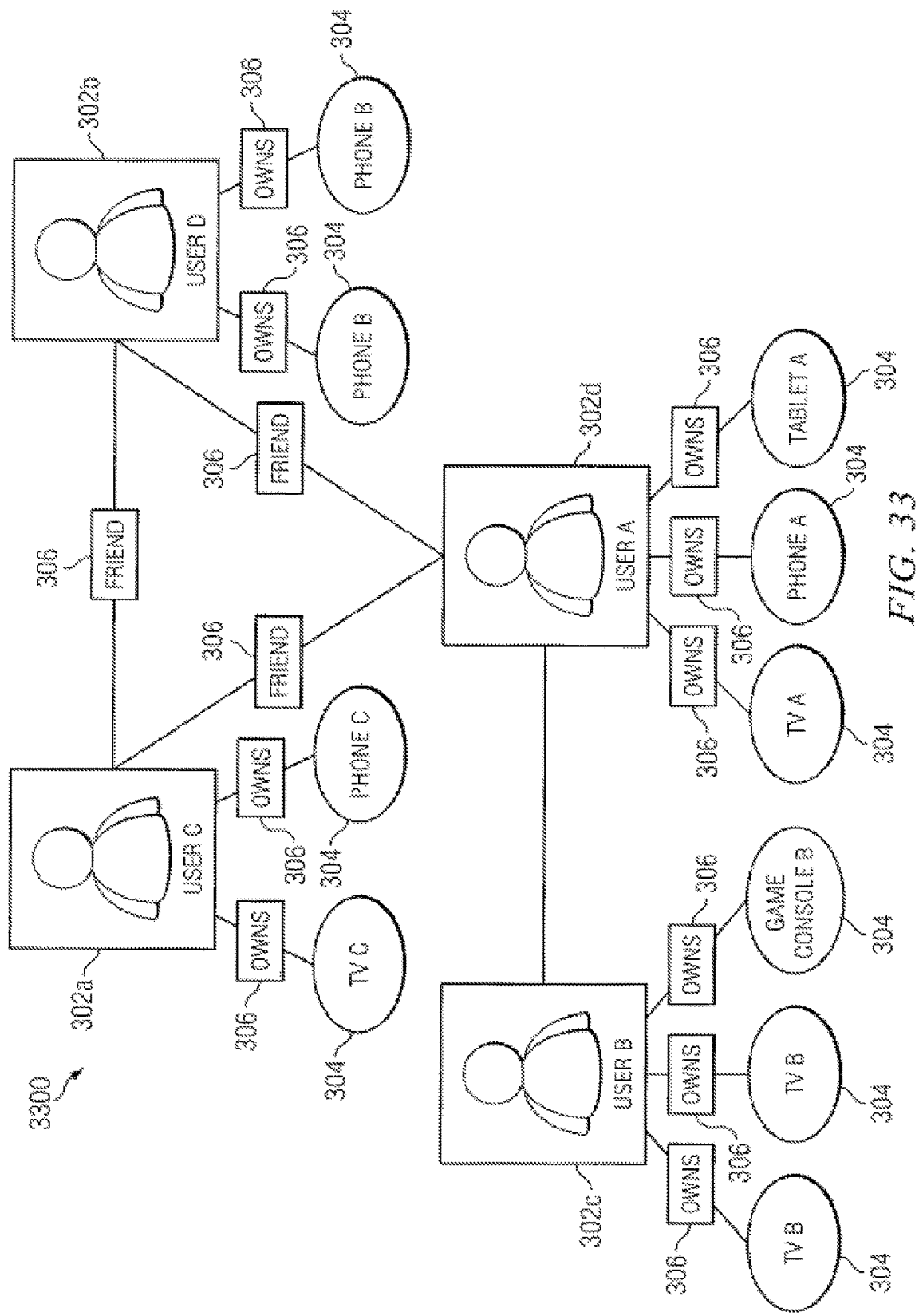
FIG. 33 illustrates an example social graph.

FIG. 33 illustrates a social graph 3300 that may be used to stream media to any device of user 101. In some embodiments, social graph 3300 may be an embodiment of social graph 300 above. Social graph 3300 includes concept nodes 304 for each device of user 101 that is capable of presenting any form of media (e.g., shows, movies, pictures, desktop, music, etc.) to user 101. For example, concept nodes 304 may be associated with any mobile device 840 of user 101, a TV 380 of user 101, any user device 1710, any client system 130, or any other device of user 101 capable of presenting media to user 101. In certain embodiments, concept nodes 304 of user device may be associated with an input or an output of the user device. Social graph 3300 also includes edges 306 that may indicate that a user "owns" the user devices associated with concept nodes 306.

In general, social graph 3300 with user device concept nodes 304 permits a user to stream any media that friends or other connections of the user are consuming. In one example, a first user may begin viewing a show on his TV at the same point in the show that one of his friends is currently viewing. As a result, the users may be able to simultaneously view the same TV show and interact with one another (e.g., chat as discussed above) through social networking system 160. As another example, a user may be able to display photos from his mobile device on one or more of his friend's TVs or mobile devices. These any many other examples of streaming media from one user's device to another user's device may be accomplished by social networking system 160 creating and analyzing the nodes and edges of social graph 3300.

In some embodiments, social networking system 160 may determine what service or device a user is currently using in order to determine what and how to stream media from another user. For example, social networking system 160 may analyze a user's interactions with social networking system 160 in order to determine whether the user is currently interacting with social networking system 160 using a smartphone, a computer, a tablet computer, or any other user device. As another example, social networking system 160 may determine whether a user is currently communicating with social networking system 160 using WiFi, cellular communications such as 4G, or any other appropriate communications. Once the type of service or user device is determined, social networking system 160 may modify the content being shared from another user. For example, if social networking system 160 determines that a user is currently utilizing a smartphone over 4G, it may optimize a video stream to be streamed to the smartphone over 4G. As another example, if social networking system 160 determines that a user is currently utilizing a TV 830 coupled to social TV dongle 810, social TV dongle 810 may optimize a video stream to be viewed on TV 830.

In some embodiments, social networking system 160 may determine an optimal user device in which to display shared content from another user. For example, social networking system 160 may determine that a user is attempting to view a video stream that a friend is currently viewing. Social networking system 160 may then determine that the optimal display device for the shared video stream would be a TV 830. As another example, social networking system 160 may determine that a user is attempting to view a photo that a friend is currently viewing on his mobile device 840. Social networking system 160 may then determine that the optimal display device for the shared photo would be another mobile device 840.

Figure 34:
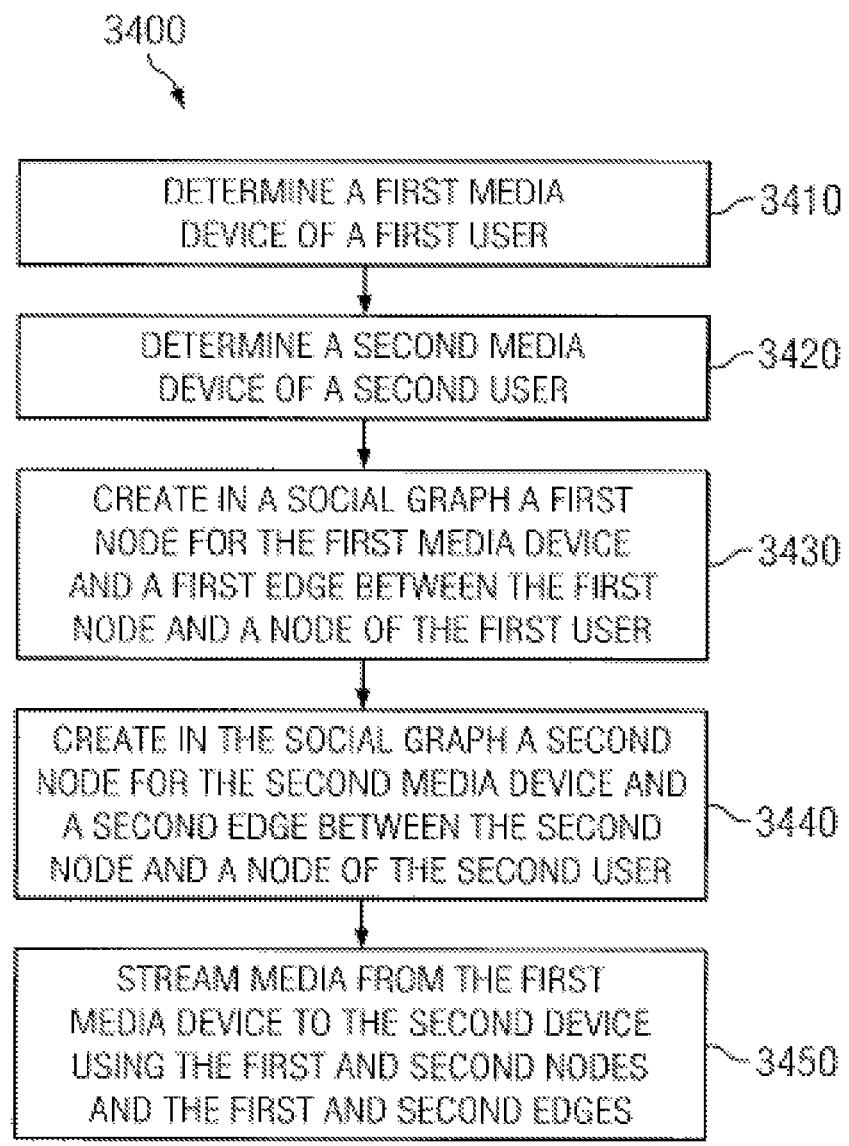
FIG. 34 illustrates an example method for streaming media to multiple user devices.

FIG. 34 illustrates an example method 3400 for streaming media to multiple user devices. The method may begin at step 3410, where a first media device of a first user is determined. As step 3420, a second media device of a second user is determined. For example, the media devices may include a smartphone, a TV, a digital music device, a laptop, a tablet computer, and the like.

At step 3430, a first node for the first media device and a first edge between the first node and a node of the first user is created in a social graph. In some embodiments, the social graph may refer to social graph 3300. In some embodiments, the first edge may be an "owns" edge 306. In some embodiments, the first node corresponds to an input or output port of the first media device.

At step 3440, a second node for the second media device and a second edge between the second node and a node of the second user is created in the social graph. In some embodiments, the social graph may refer to social graph 3300. In some embodiments, the second edge may be an "owns" edge 306. In some embodiments, the second node corresponds to an input or output port of the second media device.

At step 3450, media is streamed from the first media device to the second device using the first and second nodes and the first and second edges created in step 3430 and 3440. For example, the first user may view a TV show on his TV that the second user is currently viewing on his TV. As another example, the first user may view photos from the second user's smartphone on his TV.

Particular embodiments may repeat one or more steps of the method of FIG. 34, where appropriate. Although this disclosure describes and illustrates particular steps of the method of FIG. 34 as occurring in a particular order, this disclosure contemplates any suitable steps of the method of FIG. 34 occurring in any suitable order. Moreover, although this disclosure describes and illustrates particular components, devices, or systems carrying out particular steps of the method of FIG. 34, this disclosure contemplates any suitable combination of any suitable components, devices, or systems carrying out any suitable steps of the method of FIG. 34.

Figure 35:
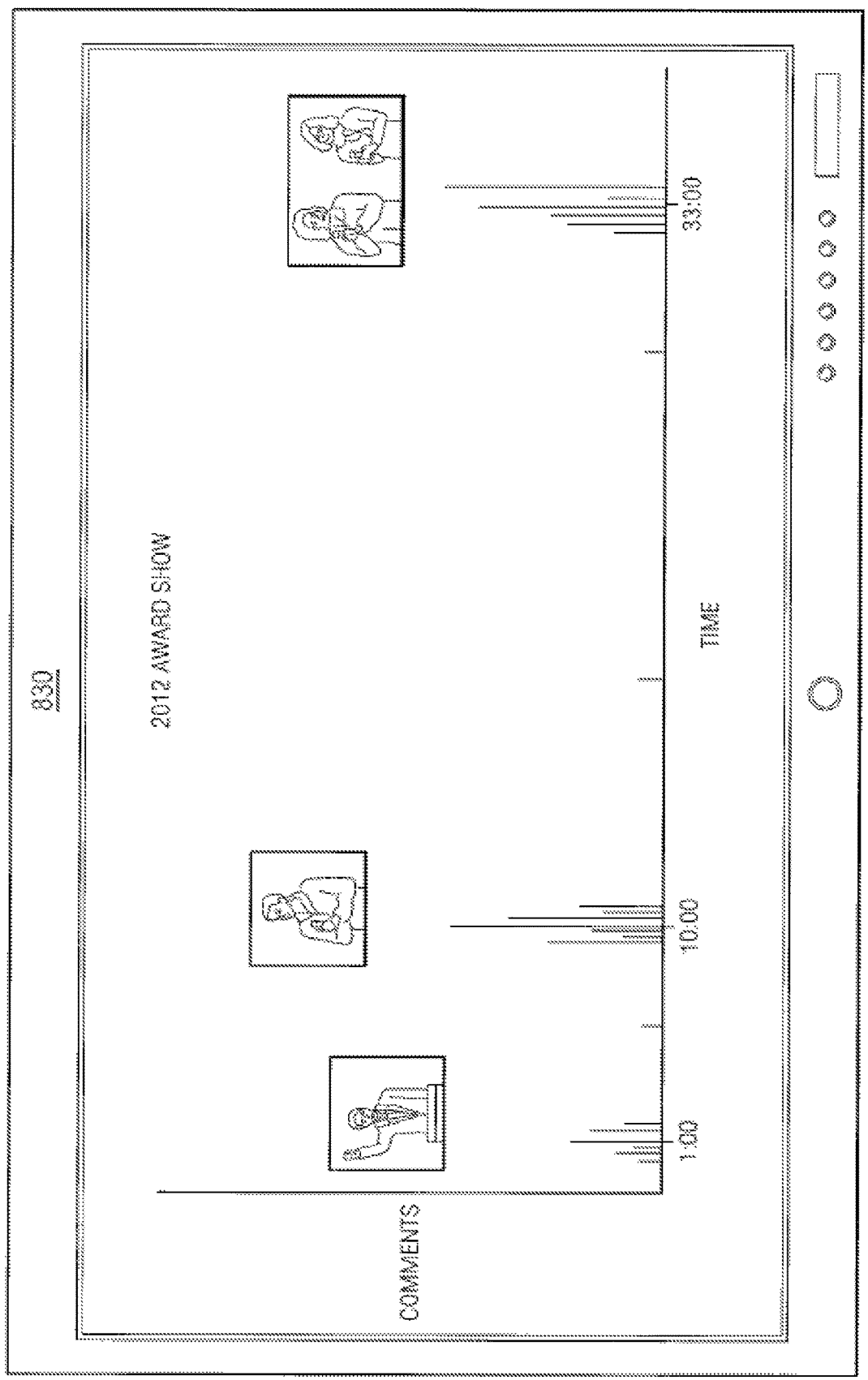
FIG. 35 illustrates an example comment visualization graph.

FIG. 35 illustrates a comment visualization graph for a particular program that may be generated and displayed to user 101. As discussed above, comments, posts, chat messages, or any other content posted to social networking system 160 may be time-stamped with information indicating when the content was posted. For example, a post about a particular TV show may be time-stamped with a time that indicates when in the show the post was made. As another example, chat messages about a particular movie may be time-stamped to indicate at what point in the movie the chat messages were exchanged. Social networking system 160 may analyze content posted to social networking system 160 and determine all posts related to a particular program. A comment visualization graph such as the one illustrated in FIG. 35 may then be created and displayed to user 101 on, for example, mobile device 840 or TV 830. The comment visualization graph presents a visual representation of the amount of comments made during the program and at what point during the program they were made. As a result, users may be able to determine interesting or important parts of a program. In some embodiments, the users may then be able to jump that portion of the program and view the interesting or important content. A particular example of a comment visualization graph is discussed in more detail below.

The illustrated example of FIG. 35 is a comment visualization graph for an awards show such as the ACADEMY AWARDS. The x-axis in this embodiment is time relative to the beginning of the show and the y-axis is the amount of comments about the show. As illustrated in this figure, comments of users of social networking system 160 about the award show were clumped in three main portions of the show: around 1:00, 10:00, and 33:00. By presenting the amount of comments about the show relative to time, the comment visualization graph presents a convenient way for users of social networking system 160 to determine important or interesting portions of the show. In this example, users may deduce that the interesting or important parts of the show occurred 1:00, 10:00, and 33:00 marks because that is when the most comments by user of social networking system 160 were posted. In certain embodiments, the comment visualization graph may also present a thumbnail image of the show at the important or interesting points of the show (e.g., when the most comments occurred). In this example, thumbnail images of the show at the 1:00, 10:00, and 33:00 marks are displayed above the clumps of comments. This may allow the user to quickly discern what the comments were regarding. In some embodiments, the user may click or otherwise interact with the thumbnail images in order to being playing the show at that point.

In certain embodiments, a dynamic highlight reel may be presented to a user based on which sections of a program received the highest density of user comments. For example, a user may interact with mobile application 602 on his mobile device and indicate that he would like to watch the top highlights of a certain program in a certain amount of time. An example might include, "I want to watch the top highlights of the ACADEMY AWARDS in three minutes." One or more of mobile application 602, social TV dongle 810, and social networking system 160 may then analyze content posted to social networking system 160 (e.g., time-stamped user comments about the ACADEMY AWARDS) and determine all posts related to the ACADEMY AWARDS. Clips of portions of the ACADEMY AWARDS having the most user comments may then be automatically assembled. In certain embodiments, the clips may be ranked from the highest density of user comments to the lowest. In some embodiments, a subset of the determined clips is chosen so that the chosen clips will run in the amount of time indicated by the user. A highlight reel of the determined clips may then be presented to the user on any appropriate display device.

In some embodiments, an index of scenes or interesting parts of a program may be presented to user 101. For example, the comments for a certain program may be analyzed as described above in order to determine important or interesting portions of the program. The determined important or interesting portions of the program may then be ranked or otherwise listed in an index and presented to user 101. In certain embodiments, for example, the index may be presented to user 101 interposed onto, for example, the user's time line.

In some embodiments, content and interactions other than user comments may be analyzed and presented to user 101 in a visualization graph similar to the comment visualization graph of FIG. 35 above. For example, time-stamped likes of a particular program may be analyzed and graphed to show the various points within the program that users selected to like the program. In another example, observed data indicating interest in the content may be analyzed and graphed to show the various points within the program that users were intensely watching the content. As a particular example, users' eye gaze, as described above, may be analyzed and graphed according to time stamps to show which portions of a show users were transfixed on the TV.

Figure 36:
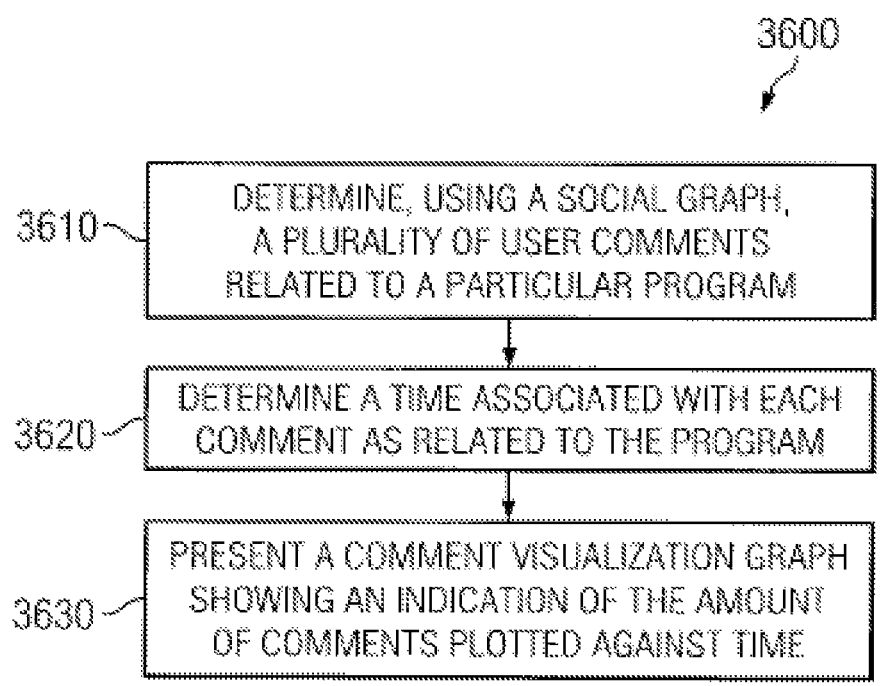
FIG. 36 illustrates an example method for providing an example comment visualization graph.

FIG. 36 illustrates an example method 3600 for providing an example comment visualization graph. The method may begin at step 3610, where a plurality of user comments related to a particular program are determined. In some embodiments, a social graph such as social graph 300 may be utilized to determine the plurality of comments. For example, social networking system 160 may query social graph 300 for all comments related to an awards show that previously aired.

At step 3620, a time associated with each comment as related to the program is determined. In some embodiments, each comment may be time-stamped with an absolute time or a time relative to the program. For example, a comment may be time-stamped with a time indicating that it was posted at 33:00 into the show.

At step 3630, a comment visualization graph is presented. In some embodiments, the comment visualization graph shows an indication of the amount of comments plotted against time. For example, the comment visualization graph may plot time of the program on the x-axis and the number of comments made about the program on the y-axis. This may allow users to quickly discern important parts of the program. For example, if there were many comments surrounding the time of 33:00 into the program, the user may determine that the 33:00 mark was an important part of the program. In some embodiments, the program may automatically begin playing the important parts of the program.

Particular embodiments may repeat one or more steps of the method of FIG. 36, where appropriate. Although this disclosure describes and illustrates particular steps of the method of FIG. 36 as occurring in a particular order, this disclosure contemplates any suitable steps of the method of FIG. 36 occurring in any suitable order. Moreover, although this disclosure describes and illustrates particular components, devices, or systems carrying out particular steps of the method of FIG. 36, this disclosure contemplates any suitable combination of any suitable components, devices, or systems carrying out any suitable steps of the method of FIG. 36.

In some embodiments, social networking system 160 may provide user-submitted content about viewed programs to entities external to social networking system 160. For example, social networking system 160 may (for a fee) provide user comments about a particular TV show to the providers or producers of the show, subject to user settings. As another example, social networking system 160 may (for a fee) provide the number of times on any screen (e.g., any mobile device, TV, or computer) that a user has seen an advertisement from a specific media campaign, subject to user settings. In some embodiments, the user comments may be provided in real-time or at a time after the airing of the show. In another example, social networking system 160 may (for a fee) provide user likes of a product, user posts about a product, or the number of times on any screen (e.g., any mobile device, TV, or computer) that a user has seen an advertisement for a particular product. Both of these examples are discussed in more detail below.

In some embodiments, social networking system 160 may provide user-generated content about a viewed program to the program's provider. For example, consider a scenario where a pilot of a TV show is viewed by users of social networking system 160. Either while viewing the pilot or at a time after the airing of the pilot, users of social networking system 160 may submit posts, comments, chat sessions, or any other content regarding the pilot. Social networking system 160 may aggregate the user-submitted content for the pilot and provide it to the pilot's creator or producer either while the pilot is airing or after it has aired. For example, social networking system 160 may present on a mobile device 840 or TV 830 of the pilot's producer the comments that users of social networking system 160 are making about the pilot in real-time. As a result, content providers may be able to obtain viewer feedback in a much more timely manner.

In some embodiments, social networking system 160 may provide user-generated content about a product to the product's advertiser or maker, subject to user privacy settings. For example, consider a scenario where an advertisement for a product is aired and then viewed by users of social networking system 160. Either while viewing the advertisement or at a time after the airing of the advertisement, users of social networking system 160 may submit posts, comments, chat sessions, or any other content regarding the product in the advertisement. Social networking system 160 may aggregate the user-submitted content for the product and provide it to the advertiser or maker of the product.

In some embodiments, social networking system 160 may rate movies, advertisements, shows, episodes of shows, seasons of shows, or any other granularity of shows based on metrics of the viewers of the show, subject to user privacy settings. For example, social networking system 160 may rate a show based on how many users 101 watched the show. This may be determined, for example, using the methods of determining identities of one or more users 101 who are watching content on TV 830 described in reference to FIGS. 15-16 above. In some embodiments, social networking system 160 may rate a show based on other metrics such as how many users 101 finished a show, how many users 101 continue to watch new episodes of a show, how many users post content to social networking system 160 about the show, or take any other social action with social networking system 160 regarding the show. In some embodiments, social networking system 160 may provide the determined ratings to content providers so that the content providers may refine their shows. For example, the determined ratings may allow the content provider to remove a character if social networking system 160 determines that users stopped watching new episodes of the show when the character was introduced.

In some embodiments, social networking system 160 may provide the above determined ratings of advertisements to advertisers or makers of the product being advertised. For example, social networking system 160 may rate an advertisement based on metrics such as how many users 101 post content to social networking system 160 about the advertisement or take any other social action with social networking system 160 regarding the show (e.g., how many users have liked the product). In some embodiments, social networking system 160 may provide the determined ratings to advertisers or makers of the product for a fee.

In some embodiments, the determined ratings may be utilized by social networking system 160 to provide recommendations to users 101. For example, SPG 3110 and playlist 2510 may include shows that have been determined to have high ratings. As another example, notifications may be sent to users 101 to view shows that have been determined to have high ratings.

In some embodiments, analytics may be performed by social networking system 160 to determine metrics regarding the size and composition of audiences for movies and TV shows. For example, as described above, social networking system 160 may determine what content users 101 of social networking system 160 are watching. Social networking system 160 may aggregate this data in order to determine the total number of users 101 across social networking system 160 that viewed a particular program. In some embodiments, social networking system 160 may also determine metrics regarding the composition of the viewers of the particular program. For example, social networking system 160 may analyze user data of the users 101 determined to have viewed a particular program in order to determine the age, gender, etc. of the determined viewers. Social networking system 160 may then provide the metrics regarding the viewing audience of a particular show to content providers, advertisers, or any other appropriate entity.

Figure 37A:
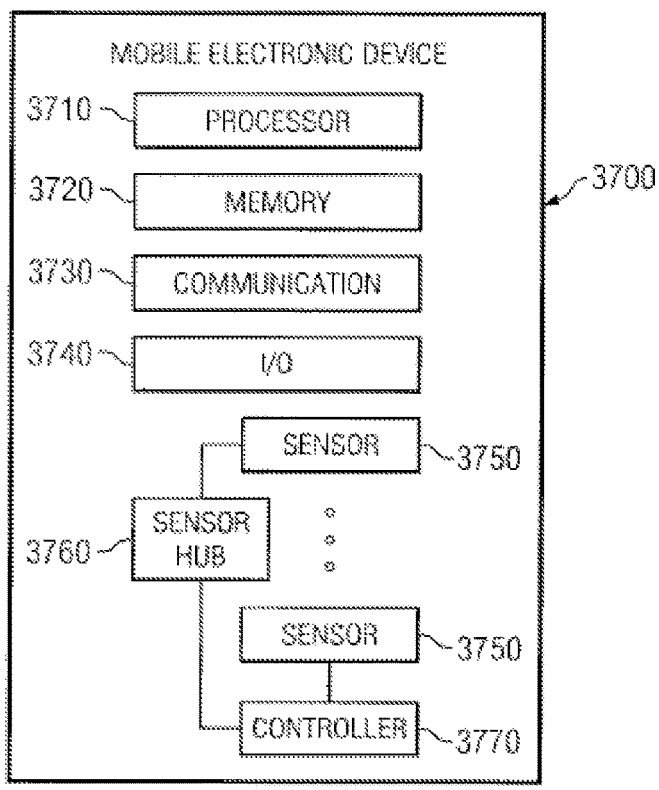
FIGS. 37A-B illustrate an example personal computing device.

FIG. 37A illustrates an example personal computing device 3700. In particular embodiments, personal computing device 3700 may comprise a processor 3710, a memory 3720, a communication component 3730 (e.g., antenna and communication interface for wireless communications), one or more input and/or output (I/O) components and/or interfaces 3740, and one or more sensors 3750. In particular embodiments, one or more I/O components and/or interfaces 3740 may incorporate one or more sensors 3750. In particular embodiments, personal computing device 3700 may comprise a computer system or and element thereof as described in FIG. 39 and associated description.

In particular embodiments, a personal computing device, such as a mobile device, may include various types of sensors 3750, such as, for example and without limitation: touch sensors (disposed, for example, on a display of the device, the back of the device and/or one or more lateral edges of the device) for detecting a user touching the surface of the mobile electronic device (e.g., using one or more fingers); accelerometer for detecting whether the personal computing device 3700 is moving and the speed of the movement; thermometer for measuring the temperature change near the personal computing device 3700; proximity sensor for detecting the proximity of the personal computing device 3700 to another object (e.g., a hand, desk, or other object); light sensor for measuring the ambient light around the personal computing device 3700; imaging sensor (e.g., camera) for capturing digital still images and/or video of objects near the personal computing device 3700 (e.g., scenes, people, bar codes, QR codes, etc.); location sensors (e.g., Global Positioning System (GPS)) for determining the location (e.g., in terms of latitude and longitude) of the mobile electronic device; sensors for detecting communication networks within close proximity (e.g., near field communication (NFC), Bluetooth, RFID, infrared); chemical sensors; biometric sensors for biometrics-based (e.g., fingerprint, palm vein pattern, hand geometry, iris/retina, DNA, face, voice, olfactory, sweat) authentication of user of personal computing device 3700; etc. This disclosure contemplates that a mobile electronic device may include any applicable type of sensor. Sensors may provide various types of sensor data, which may be analyzed to determine the user's intention with respect to the mobile electronic device at a given time.

In particular embodiments, a sensors hub 3760 may optionally be included in personal computing device 3700. Sensors 3750 may be connected to sensors hub 3760, which may be a low power-consuming processor that controls sensors 3750, manages power for sensors 3750, processes sensor inputs, aggregates sensor data, and performs certain sensor functions. In addition, in particular embodiments, some types of sensors 3750 may be connected to a controller 3770. In this case, sensors hub 3760 may be connected to controller 3770, which in turn is connected to sensor 3750. Alternatively, in particular embodiments, there may be a sensor monitor in place of sensors hub 3760 for managing sensors 3750.

In particular embodiments, in addition to the front side, personal computing device 3700 may have one or more sensors for performing biometric identification. Such sensors may be positioned on any surface of personal computing device 3700. In example embodiments, as the user's hand touches personal computing device 3700 to grab hold of it, the touch sensors may capture the user's fingerprints or palm vein pattern. In example embodiments, while a user is viewing the screen of personal computing device 3700, a camera may capture an image of the user's face to perform facial recognition. In example embodiments, while a user is viewing the screen of personal computing device 3700, an infrared scanner may scan the user's iris and/or retina. In example embodiments, while a user is in contact or close proximity with personal computing device 3700, chemical and/or olfactory sensors may capture relevant data about a user. In particular embodiments, upon detecting that there is a change in state with respect to the identity of the user utilizing personal computing device 3700, either by itself or in combination with other types of sensor indications, personal computing device 3700 may determine that it is being shared.

In particular embodiments, in addition to the front side, the personal computing device 3700 may have touch sensors on the left and right sides. Optionally, the personal computing device 3700 may also have touch sensors on the back, top, or bottom side. Thus, as the user's hand touches personal computing device 3700 to grab hold of it, the touch sensors may detect the user's fingers or palm touching personal computing device 3700. In particular embodiments, upon detecting that there is a change in state with respect to a user touching personal computing device 3700, either by itself or in combination with other types of sensor indications, personal computing device 3700 may determine that it is being shared.

In particular embodiments, personal computing device 3700 may have an accelerometer in addition to or instead of the touch sensors on the left and right sides. Sensor data provided by the accelerometer may also be used to estimate whether a new user has picked up personal computing device 3700 from a resting position, e.g., on a table or desk, display shelf, or from someone's hand or from within someone's bag. When the user picks up personal computing device 3700 and brings it in front of the user's face, there may be a relatively sudden increase in the movement speed of personal computing device 3700. This change in the device's movement speed may be detected based on the sensor data supplied by the accelerometer. In particular embodiments, upon detecting that there is a significant increase in the speed of the device's movement, either by itself or in combination with other types of sensor indications, personal computing device 3700 may determine that it is being shared.

In particular embodiments, personal computing device 3700 may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of personal computing device 3700. When personal computing device 3700 is stored on a shelf or in the user's bag, it may stay mostly in one orientation. However, when the user grabs hold of personal computing device 3700 and lifts it up and/or moves it closer to bring it in front of the user's face, there may be a relatively sudden change in the orientation of personal computing device 3700. The orientation of personal computing device 3700 may be detected and measured by the gyrometer. If the orientation of personal computing device 3700 has changed significantly, In particular embodiments, upon detecting that there is a significant change in the orientation of personal computing device 3700, either by itself or in combination with other types of sensor indications, personal computing device 3700 may determine that it is being shared.

In particular embodiments, personal computing device 3700 may have a light sensor. When personal computing device 3700 is stored in a user's pocket or case, it is relatively dark around personal computing device 3700. On the other hand, when the user brings personal computing device 3700 out of his pocket, it may be relatively bright around personal computing device 3700, especially during day time or in well-lit areas. The sensor data supplied by the light sensor may be analyzed to detect when a significant change in the ambient light level around personal computing device 3700 occurs. In particular embodiments, upon detecting that there is a significant increase in the ambient light level around personal computing device 3700, either by itself or in combination with other types of sensor indications, personal computing device 3700 may determine that it is being shared.

In particular embodiments, personal computing device 3700 may have a proximity sensor. The sensor data supplied by the proximity sensor may be analyzed to detect when personal computing device 3700 is in close proximity to a specific object, such as the user's hand. For example, mobile device 3700 may have an infrared LED (light-emitting diode) 3790 (i.e., proximity sensor) placed on its back side. When the user holds such a mobile device in his hand, the palm of the user's hand may cover infrared LED 3790. As a result, infrared LED 3790 may detect when the user's hand is in close proximity to mobile device 3700. In particular embodiments, upon detecting that personal computing device 3700 is in close proximity to the user's hand, either by itself or in combination with other types of sensor indications, personal computing device 3700 may determine that it is being shared.

A personal computing device 3700 may have any number of sensors of various types, and these sensors may supply different types of sensor data. Different combinations of the individual types of sensor data may be used together to detect and estimate a user's current intention with respect to personal computing device 3700 (e.g., whether the user really means to take personal computing device 3700 out of his pocket and use it). Sometimes, using multiple types of sensor data in combination may yield a more accurate, and thus better, estimation of the user's intention with respect to personal computing device 3700 at a given time than only using a single type of sensor data. Nevertheless, it is possible to estimate the user's intention using a single type of sensor data (e.g., touch-sensor data).

Figure 37B:
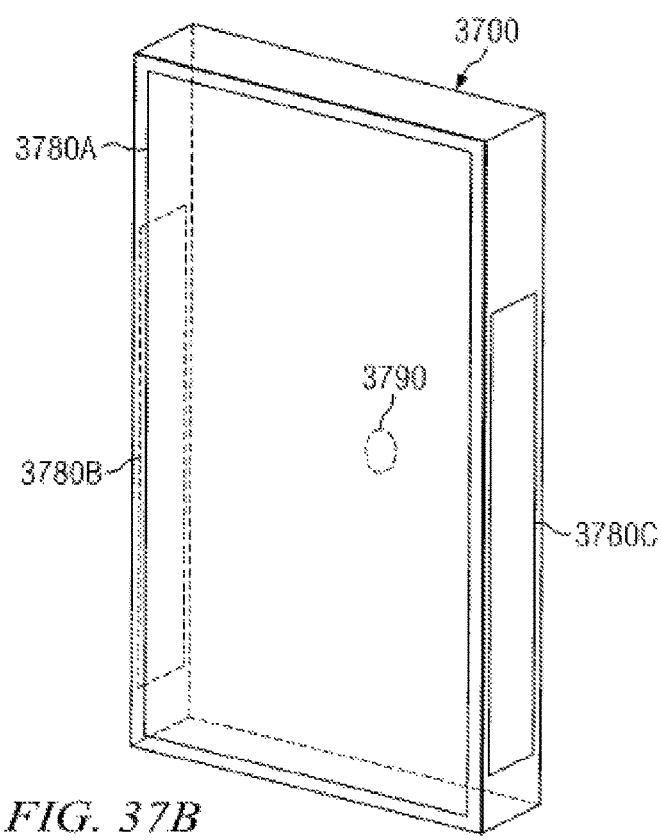

FIG. 37B illustrates the exterior of an example personal computing device 3700. Personal computing device 3700 has approximately six sides: front, back, top, bottom, left, and right. Touch sensors may be placed anywhere on any of the six sides of personal computing device 3700. For example, in FIG. 37B, a touchscreen incorporating touch sensors 3780A is placed on the front of personal computing device 3700. The touchscreen may function as an input/output (I/O) component for personal computing device 3700. In addition, touch sensors 3780B and 3780C are placed on the left and right sides of personal computing device 3700, respectively. Touch sensors 3780B and 3780C may detect a user's hand touching the sides of personal computing device 3700. In particular embodiments, touch sensors 3780A, 3780B, 3780C may be implemented using resistive, capacitive, and/or inductive touch sensors. The electrodes of the touch sensors 3780A, 3780B, 3780C may be arranged on a thin solid piece of material or a thin wire mesh. In the case of capacitive touch sensors, there may be two types of electrodes: transmitting and receiving. These electrodes may be connected to a controller (e.g., controller 3770 illustrated in FIG. 3A), which may be a microchip designed to drive the transmitting electrodes with electrical pulses and measure the changes in capacitance from the receiving electrodes caused by a user's touches in order to detect the locations of the user touches.

Of course, personal computing device 3700 is merely an example. In practice, a device may have any number of sides, and this disclosure contemplates devices with any number of sides. The touch sensors may be placed on any side of a device.

In particular embodiments, personal computing device 3700 may have a proximity sensor 3790 (e.g., an infrared LED) placed on its back side. Proximity sensor 3790 may be able to supply sensor data for determining its proximity, and thus the proximity of personal computing device 3700, to another object.

Figure 38:
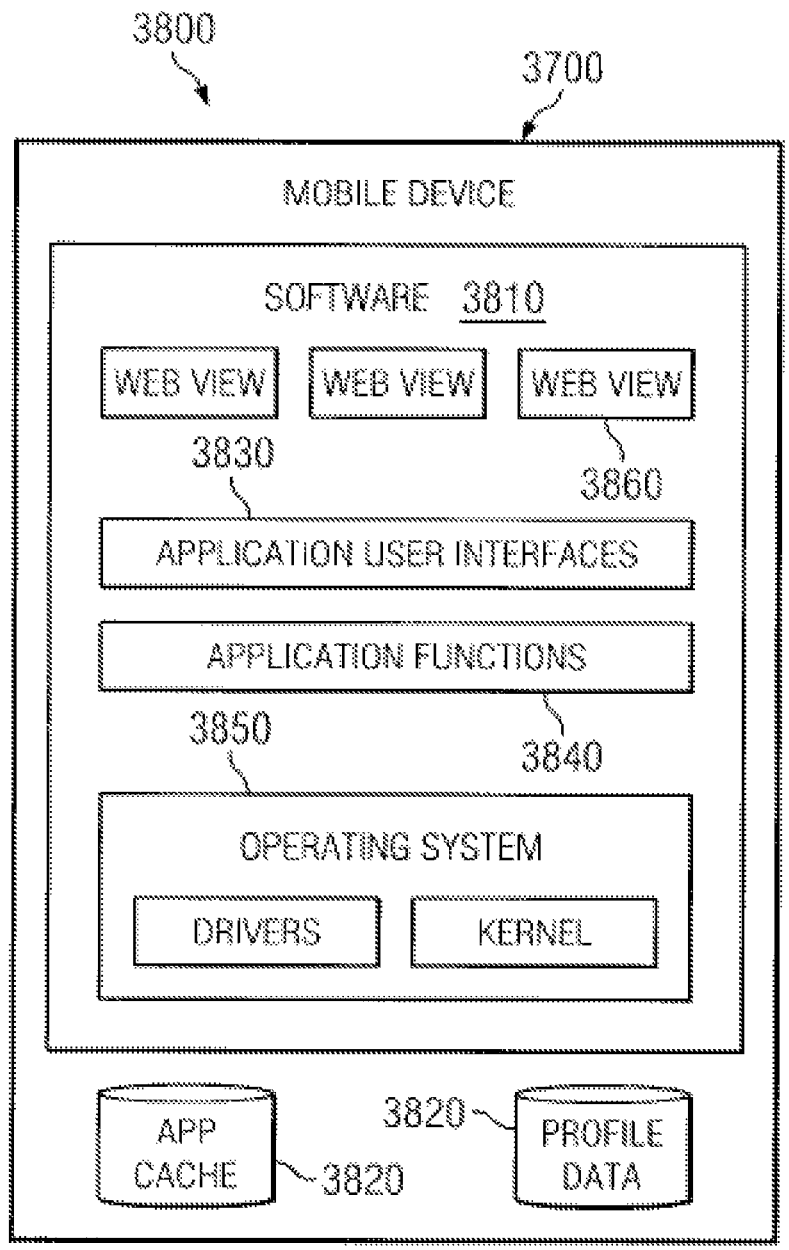
FIG. 38 illustrates an example software architecture for information and applications on a personal computing device.

FIG. 38 illustrates an example software architecture 3800 for information and applications on a personal computing device 3700. In particular embodiments, software architecture 3800 may comprise software 3810 and data store(s) 3820. In particular embodiments, personal information may be stored in an application data cache 3820 and/or a profile data store 3820 and/or another data store 3820. In particular embodiments, one or more software applications may be executed on personal computing device 3700. In particular embodiments, they may be web-based applications hosted on servers. For example, a web-based application may be associated with a URI (Uniform Resource Identifier) or URL (Uniform Resource Locator). From personal computing device 3700, a user may access the web-based application through its associated URI or URL (e.g., by using a web browser). Alternatively, in other embodiments, they may be native applications installed and residing on personal computing device 3700. Thus, software 3810 may also include any number of application user interfaces 3830 and application functions 3840. For example, one application (e.g., Google Maps®) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using personal computing device 3700; a fifth application may allow the device user to receive and initiate VoIP and/or cellular network calls, and so on. Each application has one or more specific functionalities, and the software (e.g., one or more software modules) implementing these functionalities may be included in application functions 3840. Each application may also have a user interface that enables the device user to interact with the application, and the software implementing the application user interface may be included in application user interfaces 3830. In particular embodiments, the functionalities of an application may be implemented using JavaScript®, Java®, C, or other suitable programming languages. In particular embodiments, the user interface of an application may be implemented using HyperText Markup Language (HTML), JavaScript®, Java®, or other suitable programming languages.

In particular embodiments, the user interface of an application may include any number of screens or displays. In particular embodiments, each screen or display of the user interface may be implemented as a web page. Thus, the device user may interact with the application through a series of screens or displays (i.e., a series of web pages). In particular embodiments, operating system 3850 is Google's Android™ mobile technology platform. With Android®, there is a Java® package called "android.webkit", which provides various tools for browsing the web. Among the "android.webkit" package, there is a Java class called "android.webkit.WebView", which implements a View for displaying web pages. This class uses the WebKit rendering engine to display web pages and includes methods to navigate forward and backward through a history, zoom in, zoom out, perform text searches, and so on. In particular embodiments, an application user interface 3830 may utilize Android's WebView API to display each web page of the user interface in a View implemented by the "android.webkit.WebView" class. Thus, in particular embodiments, software 3810 may include any number of web views 3860, each for displaying one or more web pages that implement the user interface of an application.

During the execution of an application, the device user may interact with the application through its user interface. For example, the user may provide inputs to the application in various displays (e.g., web pages). Outputs of the application may be presented to the user in various displays (e.g., web pages) as well. In particular embodiments, when the user provides an input to the application through a specific display (e.g., a specific web page), an event (e.g., an input event) may be generated by, for example, a web view 3860 or application user interfaces 3830. Each input event may be forwarded to application functions 3840, or application functions 3840 may listen for input events thus generated. When application functions 3840 receive an input event, the appropriate software module in application functions 3840 may be invoked to process the event. In addition, specific functionalities provided by operating system 3850 and/or hardware (e.g., as described in FIGS. 3A-B) may also be invoked. For example, if the event is generated as a result of the user pushing a button to take a photo with personal computing device 3700, a corresponding image processing module may be invoked to convert the raw image data into an image file (e.g., JPG or GIF) and store the image file in the storage 3820 of personal computing device 3700. As another example, if the event is generated as a result of the user selecting an icon to compose an instant message, the corresponding short message service (SMS) module may be invoked to enable the user to compose and send the message.

In particular embodiments, when an output of the application is ready to be presented to the user, an event (e.g., an output event) may be generated by, for example, a software module in application functions 3840 or operating system 3850. Each output event may be forwarded to application user interfaces 3830, or application user interfaces 3830 may listen for output events thus generated. When application user interfaces 3830 receive an output event, it may construct a web view 3860 to display a web page representing or containing the output. For example, in response to the user selecting an icon to compose an instant message, an output may be constructed that includes a text field that allows the user to input the message. This output may be presented to the user as a web page and displayed to the user in a web view 3860 so that the user may type into the text field the message to be sent.

The user interface of an application may be implemented using a suitable programming language (e.g., HTML, JavaScript®, or Java®). More specifically, in particular embodiments, each web page that implements a screen or display of the user interface may be implemented using a suitable programming language. In particular embodiments, when a web view 3860 is constructed to display a web page (e.g., by application user interfaces 3830 in response to an output event), the code implementing the web page is loaded into web view 3860.

Figure 39:
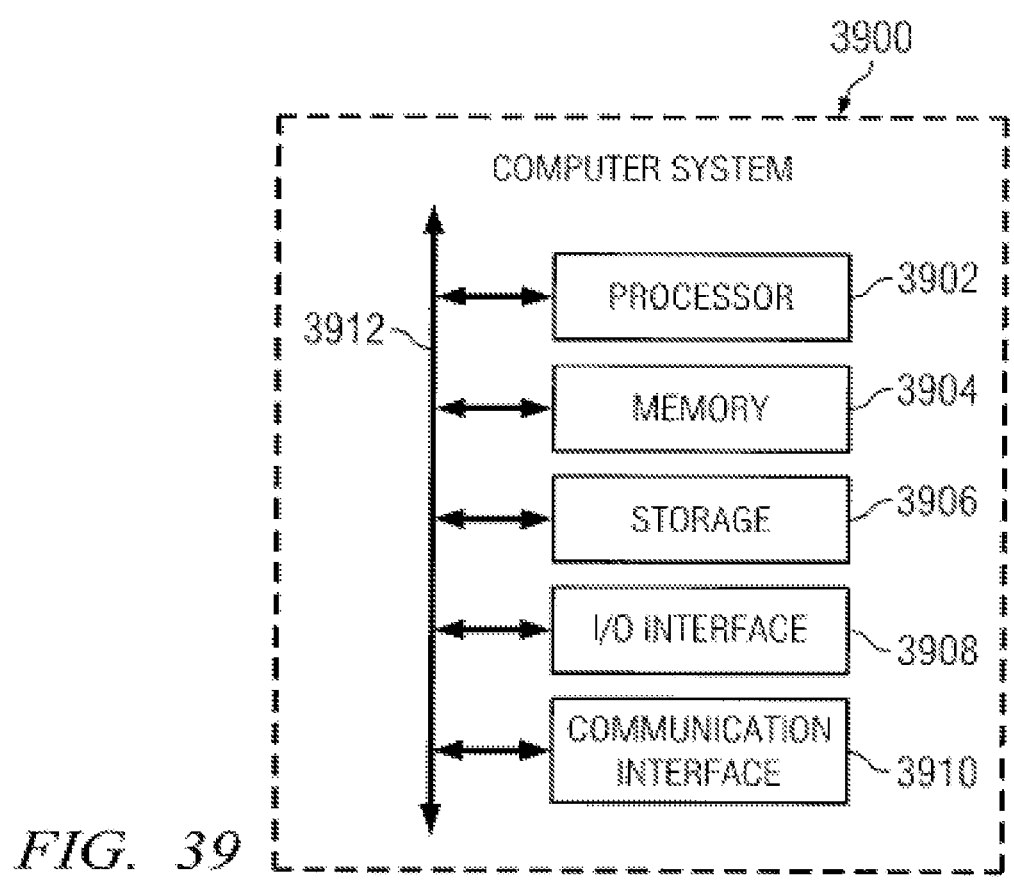
FIG. 39 illustrates an example computing system.

FIG. 39 illustrates an example computer system 3900. In particular embodiments, one or more computer systems 3900 perform one or more steps of one or more methods described or illustrated herein. In particular embodiments, one or more computer systems 3900 provide functionality described or illustrated herein. In particular embodiments, software running on one or more computer systems 3900 performs one or more steps of one or more methods described or illustrated herein or provides functionality described or illustrated herein. Particular embodiments include one or more portions of one or more computer systems 3900. Herein, reference to a computer system may encompass a computing device, where appropriate. Moreover, reference to a computer system may encompass one or more computer systems, where appropriate.

This disclosure contemplates any suitable number of computer systems 3900. This disclosure contemplates computer system 3900 taking any suitable physical form. As example and not by way of limitation, computer system 3900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 3900 may include one or more computer systems 3900; be unitary or distributed; span multiple locations; span multiple machines; span multiple data centers; or reside in a cloud, which may include one or more cloud components in one or more networks. Where appropriate, one or more computer systems 3900 may perform without substantial spatial or temporal limitation one or more steps of one or more methods described or illustrated herein. As an example and not by way of limitation, one or more computer systems 3900 may perform in real time or in batch mode one or more steps of one or more methods described or illustrated herein. One or more computer systems 3900 may perform at different times or at different locations one or more steps of one or more methods described or illustrated herein, where appropriate.

In particular embodiments, computer system 3900 includes a processor 3902, memory 3904, storage 3906, an input/output (I/O) interface 3908, a communication interface 3910, and a bus 3912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 3902 includes hardware for executing instructions, such as those making up a computer program. As an example and not by way of limitation, to execute instructions, processor 3902 may retrieve (or fetch) the instructions from an internal register, an internal cache, memory 3904, or storage 3906; decode and execute them; and then write one or more results to an internal register, an internal cache, memory 3904, or storage 3906. In particular embodiments, processor 3902 may include one or more internal caches for data, instructions, or addresses. This disclosure contemplates processor 3902 including any suitable number of any suitable internal caches, where appropriate. As an example and not by way of limitation, processor 3902 may include one or more instruction caches, one or more data caches, and one or more translation lookaside buffers (TLBs). Instructions in the instruction caches may be copies of instructions in memory 3904 or storage 3906, and the instruction caches may speed up retrieval of those instructions by processor 3902. Data in the data caches may be copies of data in memory 3904 or storage 3906 for instructions executing at processor 3902 to operate on; the results of previous instructions executed at processor 3902 for access by subsequent instructions executing at processor 3902 or for writing to memory 3904 or storage 3906; or other suitable data. The data caches may speed up read or write operations by processor 3902. The TLBs may speed up virtual-address translation for processor 3902. In particular embodiments, processor 3902 may include one or more internal registers for data, instructions, or addresses. This disclosure contemplates processor 3902 including any suitable number of any suitable internal registers, where appropriate. Where appropriate, processor 3902 may include one or more arithmetic logic units (ALUs); be a multi-core processor; or include one or more processors 3902. Although this disclosure describes and illustrates a particular processor, this disclosure contemplates any suitable processor.

In particular embodiments, memory 3904 includes main memory for storing instructions for processor 3902 to execute or data for processor 3902 to operate on. As an example and not by way of limitation, computer system 3900 may load instructions from storage 3906 or another source (such as, for example, another computer system 3900) to memory 3904. Processor 3902 may then load the instructions from memory 3904 to an internal register or internal cache. To execute the instructions, processor 3902 may retrieve the instructions from the internal register or internal cache and decode them. During or after execution of the instructions, processor 3902 may write one or more results (which may be intermediate or final results) to the internal register or internal cache. Processor 3902 may then write one or more of those results to memory 3904. In particular embodiments, processor 3902 executes only instructions in one or more internal registers or internal caches or in memory 3904 (as opposed to storage 3906 or elsewhere) and operates only on data in one or more internal registers or internal caches or in memory 3904 (as opposed to storage 3906 or elsewhere). One or more memory buses (which may each include an address bus and a data bus) may couple processor 3902 to memory 3904. Bus 3912 may include one or more memory buses, as described below. In particular embodiments, one or more memory management units (MMUs) reside between processor 3902 and memory 3904 and facilitate accesses to memory 3904 requested by processor 3902. In particular embodiments, memory 3904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 3904 may include one or more memories 3904, where appropriate. Although this disclosure describes and illustrates particular memory, this disclosure contemplates any suitable memory.

In particular embodiments, storage 3906 includes mass storage for data or instructions. As an example and not by way of limitation, storage 3906 may include a hard disk drive (HDD), a floppy disk drive, flash memory, an optical disc, a magneto-optical disc, magnetic tape, or a Universal Serial Bus (USB) drive or a combination of two or more of these. Storage 3906 may include removable or non-removable (or fixed) media, where appropriate. Storage 3906 may be internal or external to computer system 3900, where appropriate. In particular embodiments, storage 3906 is non-volatile, solid-state memory. In particular embodiments, storage 3906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 3906 taking any suitable physical form. Storage 3906 may include one or more storage control units facilitating communication between processor 3902 and storage 3906, where appropriate. Where appropriate, storage 3906 may include one or more storages 3906. Although this disclosure describes and illustrates particular storage, this disclosure contemplates any suitable storage.

In particular embodiments, I/O interface 3908 includes hardware, software, or both providing one or more interfaces for communication between computer system 3900 and one or more I/O devices. Computer system 3900 may include one or more of these I/O devices, where appropriate. One or more of these I/O devices may enable communication between a person and computer system 3900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 3908 for them. Where appropriate, I/O interface 3908 may include one or more device or software drivers enabling processor 3902 to drive one or more of these I/O devices. I/O interface 3908 may include one or more I/O interfaces 3908, where appropriate. Although this disclosure describes and illustrates a particular I/O interface, this disclosure contemplates any suitable I/O interface.

In particular embodiments, communication interface 3910 includes hardware, software, or both providing one or more interfaces for communication (such as, for example, packet-based communication) between computer system 3900 and one or more other computer systems 3900 or one or more networks. As an example and not by way of limitation, communication interface 3910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 3910 for it. As an example and not by way of limitation, computer system 3900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 3900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 3900 may include any suitable communication interface 3910 for any of these networks, where appropriate. Communication interface 3910 may include one or more communication interfaces 3910, where appropriate. Although this disclosure describes and illustrates a particular communication interface, this disclosure contemplates any suitable communication interface.

In particular embodiments, bus 3912 includes hardware, software, or both coupling components of computer system 3900 to each other. As an example and not by way of limitation, bus 3912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 3912 may include one or more buses 3912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by one or more computer systems of a social-networking system, receiving a first video stream from a content source;
   by the one or more computer systems of the social-networking system, analyzing a social graph of the social-networking system, the social graph comprising a plurality of nodes and edges connecting the nodes, the nodes comprising:
      user nodes that are each associated with a particular user of the social-networking system; and
      concept nodes that are each associated with particular media content;
   by the one or more computer systems of the social-networking system, determining an advertisement from the social graph that is related to a product being displayed in the first video stream;
   by the one or more computer systems of the social-networking system, generating an overlay area comprising the advertisement that is related to the product being displayed in first video stream;
   by the one or more computer systems of the social-networking system, analyzing a bid submitted to the social-networking system from a multiple system operator (MSO);
   by the one or more computer systems of the social-networking system, generating a modified video stream using at least the first video stream and the overlay area, wherein the overlay area is placed over a broadcast commercial within the modified video stream when the bid is not greater than a predetermined price; and
   by the one or more computer systems of the social-networking system, providing the modified video stream for display on a display device, the display device determined from the social graph.

2. The method of claim 1, wherein the one or more computer systems of the social-networking system comprises a dongle.

3. The method of claim 1, further comprising determining, by the one or more computer systems of the social-networking system, social content that is related to the first video stream, wherein the social content comprises one or more of:
a notification;
a newsfeed;
a post;
a photo;
a ticker;
a calendar reminder;
another video stream; and
a chat message.

4. The method of claim 1, wherein the content source comprises one of:
a set-top box (STB);
a digital video recorder (DVR);
a gaming console; and
a device configured to provide access to content from an over-the-top (OTT) content provider.

5. The method of claim 1, wherein the modified video stream comprises:
a plurality of decoded video frames comprising content from the first video stream; and
a plurality of overlay frames each comprising a transparent window and the overlay area.

6. The method of claim 1, wherein the modified video stream is generated by drawing the overlay area on frames of the first video stream.

7. The method of claim 1, wherein the first video stream is resized within the modified video stream.

8. The method of claim 1, further comprising masking slow channel changes by:
detecting a channel change within the first video stream;
after detecting the channel change, fade the first video stream to black in the modified video stream; and
after a predetermined time after fading the first video stream to black, fade the first video stream from black to transparent in the modified video stream.

9. One or more computer-readable non-transitory storage media in a computing system, the media embodying logic that is operable when executed to:
receive a first video stream;
analyze a social graph of a social-networking system, the social graph comprising a plurality of nodes and edges connecting the nodes, the nodes comprising:
user nodes that are each associated with a particular user of the social-networking system; and
concept nodes that are each associated with particular media content;
determine an advertisement from the social graph that is related to a product being displayed in the first video stream;
generate an overlay area comprising the advertisement that is related to the product being displayed in first video stream;
analyze a bid submitted to the social-networking system from a multiple system operator (MSO);
generate a modified video stream using at least the first video stream and the overlay area, wherein the overlay area is placed over a broadcast commercial within the modified video stream when the bid is not greater than a predetermined price; and
provide the modified video stream for display on a display device, the display device determined from the social graph.

10. The media of claim 9, wherein the modified video stream comprises:
a plurality of decoded video frames comprising content from the first video stream; and
a plurality of overlay frames each comprising a transparent window and the overlay area.

11. The media of claim 9, wherein the modified video stream is generated by drawing the overlay area on frames of the first video stream.

12. A system, comprising:
one or more memory devices; and
a processor communicatively coupled to the one or more memory devices, the processor operable to:
receive a first video stream;
analyze a social graph of a social-networking system, the social graph comprising a plurality of nodes and edges connecting the nodes, the nodes comprising:
user nodes that are each associated with a particular user of the social-networking system; and
concept nodes that are each associated with particular media content;
determine an advertisement from the social graph that is related to a product being displayed in the first video stream;
generate an overlay area comprising the advertisement that is related to the product being displayed in first video stream;
analyze a bid submitted to the social-networking system from a multiple system operator (MSO);
generate a modified video stream using at least the first video stream and the overlay area, wherein the overlay area is placed over a broadcast commercial within the modified video stream when the bid is not greater than a predetermined price; and
provide the modified video stream for display on a display device, the display device determined from the social graph.

13. The system of claim 12, wherein the modified video stream comprises:
a plurality of decoded video frames comprising content from the first video stream; and
a plurality of overlay frames each comprising a transparent window and the overlay area.

* * * * *